(12) United States Patent
Marantelli

(10) Patent No.: US 10,970,969 B2
(45) Date of Patent: *Apr. 6, 2021

(54) WAGERING APPARATUS, METHODS AND SYSTEMS

(71) Applicant: Diogenes Limited, Douglas (IM)

(72) Inventor: Bernard J. Marantelli, London (GB)

(73) Assignee: Diogenes Limited, Douglas (IM)

( * ) Notice: Subject to any disclaimer, the term of this patent is extended or adjusted under 35 U.S.C. 154(b) by 0 days.

This patent is subject to a terminal disclaimer.

(21) Appl. No.: 16/515,916

(22) Filed: Jul. 18, 2019

(65) Prior Publication Data

US 2019/0362598 A1 Nov. 28, 2019

Related U.S. Application Data

(63) Continuation of application No. 15/884,876, filed on Jan. 31, 2018, now Pat. No. 10,431,044, which is a continuation-in-part of application No. 15/422,348, filed on Feb. 1, 2017, now Pat. No. 10,102,716, which is a continuation-in-part of application No.
(Continued)

(51) Int. Cl.
| | |
|---|---|
| A63F 9/24 | (2006.01) |
| A63F 11/00 | (2006.01) |
| G06F 13/00 | (2006.01) |
| G06F 17/00 | (2019.01) |
| G07F 17/32 | (2006.01) |
| G07F 17/34 | (2006.01) |

(Continued)

(52) U.S. Cl.
CPC .......... *G07F 17/3258* (2013.01); *A63F 13/00* (2013.01); *G06Q 50/34* (2013.01); *G07F 17/323* (2013.01); *G07F 17/3244* (2013.01); *G07F 17/3246* (2013.01); *G07F 17/3248* (2013.01); *G07F 17/3255* (2013.01); *G07F 17/3276* (2013.01); *G07F 17/3288* (2013.01); *G07F 17/3293* (2013.01); *G07F 17/34* (2013.01)

(58) Field of Classification Search
USPC ................ 463/13, 19, 20, 22, 25, 28, 40, 42
See application file for complete search history.

(56) References Cited

U.S. PATENT DOCUMENTS

| | | |
|---|---|---|
| 5,275,400 A | 1/1994 | Weingardt et al. |
| 5,511,781 A | 4/1996 | Wood et al. |

(Continued)

FOREIGN PATENT DOCUMENTS

| | | |
|---|---|---|
| AU | 2011205028 A1 | 8/2011 |
| JP | 2007-334396 A | 12/2007 |

(Continued)

OTHER PUBLICATIONS

European Search Report dated Jan. 2, 2020, of counterpart European Application No. 19200598.1.

(Continued)

Primary Examiner — Adetokunbo O Torimiro
(74) Attorney, Agent, or Firm — DLA Piper LLP

(57) ABSTRACT

A system, method and apparatus provides a unique betting product where multiple players or groups of players may construct and contribute to ("crowdfund") one or more tickets and behave as a single "player". Players make selections in one or more different events. Players who are in contention to win may be offered an opportunity to sell their tickets, in whole or in part, in response to a full or partial buy-out offer made at any time prior to completion of a wagering event.

30 Claims, 28 Drawing Sheets

Related U.S. Application Data

15/212,392, filed on Jul. 18, 2016, now Pat. No. 9,704,338, which is a continuation of application No. 14/990,538, filed on Jan. 7, 2016, now Pat. No. 9,424,716, which is a continuation of application No. 14/833,572, filed on Aug. 24, 2015, now Pat. No. 9,275,516, which is a continuation of application No. 14/449,541, filed on Aug. 1, 2014, now Pat. No. 9,196,126, which is a continuation-in-part of application No. 14/275,136, filed on May 12, 2014, now Pat. No. 9,117,341, which is a continuation of application No. 13/958,028, filed on Aug. 2, 2013, now Pat. No. 8,721,439, which is a continuation-in-part of application No. 13/605,813, filed on Sep. 6, 2012, now Pat. No. 8,602,884.

(51) Int. Cl.
*G06Q 50/34* (2012.01)
*A63F 13/00* (2014.01)

(56) References Cited

U.S. PATENT DOCUMENTS

| | | |
|---|---|---|
| 7,811,164 B1 | 10/2010 | Fox |
| 7,811,165 B2 | 10/2010 | Slomiany et al. |
| 7,883,403 B2 | 2/2011 | Low et al. |
| 7,901,281 B2 | 3/2011 | Breslo |
| 7,942,735 B2 | 5/2011 | Meyer et al. |
| 7,963,838 B2 | 6/2011 | Gauselmann |
| 8,105,149 B2 | 1/2012 | DeWaal |
| 8,510,205 B2 | 8/2013 | Butterly et al. |
| 8,579,700 B2 | 11/2013 | Davis et al. |
| 8,602,884 B1 | 12/2013 | Marantelli |
| 2002/0028706 A1 | 3/2002 | Barnard et al. |
| 2002/0161645 A1 | 10/2002 | Walker et al. |
| 2003/0040360 A1 | 2/2003 | Kaminkow |
| 2003/0078093 A1 | 4/2003 | Simms et al. |
| 2004/0210507 A1 | 10/2004 | Asher et al. |
| 2005/0116410 A1 | 6/2005 | Vlazny et al. |
| 2005/0153767 A1 | 7/2005 | Gauselmann |
| 2006/0030395 A1 | 2/2006 | Thomas et al. |
| 2006/0237905 A1 | 10/2006 | Nicely et al. |
| 2006/0246985 A1 | 11/2006 | Walker et al. |
| 2006/0287043 A1 | 12/2006 | Englman et al. |
| 2007/0060276 A1 | 3/2007 | Monahan |
| 2008/0113765 A1 | 5/2008 | DeWaal |
| 2008/0153579 A1 | 6/2008 | Brenner et al. |
| 2009/0124341 A1 | 5/2009 | Roach |
| 2010/0062840 A1 | 3/2010 | Herrmann |
| 2010/0087256 A1 | 4/2010 | Frattinger et al. |
| 2010/0317424 A1 | 12/2010 | Hornik et al. |
| 2011/0111864 A1 | 5/2011 | Englman et al. |
| 2011/0136566 A1 | 6/2011 | Acres |
| 2011/0319171 A1 | 12/2011 | Ngozika |
| 2012/0208632 A1 | 8/2012 | Roach |
| 2012/0315979 A1 | 12/2012 | Eads |
| 2013/0317969 A1 | 11/2013 | Butterly et al. |
| 2016/0004409 A1 | 1/2016 | Katz et al. |

FOREIGN PATENT DOCUMENTS

| | | |
|---|---|---|
| WO | 03/089078 A1 | 10/2003 |
| WO | 2007/013470 A1 | 2/2007 |
| WO | 2008/143550 A2 | 11/2008 |

OTHER PUBLICATIONS

Official Journal of the European Patent Office, vol. 30, No. 11, Nov. 1, 2007, pp. 592-593, XP007905525, ISSN: 0170-9291.

Eurasian Official Action dated Apr. 29, 2020, of counterpart Eurasian Application No. 201590500, along with an English translation.

Betfair video, available at "https://www.youtube.com/watch?v=pg9X3p09W6w" and indicated as published on Feb. 8, 2012. Printout copy of the video along with transcription. 301 pages.

Letter dated Apr. 15, 2016 from Griffith Hack in the matter of Australian Patent No. 2013333573 and Opposition by Sportsbet Pty Ltd.

Declaration of David Sim in the matter of Australian Patent No. 2013333573 and Opposition by Sportsbet Pty Ltd.

The WayBack Machine (archive.org) capture of the website: http:///sports.williamhill.com/bet/en-gb. The capture is dated Aug. 27, 2012.

Letter dated Sep. 20, 2016 from Griffith Hack in the matter of Australian Patent No. 2013333573 and Opposition by Sportsbet Pty Ltd.

Eurasian Office Action dated Feb. 20, 2017, along with English translation, in corresponding Eurasian Patent Application No. 201590500/31.

Second Declaration of David Sim in the matter of Australian Patent No. 2013333573 and Opposition by Sportsbet Pty Ltd.

Declaration of Jeremy Nicholas Robinson in the matter of Australian Patent No. 2013333573 and Opposition by Sportsbet Pty Ltd.

The WayBack Machine (archive.org) capture of the website: http:/news.williamhill.com/a/todays-highlihts/cash-in-my-bet-with-williamhill. The website contains the article entitled "Cash In My Bet with William Hill." The capture is dated Aug. 27, 2012.

Cash Out by Betfair—YouTube video (located at https://www.youtube.com/watch?v=pg9X3p09W6w).

International Search Report and Written Opinion dated May 4, 2018 of corresponding International Application No. PCT/IB2018/000142.

Eurasian Official Action dated Dec. 28, 2019 of counterpart Eurasian Patent Application No. 523500, along with an English translation.

International Preliminary Report on Patentability dated Jun. 19, 2019 from counterpart International Application No. PCT/IB2018/000142.

Vietnamese Decision of Refusal dated Dec. 30, 2020, of counterpart Vietnamese Application No. 1-2015-01138, along with an English translation.

FIGURE 4

|  | 2006-07 | 2007-08 | 2008-09 | 2009-10 | 2010-11 | 2011-12 | 5 Year Ave |
|---|---|---|---|---|---|---|---|
| ENG PREMIER LEAGUE | 2.45 | 2.64 | 2.48 | 2.77 | 2.8 | 2.8 | 2.66 |
| ESP LA LIGA | 2.48 | 2.69 | 2.9 | 2.71 | 2.74 | 2.77 | 2.72 |
| ITA SERIE A | 2.55 | 2.55 | 2.6 | 2.61 | 2.51 | 2.56 | 2.56 |
| GER BUNDESLIGA | 2.74 | 2.81 | 2.92 | 2.83 | 2.92 | 2.87 | 2.85 |
| FRA LIGUE 1 | 2.25 | 2.28 | 2.26 | 2.41 | 2.34 | 2.47 | 2.34 |
| EUR CHAMPIONS LEAGUE | 2.49 | 2.64 | 2.63 | 2.54 | 2.84 | 2.77 | 2.65 |
| WORLD CUP | 2.21 | 2.71 | 2.67 | 2.52 | 2.3 | 2.27 | 2.45 |

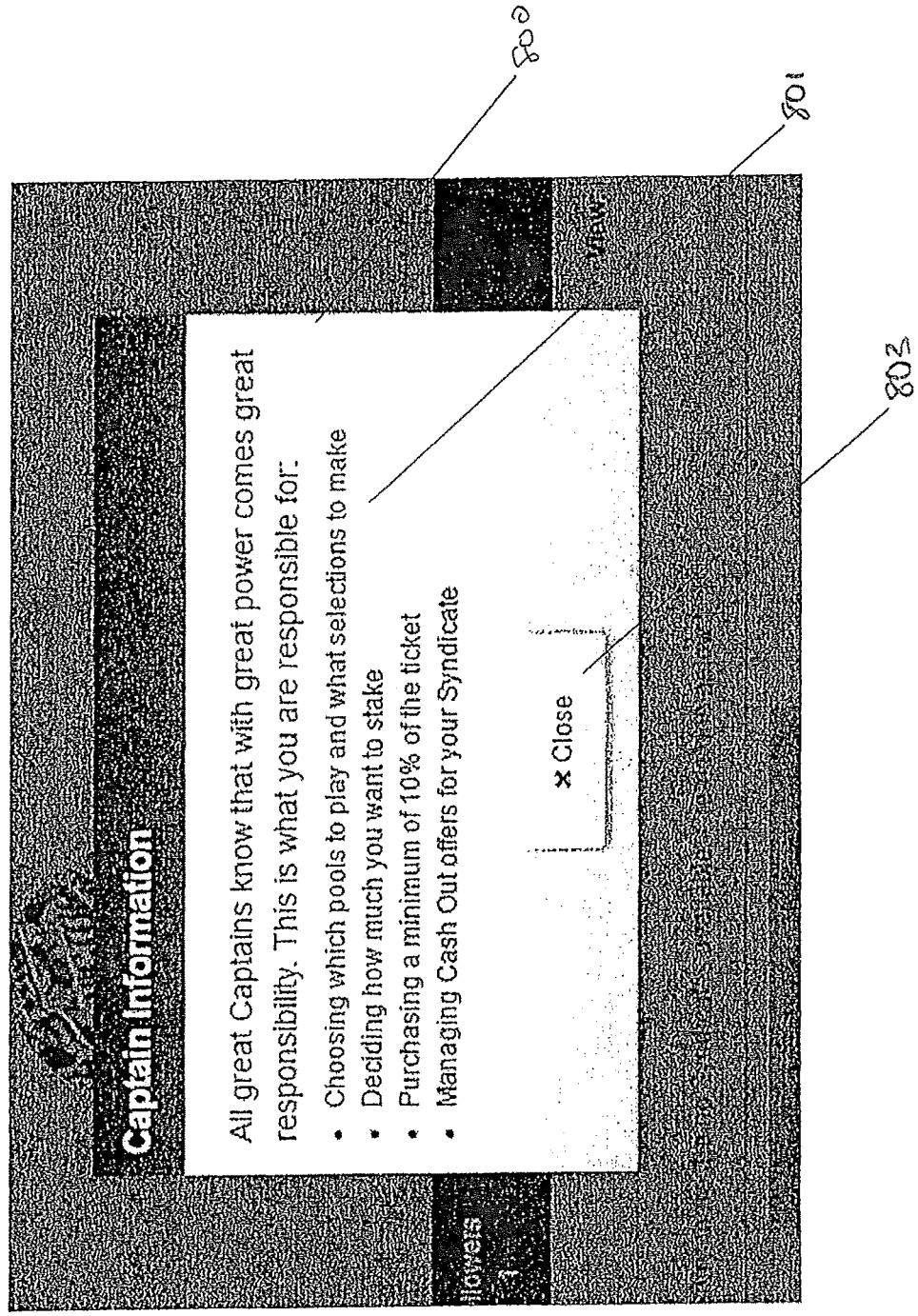

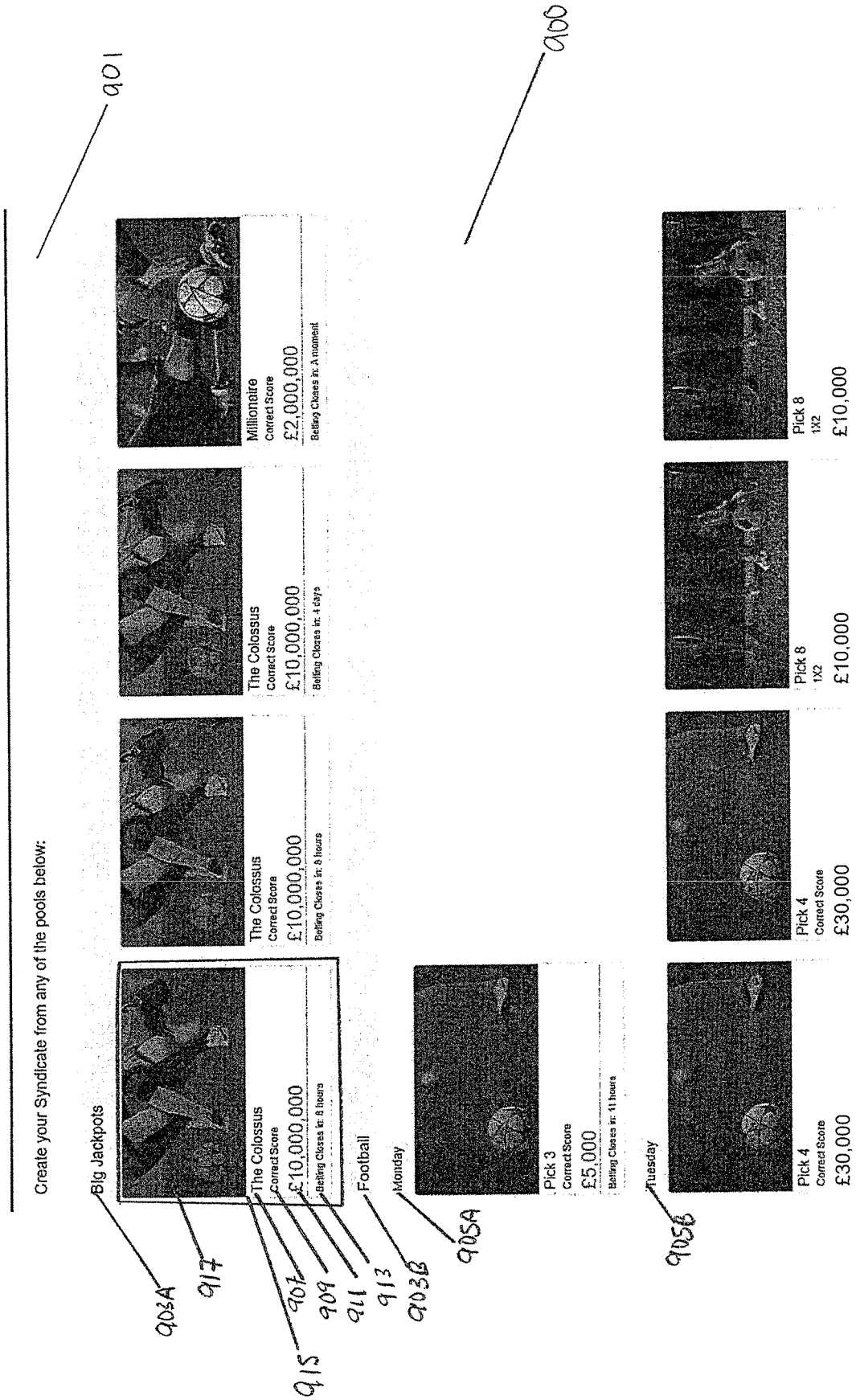

FIG. 10

The Colossus — Correct Score

£10,000,000

£19,354 any 6 or 7
£29,030 any 5 or 7

Betting Closes in: 8 hours
Open
Pool units: 138,240

1000 / 1001

Smart pick | Clear | £2.00 | GO

Number of lines 120  Ticket cost £240.00

1003 / 1005

Bournemouth — Middlesbrough
Other Home Win | 3-2 | 3-1 | 3-0 | 2-1 | 2-0 | 1-0 | Tue, Jan 31 16:45 STATS ▸ | 0-0 | 1-1 | Other Draw | 0-1 | 0-2 | 0-3 | 1-2 | 1-3 | 2-3 | Other Away Win

Watford — Arsenal
Other Home Win | 3-2 | 3-1 | 3-0 | 2-1 | 2-0 | 1-0 | Tue, Jan 31 16:45 STATS ▸ | 0-0 | 1-1 | Other Draw | 0-1 | 0-2 | 0-3 | 1-2 | 1-3 | 2-3 | Other Away Win

Chelsea — Everton
Other Home Win | 3-2 | 3-1 | 3-0 | 2-1 | 2-0 | 1-0 | Tue, Jan 31 16:45 STATS ▸ | 0-0 | 1-1 | Other Draw | 0-1 | 0-2 | 0-3 | 1-2 | 1-3 | 2-3 | Other Away Win

Leicester — Man City
Other Home Win | 3-2 | 3-1 | 3-0 | 2-1 | 2-0 | 1-0 | Tue, Jan 31 16:45 STATS ▸ | 0-0 | 1-1 | Other Draw | 0-1 | 0-2 | 0-3 | 1-2 | 1-3 | 2-3 | Other Away Win

Liverpool — Man Utd
Other Home Win | 3-2 | 3-1 | 3-0 | 2-1 | 2-0 | 1-0 | Wed, Feb 01 12:45 STATS ▸ | 0-0 | 1-1 | Other Draw | 0-1 | 0-2 | 0-3 | 1-2 | 1-3 | 2-3 | Other Away Win

Swansea — Sunderland
Other Home Win | 3-2 | 3-1 | 3-0 | 2-1 | 2-0 | 1-0 | Wed, Feb 01 12:45 STATS ▸ | 0-0 | 1-1 | Other Draw | 0-1 | 0-2 | 0-3 | 1-2 | 1-3 | 2-3 | Other Away Win

West Ham — Tottenham
Other Home Win | 3-2 | 3-1 | 3-0 | 2-1 | 2-0 | 1-0 | Wed, Feb 01 12:45 STATS ▸ | 0-0 | 1-1 | Other Draw | 0-1 | 0-2 | 0-3 | 1-2 | 1-3 | 2-3 | Other Away Win

Syndicate details

Captain: Captain Fantastic
Capt Fantastic Colossals

Reference code: 292MDZFW
Syndicate status: Placed
The Syndicate owns 40% of this ticket Syndicate cost €240.00
Stake per line: €2.00

Syndicate Playing for €4,000,000

My share

My share number 1000-0601
You own 50% of this Syndicate

My contribution €120.00

Playing for: €2,000,000

Offer transactions

Offer Id: 5281    Ticket Proportion: 00%    Cash Out €1,371.48

Unit Distribution

1707

WAGERING APPARATUS, METHODS AND SYSTEMS

BACKGROUND

There are a range of betting and lottery products in the market. For example, there are pure pool betting products, such as the Pick 6 horse racing product in the United States and the Scoop 6 racing product (among others) in the United Kingdom. There are also sports betting products such as soccer individual games and/or pool wagering products. Pick 6 and Scoop 6 provides a six leg jackpot type bet that may also include a bonus pool and consolation prizes. The product type is relatively successful and provides players with a chance to win a large sum by betting on six races on a given race day. Similar multiple leg pool wagering is allowed for other types of racing events and multiple sports events.

In the United Kingdom, there also presently exists a free to play game offered by Skybet, the 'Super 6' whereby players are allowed to make just one set of soccer correct score selections to try to win a guaranteed payout. The Super 6 also has some similarities to the traditional soccer pools product but is different in that it is not predicting draws and only six selections are necessary. Many countries have similar pool products where players are asked to select winners in six or seven horse or dog races and can win a share of a large pool. In the United States, numerous states have lotteries where players select for example six numbers and purchase a lottery ticket for a specific drawing. There is also a "Mega Millions" game in which several states participate in a pooled jackpot. The correct selection of all six numbers allows the ticket bearer to claim all or a portion of the pooled jackpot, depending on the number of winning tickets.

The traditional soccer pools products in the United Kingdom offer a large payout if the player can select a large number of matches that result in a draw—particularly a score draw. Within soccer betting, correct score betting is the second most popular market after the central Home/Draw/Away ("H/D/A") markets. A prominent United Kingdom based betting and gaming company recently reported that 84% of its retail (i.e. in betting shops) soccer bets were coupon based accumulators. Almost 90% of those are on four-fold and above. A four-fold is four selections, so 90% of the bets are on four selections and more. By comparison, in online betting, twice as many bets are singles as is the case in betting shops, and only 55% are four-fold and above.

Within this market segment, there is a need for new products to generate and maintain consumer interest.

For example, there is a need for new products that may allow groups of players to collaborate on wagers. Indeed, groups of players such as colleagues, friends, and families may wish to participate in a wager and wagering event together as a collaborative, team-building exercise, to pool resources, or for fun. Furthermore, players may have an interest in participating in a wagering event, but may find the prerequisites for joining the pool to be prohibitive. For example, a player may be reluctant to participate in a wagering event if the initial wager is too expensive (cost-prohibitive) or if the player believes that managing the wager throughout the wagering event would require too much time (time-prohibitive) or if the wager is too complex (resource-prohibitive). Accordingly, there is a need for new products to generate and maintain customer interest amongst participants who wish to collaborate on a wager.

SUMMARY

The present disclosure is directed to a market gap for the creation of unique betting products where multiple players can combine their resources when participating in the betting product. In particular, multiple players may crowdfund or raise contributions for a single wager. For example, in a wagering event where wagers have become too complex and expensive for a single player to cover, multiple players may fund a portion of the complex or expensive bet covering many related outcomes or may single outcomes.

In an exemplary embodiment, a wager system may include one or more wagering input devices that allow for the placement of wagers on a wagering event. The wagering system may include system controller that is configured to communicate with the one or more wagering input devices. The system controller may initiate the wagering event for one or more players that are eligible to win at least one award based on an outcome of the wagering event, receive a wager via the one or more wagering input devices from one or more players desiring to participate in the wagering event, and determine if any of the one or more players have won the at least one award based on the on the outcome of the wagering event. The received wagers may be capable of being crowdfunded. For example, the wagers may be crowdfunded by creating a proposed wager to be crowdfunded, making the proposed wager available for crowdfunding, receiving from parties interested in crowdfunding the proposed wager a contribution for the proposed wager, and converting the proposed wager to the wager based on a cumulative of the received contributions.

In another exemplary embodiment, a method of conducting a wagering event for one or more players includes the steps of providing one or more wagering input devices in communication with a system controller through which one or more players may participate in a wagering event, and determining if any of the one or more players have won the at least one award based on the on the outcome of the wagering event. The system controller may be adapted for initiating the wagering event for the one or more players, wherein the one or more players are eligible to win at least one award based on an outcome of the wagering event, and receiving a wager via the one or more wagering input devices from one or more players desiring to participate in the wagering event. The wager may be capable of being crowdfunded by the steps of creating a proposed wager to be crowdfunded, making the proposed wager available for crowdfunding, receiving, from parties interested in crowdfunding the proposed wager, a contribution for the proposed wager, and converting the proposed wager to the wager based on a cumulative of the contributions.

In another exemplary embodiment, a wagering system is disclosed herein. The wagering system includes an initial wagering input device, one or more additional input devices, and a system controller. The initial wagering input device corresponds to an initial player of one or more players. The initial input device generates a request to initiate a crowdfunded wager in a wagering event. The crowdfunded wager is a wager funded by one or more players. The one or more additional wagering input devices correspond to the one or more players. The one or more additional wagering input devices place at least one wager for participation in the crowdfunded wager. The system controller communicates with the initial wagering input device and the one or more wagering input devices. The system controller includes a processor and a memory having instructions stored thereon, which, when executed by the processor performs an operation of conducting a wagering event. The operation includes initiating a conditional wager based on the request to initiate the crowdfunded wager in the wagering event. The operation further includes broadcasting the conditional wager to each of the one or more additional wagering input devices, to prompt the one or more players to contribute to the conditional wager. The operation further includes receiving a single contribution amount from a single additional wagering input device of the one or more additional wagering input devices. The operation further includes adding the single contribution amount to a total contribution amount of the conditional wager. The operation further includes determining that the total contribution amount of the conditional wager exceeds a threshold amount. The operation further includes converting the conditional wager to a crowdfunded wager, based on the total contribution amount of the conditional wager, responsive to determining that the total contribution amount of the conditional wager exceeds the threshold amount.

In another exemplary embodiment, a method of conducting a wagering event for one or more players is disclosed herein. The system controller receives a request to initiate a crowdfunded wager in the wagering event from an initial wagering input device in communication with the system controller. The initial wagering input device corresponds to an initial player of the one or more players. The system controller initiates a conditional wager based on the request received from the initial wagering input device. The system controller broadcasts the conditional wager to one or more additional wagering input devices in communication with the system controller. The one or more additional wagering input devices correspond to one or more players. The broadcast prompts the one or more players to contribute to the conditional wager. The system controller receives a contribution amount from a single additional wagering input device of the one or more additional wagering input devices. The system controller adds the contribution amount to the conditional wager. The system controller determines that the amount added to the conditional wager funds the conditional wager above a threshold amount. The system controller converting, by the system controller, the conditional wager to a crowdfunded wager, based on a total amount of funds in the conditional wager, responsive to determining that the conditional wager is funded above the threshold amount.

In another exemplary embodiment, an input system for allowing placement of an input on an event is disclosed herein. The input system includes an initial input device, one or more additional input devices, and a system controller in communication with the initial input device and the one or more additional input devices. The system controller includes a processor and a memory having instructions stored thereon, which, when executed by the processor performs an operation of performing the event. The operation includes initiating the event for one or more players based on input received from the initial input devices, receiving an input from at least one of the one or more additional input devices desiring to participate in the event, initiating at least one of an offer to terminate and an offer to change a level of participation in the event to the at least one of the one or more additional input devices that desires to participate in the event, and identifying that the at least one of the one or more additional input devices accepted at least one of the offer to terminate and the offer to change the level of participation in the event.

In another exemplary embodiment, a wagering system is disclosed herein. The wagering system includes an initial wagering input device, one or more additional wagering input devices, and a system controller. The initial wagering input device corresponds to an initial player of one or more players. The initial wagering input device generates a request to fund a crowdfunded wager in a wagering event. The crowdfunded wager is a wager funded by one or more players. The one or more additional wagering input devices corresponding to the one or more players. The one or more additional wagering input devices are for contributing a notional amount for funding the crowdfunded wager. The system controller is configured to communicate with the initial wagering input device and the one or more wagering input devices. The system controller includes a processor and a memory having instructions stored thereon, which, when executed by the processor performs an operation of conducting a wagering event. The operation includes initiating a request to fund the crowdfunded wager to be placed on the wagering event, broadcasting the fund request to each of the one or more additional wagering input devices, to prompt the one or more players to contribute a notional amount to fund the conditional wager, receiving a contribution amount from one or more of the one or more additional wagering input devices, adding the contribution amount received from the one or more of the one or more additional wagering input devices to a total contribution amount of the conditional wage, converting the conditional wager to a crowdfunded wager, based on the total contribution amount of the conditional wager, and placing the crowdfunded wager on the wagering event.

BRIEF DESCRIPTION OF THE DRAWINGS

FIG. 4 is a table depicting goal expectancy for six years across the main soccer leagues and the World Cup.

FIG. 8 is an illustration of a webpage representative of an exemplary embodiment of the wagering system.

FIG. 9 is an illustration of a webpage representative of an exemplary embodiment of the wagering system.

FIG. 10 is an illustration of a webpage representative of an exemplary embodiment of the wagering system.

FIG. 13 is an illustration of a webpage representative of an exemplary embodiment of the wagering system.

FIG. 17 is an illustration of a webpage representative of an exemplary embodiment of the wagering system.

FIG. 18 is an illustration of a webpage representative of an exemplary embodiment of the wagering system.

FIG. 20 is an illustration of a webpage representative of an exemplary embodiment of the wagering system.

FIG. 23 is an illustration of a webpage representative of an exemplary embodiment of the wagering system.

DETAILED DESCRIPTION

Figure 1:
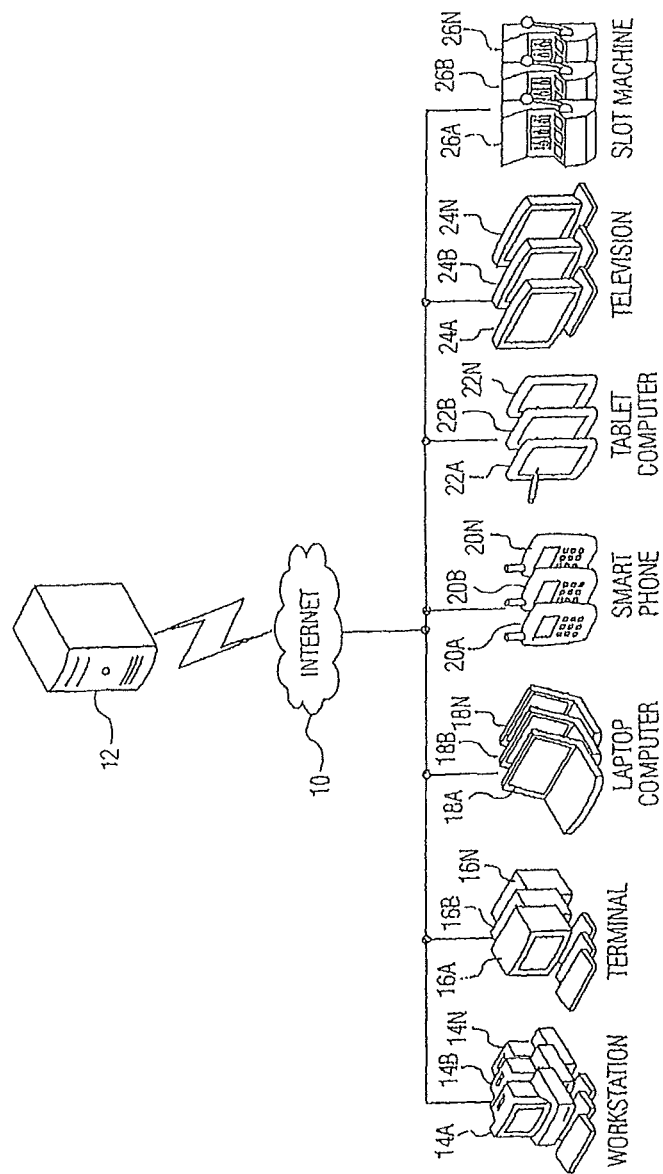
FIG. 1 is a schematic representation of a wagering system hardware and network connected to various wagering stations or wagering terminals and other devices which may be used in accordance with an aspect of the present disclosure.

The present disclosure is directed to a new betting product developed for a wide range of applications, including any event where betting may be utilized or even scenarios where play is just for fun, such as, and without limitation, any type of actual or virtual sporting event or any type of game; for instance, one implementation may apply to the most globally bet upon sport in the world, soccer and specifically United Kingdom Premier League soccer. The concept, however, has more widespread applications and potential appeal, and thus it may be applied to other types of sporting events (i.e., American football, horse racing, car racing, hockey, baseball, basketball, lacrosse, wrestling, just as a few examples) as well as being expanded to other events such as games (both virtual and real), including but not limited to, virtual and real card games (e.g., jacks, poker, blackjack, Texas hold'em, etc.), lotteries, racing, slot machines and other multi-leg/multi-events/multi-outcome or divisible games (such as games or sets in tennis, innings in baseball, etc.), or any combinations of desired events. Further, the betting product of the present disclosure is suitable for "betting for fun," which is betting with no actual stakes at risk.

As a result, it should be understood that the present disclosure has application to any type of event, including but not limited to, any event where betting may or may not be utilized or where play is just for fun, and further can be applied to any sporting and non-sporting games. Such scope includes, as an example, the fantasy genre, which encompasses a wide array of both sporting and non-sporting events. For purposes of illustration only and without limitation, the fantasy genre covers sports, politics, sales, stocks, celebrity gossip, movies, and reality TV, as just some illustrative examples. Other fantasy genre's not specifically mentioned are also covered by this disclosure. In the sporting area, the fantasy genre covers all types of games, including without limitation, football ("soccer"), American football, Australian rules football, baseball, cricket, basketball, golf, hockey, auto racing, legends, rugby, wrestling, surfing, mixed martial arts, alone or any in any combination, as just a few illustrative examples. For illustrative purposes, a fantasy sport (also known as rotisserie, roto, or owner simulation) is a game where participants act as owners to build a team or collections of players or events, etc. that competes against other fantasy owners based on the statistics generated by the real (or virtual) individual players or teams of a sport or sports. Probably the most common variant converts statistical performance into points that are compiled and totaled according to the roster of players that makes up a fantasy team. In many instances the players making up a fantasy team are selected by each participant (commonly referred to as a fantasy team "manager" or "owner") through a draft. In another variant, each participant may pick teams from a league or leagues instead of players. Other variants are also possible. The point systems are calculated and tracked, such as by a "league commissioner" and/or by use of computer modeling of actual games based on statistical input generated by the sport or other event at issue. The particular statistical performance factors that are utilized and tracked may vary from sport to sport and league to league as may be desired. In fantasy sports there is the ability to draft, trade, cut, and/or sign players, etc. like a real sports owner. There are several different types of fantasy leagues, for example and without limitation, public leagues, private leagues, commissioner leagues, head-to-head leagues, total points leagues, keeper leagues, dynasty keep leagues, developmental dynasty leagues, salary cap leagues, auction leagues, daily fantasy sports, daily fantasy, playoff fantasy, survivor fantasy leagues, and simulation leagues, etc. A fantasy sport as well any other fantasy events may be facilitated over any sort of network, including any public and/or private networks, such as the internet, an intranet, an extranet, or any similar manner known or otherwise described herein.

FIG. 1 is a schematic of an exemplary wagering system hardware and network that will be used herein to describe and illustrate one implementation of the present disclosure. The system includes a network, including a system controller, for example, such as based on a central server system 12 being interconnected through the internet 10 to a plurality of wager input devices such as wagering stations 14, wagering terminals (including self-service wagering terminals) 16, and internet connected computing systems 18, smart phones 20, tablet computers 22 and televisions 24 each of which is representative of a plurality of each type of wager input device (e.g. wagering stations 14A-N). As should be understood the term "system controller" should be broadly construed to comprise any hardware device or devices that includes at least one central processing unit (CPU) or other processing device and associated memory. As will also be discussed below, the concepts herein may also be applied to gaming machines, so gaming machine 26 is depicted as an additional input device to the central server system 12 in FIG. 1. The term "leg" as used herein should be broadly construed and may comprise any desired number of individual components of any type of event, such as any type of game or sporting event. For example, and without limitation, a leg may comprise a sporting event in its entirety, such as a soccer game, American football game, horse race, car race, hockey game, baseball game, basketball game, lacrosse game, wrestling match, etc., any portion of a sporting event, such as an inning of baseball, a half of a soccer game, a single horse race, a quarter of an American football game, a single wrestling match, etc., an occurrence within an event or game, such as a particular player scoring a goal (e.g., in hockey or soccer), a particular player getting a hit in a baseball game, or any other statistical performance factors of a player or players and/or a team that may be tracked with any sporting event(s), such as occurring in fantasy games, or a combination of games or events such as the World Series in baseball or any other sports playoff series. In addition, as an example and without limitation, a leg may comprise any desired number of individual components of any game or a game in its entirety, virtual and real, such as, for instance, and without limitation, keno, jacks, poker, blackjack, Texas hold'em, racing, video games (including live and online video games, as examples), slot machines, lotteries and fantasy games, etc. As one example, with respect to slot machines, a separate leg may correspond to each reel (whether virtual or mechanical), or any particular number or designated reels, of the slot machine. As another example, with respect to a lottery, a separate leg may correspond to each item, or any particular number or designated items, used to determine who may have won a given lottery, such as numbered balls. As another example, with respect to a card game (e.g., whether virtual or mechanical, etc.), a separate leg may correspond to each card, or any particular number or designated cards, that are played in a given card game. As another example, with respect to fantasy games, for purposes of illustration only and without limitation, a separate leg may correspond to each or any desired number of fantasy games played by a team in a fantasy league during the fantasy league season, and/or may correspond to any defined number of statistical performance factors that are tracked for any player(s), and/or may be defined as a time period within a game, such as the first quarter or half, etc. As should be understood, however, the amount and nature of the individual components that comprises a leg may vary widely in a given application as may be desired, such as ranging anywhere from one (i.e., an entire event) to a plurality of individual components (i.e., parts of an event, such as reels of a slot machine, numbers in a lottery, cards in a card game, portions of a game or sporting event, particular statistical performance factors or a fantasy team or player, etc.).

The wager stations 14 and wagering terminals 16 of FIG. 1 are depicted in an exemplary embodiment, but as known in the art they may include a support structure, housing or cabinet which provides support for a plurality of displays, inputs, controls and other features of a conventional wager terminal. The wagering stations 14 may be configured so that users can be the party placing a wager, while the wagering terminals 16 may be configured for an operator at a commercial location such as a store or betting facility. The wager stations 14 and wagering terminals 16 may be positioned on a base or stand or can be configured as a table-top which a user can operate preferably while sitting. The wagering stations 14 and wagering terminals 16 may further include a device for accepting a monetary value associated with a wager wherein the device may include, for example, a coin collector, a bill collector or a card reader. The wagering stations 14 and wagering terminals 16 may further include one or more of a display, a card reader/writer and/or a ticket and/or voucher printer to visually display, store on a card and/or a player account(s), and/or print wager receipts and potentially vouchers representing cash-out values and successful play awards (e.g., an "award" or "awards" as defined herein shall be broadly construed and shall include, without limitation, a designated currency, virtual currency, tokens, credits, coupons, services, personal or real property, virtual property, assets, investments, negotiable instruments (such as checks), commodities, food, lodging, entertainment, alleviation of obligations, recognition (such as being named on a leaderboard on a website or other), gaming opportunities, wager enhancement and/or any other benefit(s) or portions thereof that may be provided or otherwise offered to a player). The wagering stations 14 and wagering terminals 16 may also include a ticket or voucher reader and/or a dispenser for dispensing a monetary amount, such as, without limitation, cash, virtual currency and/or tokens, etc. For example, the ticket or voucher reader may be adapted to read and allocate credits or other value associated with a ticket or voucher to one or more players and/or player accounts. The bill collector, ticket or voucher reader and dispenser may be separate or integrated into a single sub-unit.

The wager stations 14 and wagering terminals 16 preferably include at least one processor, such as a microprocessor, a microcontroller-based platform, a suitable integrated circuit or one or more application-specific integrated circuits (ASIC's). The processor is in communication with or operable to access or to exchange signals with at least one data storage or memory device. The processor and the memory device reside within the cabinet. The memory device stores program code and instructions, executable by the processor, to control the wager stations 14 and wagering terminals 16 and communicate with the central server system 12. The memory device also stores other data such as image data, event data, user input data, ticket tracking assignment generators, pay-table data or information and applicable rules that relate to the operation of the wager stations 14 and wagering terminals 16 and the particular type of buy-out method and process described herein.

It is also contemplated that an operator or a player can use a computing system 18, such as a desktop computer, a laptop personal computer, a personal digital assistant (PDA) or smartphone 20, portable tablet computing device 22, or other computerized platform or interactive web-enabled television 24 to access the central server system 12 via a network, internet or intranet, so as to initiate a wager and access the collective wagering pool. In this implementation, it is contemplated the users' devices would also receive messages and the buy-out offers discussed below from the pool operator via the central server system 12, so that the individual user could participate in the wagering system and buy-back option via the user's connected device.

Figure 2:
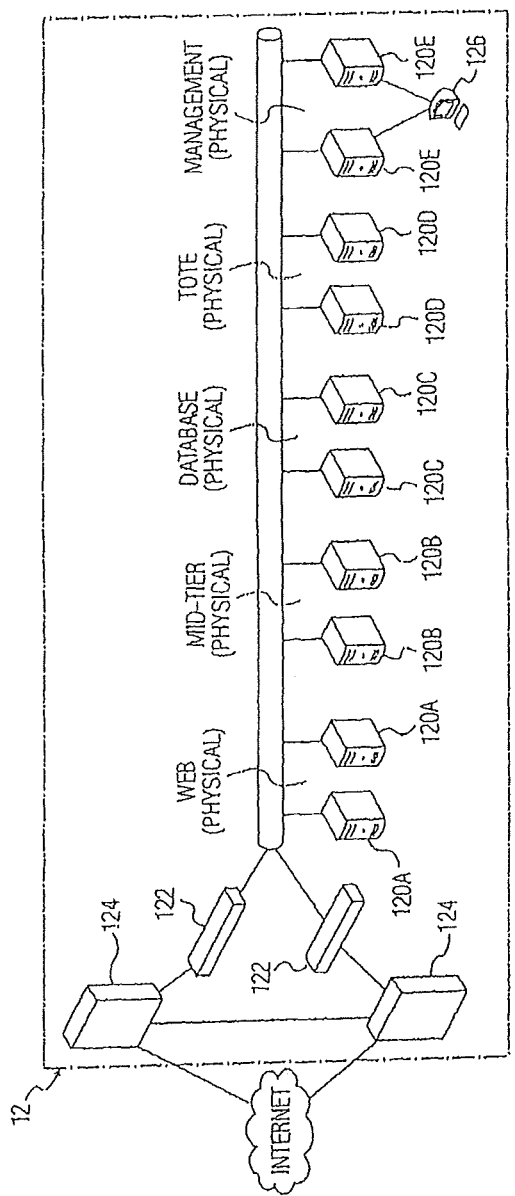
FIG. 2 is a more detailed schematic representation of the wagering system hardware and network that controls the operation of the system of FIG. 1.

It is contemplated that the wager stations 14, wager terminals 16 and/or personal computing systems 18, as well as the smart phones 20, tablet computers 22 and televisions 24 disclosed herein may be operable over a wired or wireless network, such as part of a wired or wireless wagering system. In this embodiment, the computing systems 18 may be a hand held device, a mobile device or any other suitable wireless device that enables a user to participate in the pooled wagering system at any suitable location. It is contemplated that the computing systems 18 or at least the server system as disclosed herein may be a device that has obtained approval from a regulatory agency or commission or a device that has not obtained or require approval from a regulatory agency or commission. FIG. 2 is a more detailed schematic representation of the wagering system hardware of the central server system 12 that controls the operation of the system of FIG. 1. The central server system 12 may include one or more rack mounted server computers 120 each with at least one central processing unit (CPU) or other processing device and associated memory. As an example only, the rack mounted server computers 120 of FIG. 2 may be PowerEdge R420 Rack Chassis devices having a 300 GB hard drive, one or two Intel Xeon E5-2450 processors, 24 GB memories with RAID connectivity using a RAID controller card. One or more of the computers 120 may also include an input device, an output device and a driver for a display device. The computers 120 within the central server system 12 are shown as being hardwired to each other and to the internet, but the respective computers or portions of the network may include either wired and/or wireless connectivity to the internet, to an intranet or an alternative networked communication system, such as, for example and without limitation, a cloud-based system, an autonomic system, a client-server based system, a grid based system, a mainframe based system, a utility based system, a peer-to-peer based system, a cloud gaming based system, or any other suitable types of system architectures, topographies or configurations.

In addition to the respective computers 120, the central server system as depicted in FIG. 2 includes one or more, and in this example, two network switches 122 and two firewall devices 124. The network switches 122 may for example be Hewlett Packard model 2510-48G Switches and the firewall devices 124 may be Cisco Model ASA 5520 firewalls and associated software. As illustrated, the firewall devices 124 are interconnected to each other and to the internet, and each firewall device 124 is also connected to one of the network switches 122.

Figure 3:
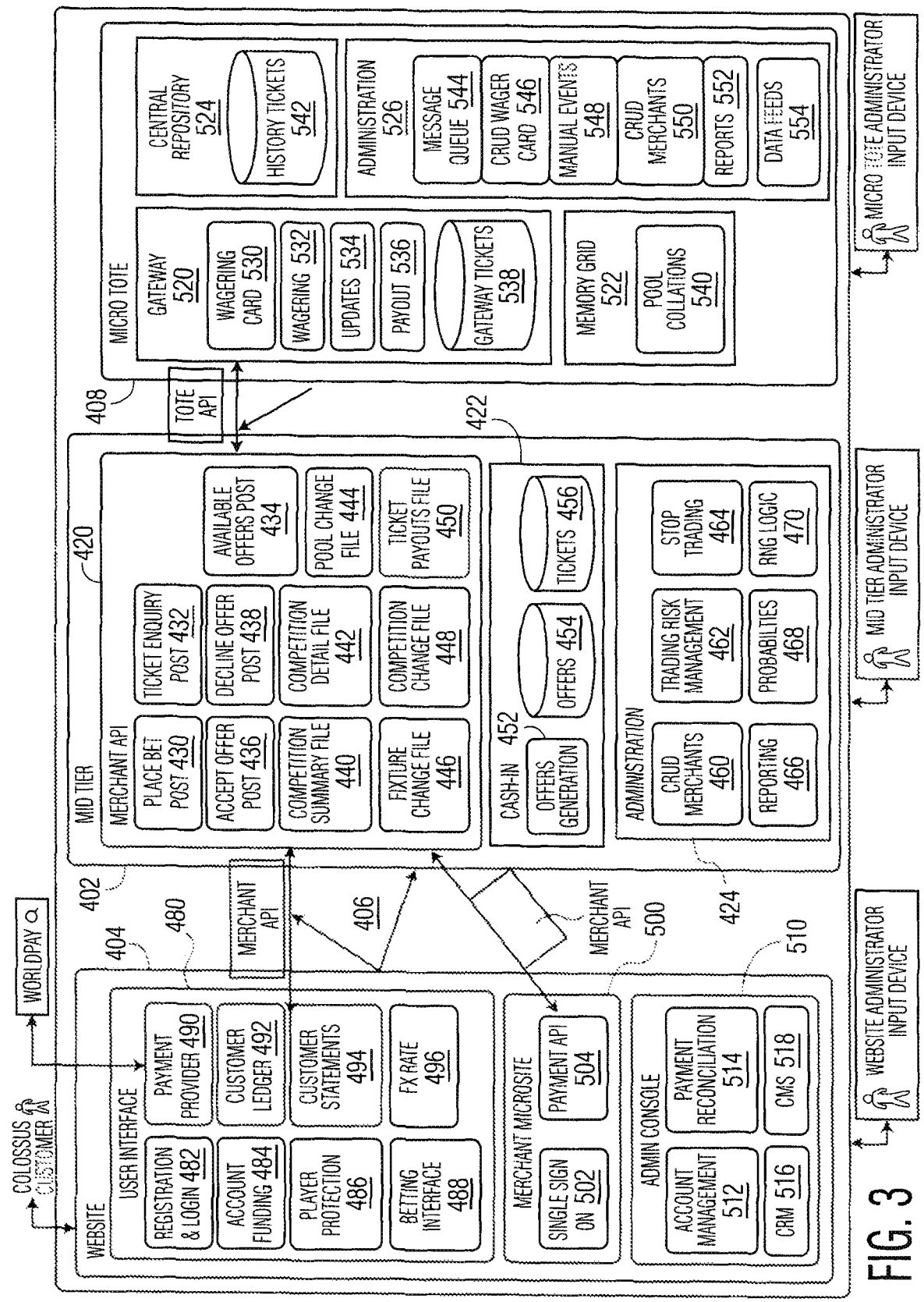
FIG. 3 is a block diagram of the functional architecture of a program for the wagering system hardware of FIG. 2.

The network switches 122 are connected to the respective computers 120, which as shown may be divided into logical functions to control certain aspects of the operation of the wagering system which may be best understood in connection with the block diagram of the functional architecture of the program for the wagering system illustrated in FIG. 3. In FIG. 2, there may be provided a redundancy for the respective computers 120 such that as shown there are two computers 120 for each of the tasks, and the redundant computers 120 are interconnected.

As illustrated in FIG. 2, there are five pairs of computers depicted interconnected through a bus, and through the bus to switches 122. The five pairs include computers 120A, associated with the web interface and connectivity, computers 120B associated with the Mid-Tier program, computers 120C for a database, computers 120C for a Tote program and computers 120E providing the management interface for the central server system, all as described in more detail below in connection with FIG. 3. The computers 120E are shown including a workstation 126 including an input device such as a keyboard and an output or display device such as a monitor. Also, the respective computers need not be located in the same facility, thus for example the computers 120D providing the Tote functionality may be remote from the computers 120B providing the Mid-Tier functionality.

The central server system 12 of FIGS. 1 and 2 may include software programs for wagering software functionality such as registration, deposit taking, withdrawals, account sections that may include current and previous bet histories, fixtures, results, historical data, rules and regulations. These types of software programs having these functionalities are in place in various totalizer facilities and are thus known in the art. However, FIG. 3 is provided to further illustrate the process steps of the program and operation of the central server system 12 associated with the pool wagering system contemplated by the present disclosure. The program for the known functionality of a totalizer facility noted above would be incorporated in the Micro Tote 408 program, as discussed further below.

FIG. 3 represents an exemplary functional architecture of a program hosted or supported by the central server system 12. The core program is represented by the center block identified as the "Mid Tier" program 402. The Mid Tier program 402 interacts with the respective customer and website administrator input programs in the left side block identified as the Website program 404, as well as the accounting programs in the right side block identified as the Micro Tote program 408. The Mid Tier program 402 communicates using an "Application Program Interface" hereinafter "API," allowing bi-directional communication to, and through, the Mid Tier program 402, as represented by the Merchant API 406 as between the Website program 404 and the Mid Tier program 402, and the Tote API 410 as between the Micro Tote program 408 and the Mid Tier program 402, reference lines.

The Mid Tier program 402, as shown in FIG. 3, may include a Merchant API 420 program, a Cash-in 422 program and an Administration 424 program. It is contemplated that the Mid Tier program 402 may be itself a dedicated stand-alone server system and program for hosting the pool based wagering system of the present disclosure, or the subroutines unique to the pool based wagering system of the present disclosure may be added to a server system and program that also hosts other types of wagering pools.

As depicted in the Merchant API 420 program box, there may be several HTTP POST request sub-routines including a Place Bet POST 430, Ticket Enquiry POST 432, Available offers POST 434, Accept Offer POST 436, Decline Offer POST 438. The Place Bet POST 430 routine is used to place a bet on the Operator system. The Ticket Enquiry POST 432 routine is used to confirm that a ticket has been sold on the Operator system. The Available offers POST 434 routine is used to determine what bet trading offers are currently available to the customer. The Accept Offer POST 436 routine is used to accept an offer. The Decline Offer POST 438 routine is used to decline an offer.

As depicted in the Merchant API 420 program box, the system may generate several file updates including a Competition Summary FILE 440, a Competition Detail FILE 442, a Pool Change FILE 444, a Fixture Change FILE 446, a Competition Change FILE 448 and a Ticket Payouts FILE 450. The Competition Summary FILE 440 routine holds a summary list of the available competitions It is updated when new competitions are added, old ones are deleted, or when the status or current fixture changes. The Competition Detail FILE 442 routine holds details about the competition. The Pool Change FILE 444 routine holds details on pool-level information changes on a competition. The Fixture Change FILE 446 routine holds details when fixture-level changes on a competition. The Competition Change FILE 448 routine holds details when competition-level information changes. The Ticket Payouts FILE 450 routine holds details for each pool as its status becomes official.

The Mid Tier program 402, as shown in FIG. 3, includes most critically the Cash-In 422 program, which itself may include the Offers Generation 452 routine, the Offers 454 routine and the Tickets 456 routine. The Cash-In 422 program is responsible for determining when an offer to buy-out a ticket holder will be made, and the price that will be offered. Within the Cash-In 422 program, the Offers Generation 452 routine is the trading engine that, when triggered, will generate a set of offers over all of the tickets that are still potential winners and then publish the offers and receive/process the acceptance of these offers via the Merchant API 420. The Offers 454 routine stores all the offer made, accepted and declined. The Tickets 456 routine stores all the tickets for a pool and who the rightful owner is.

Further, the Mid Tier program 402, as also shown in FIG. 3, may include the Administration 424 program, which itself may include a Create Read Update Delete (CRUD) Merchants 460 routine, Trading Risk Management 462 routine, Stop Trading 464 routine, Reporting 466 routine, Probabilities 468 routine and Random Number Generator (RNG) Logic 470 routine. The Merchants 460 routine is to create, read, update and delete third party Merchant details within the Mid Tier. The Trading Risk Management 462 routine is to allow the control and monitoring of cash-in trading. The Stop Trading 464 routine is to allow cash-in trading to be stopped if required. The Reporting 466 routine is for calculating and reporting on settlement with Merchant systems. The Probabilities 468 routine is for the uploading of probabilities used in the trading calculations. The RNG Logic 470 routine is use for QuickPick bets.

Traditional quick picks generally allocate selections to people either randomly as prevalent in lotteries (where each number has equal probability of being drawn), or in-line with some estimated probabilities such as horse racing (or other event where outcomes do not have equal probability or prospects). It is intended that quick picks in the initial iterations of these games may or may not be in fact SMART PICKS, in that a quick pick will only be allocated to the client if it has a relatively realistic chance of providing the winning outcome and in a relative sense to the size of the pool (which may be fixed or variable (e.g., based on the public spend) or guarantee. For example, in the seven leg correct score game, some outcomes are less than 1 million-to-one, where other outcomes are greater than 1 trillion-to-one. The smart pick will not allocate a quick pick ticket to a client unless it is within a certain multiple of the pool size, say five times. As such, when the pool is £5 million, all £1 quick picks (smart picks) will only be allocated to clients wanting a quick pick (smart pick), if they are less than 25 million-to-one. The reason for this smart pick adjustment is to ensure that smart pick players are not grossly disadvantaged by being allocated a random ticket with potentially very minimal probability of success, especially in reactions to the pool size.

In an alternate embodiment, the probability of generating a particular quick picks (smart picks) ticket may be proportional to the probability of each outcome winning in addition to the smart picks caps described above. Other implementations with respect to QuickPicks/SMART PICKS that are commercially known and not described herein may also be utilized as desired.

Now referring to the left side block of FIG. 3, the Website program 404 may be represented as including subprograms for a user interface 480 representing a dedicated website on which wagers may be entered for example by a customer using a personal computer or alternatively a wagering terminal as discussed above. Once logged into the website, the user interface 480 provides a registration and login routine 482, an account funding routine 484, a player protection routine 486 and a betting interface routine 488. The user interface 480 also provides a routine to allow interconnection with a payment provider 490, for example WORLD-PAY®, providing a secure method by which payments for wagers may be submitted. The user interface 480 may also provide routines to provide a customer ledger 492, customer statements 494 and currency exchange rate calculator 496.

As an alternative to the customer using a dedicated website, it is contemplated that the users could interact with a Merchant Microsite 500, representing for example an established betting house or parlor having its own customer base and methods of collecting wagers and paying disbursements from and to players. These types of Merchant Microsites 500 would be provided with their own Merchant API 406 for communicating with the server hosting the Mid Tier 402 program. The Merchant Microsites 500 include routines for single sign on 502 to the wagering pool and a payment API 504 to assist in the respective accounting functions as between the operator of the Merchant Microsite 500 and the host of the pool wagering system hosted on the central server system 12.

As also reflected in the Website program 404, the Administrative (Admin) Console 510 routine is provided to manage the User Interface 480. The Admin Console 510 routine, operated by the website administrator, may include an Account Management 512 routine for managing customer account details, a Payment Reconciliation 514 routine for administration of customer deposits and withdrawals with a payment provider like WORLDPAY®, a Customer Relationship Management (CRM) 516 routine for managing sales, marketing and customer service interactions with customers and a Content Management System (CMS) 518 routine for the creation, editing and publishing on content on the Website 404.

Now referring to the right side block of FIG. 3, the Micro Tote 408 routine is the program equivalent to a "Totalisator" which receives, calculates and provides a display output for all bets made in a given progressive pool bet system. The Micro Tote 408 routine may thus include a Gateway 520 program, a Memory Grid 522 program, a Central Repository 524 program and an Administration 526 program. The Gateway 520 program includes a routine posting the wagering card 530, summing all of the wagering 532, providing updates 534, and calculating each potential payout 536. The Gateway 520 program also includes a routine for pooling and accumulating all of the Gateway Tickets 538, which is the master routine for each bet that has been placed and accepted in the pool.

Also within the Micro Tote 408 is a Memory Grid 522 program that includes a Pool Collations 540 routine. The Pool Collations 540 routine calculates and continuously recalculates the odds as each bet is placed and accepted, and as each event result occurs within the pool, so as to determine the odds with respect to each remaining active ticket within the pool bet. The odds and all information calculated by the Pool Collations 540 routine is routed through the Tote API 410 to the Mid-Tier 402, and specifically to the Merchant API 420, Cash-in 422 and Administration 424 routines.

Also within the Micro Tote 408 is a Central Repository 524 program that includes a Ticket History 542 routine. The Ticket History 542 routine retains a complete record of each bet placed, each respective ticket, all payouts, and all unpaid credits for all of the respective pools. The information within the Ticket History 542 routine may be maintained primarily for the benefit of regulators and/or oversight organizations and taxing agencies.

Finally, the Micro Tote 408 may also include an Administration 526 program that includes routines for Message Queue 544 which is for inter-process communications within the Micro Tote, Create Read Update Delete (CRUD) Wager Card 546 is for setting up the event information that will be wagered on, Manual Events 548 is for manually managing updates to events, CRUD Merchants 550 is for create, read, update and delete third party Merchant information on the Micro Tote, reports 552 is for settlement reports for the Micro Tote and Data Feeds 554 is for third party event feeds.

With respect to the software programs of FIG. 3, and with respect to the respective computers of FIG. 2, computers 120A drive the consumer websites 480, merchant microsites 500 and the website administration console 510, computers 120B host the main Mid-Tier program for driving the merchant API 420, cash-in 422 and mid-tier administration console 424, computers 120C host the program for physically maintaining the Customer Ledger database 492, computers 120D host the program for physically maintaining the Tote 408 that consists of Gateway 520, Memory Grid 522, Central Repository 524 and Tote administration console 526, and computers 120E host the program providing the physical management interface for the entire interrelated system software.

For the wagering and option buy-out system of the present disclosure, the central server system 12 is programmed to provide to the wager stations 14, wager terminals 16 or personal devices 18, 20, 22 or 24 various options for placing wagers on one or more (e.g. a sequence of and/or separate discrete) sporting events spread over an appropriate interval. The wager stations 14, wager terminals 16 or personal computing systems 18 would allow a player to place a wager on a series of (or separate discrete) sporting events, for example three to eight soccer matches scheduled to occur over a three day period. The player would select the winners, or in some embodiments the particular scores of the matches (or any other variables), for each particular sporting event within a defined cumulated pool or other. The player would receive either a printed ticket or an electronic ticket representing the selections and the amount of the bet. The controller or server system 12 would maintain the pool, assign tracking identifiers to each wager and ticket placed into the pool, and determine any payout requirements from the pooled wagers in the event of a successful selection of all of the events.

The wager stations 14 and wager terminals 16 may include one or more display devices controlled by the processor. The display devices may be connected to or mounted to the cabinet of the wager terminal. The embodiments as generally illustrated in FIG. 1 may include, as known in the art, a display device which displays the betting options. This display device may also display any suitable secondary information associated with the pool wagering system. The wager stations 14 and wager terminals 16 may include a credit display which displays a player's current number of credits, cash, account balance or the equivalent. In one embodiment, wager terminal includes a bet display which displays a player's amount wagered. The wager stations 14 and wager terminals 16 may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle. The wager stations 14 and wager terminals 16 may be any sort of integrated products or stand alone terminals or devices, such as, for instance and without limitation, one for a casino or betting shop, such as in the nature of a fixed odds betting terminal ("FOBT") or a Best Gaming Technology ("BGT") Self service terminal, as examples. Any other suitable types of products or devices commercially known may also be utilized where desired and in accordance with the needs of a particular implementation.

The wager stations 14 and wager terminals 16 also may include at least one payment acceptor in communication with the processor. The payment acceptor may include a coin slot and/or a payment, note or bill acceptor, as examples, where the player inserts money, coins or tokens. The player can place coins in the coin slot or paper money (e.g., the coins or paper money may include actual and/or virtual currency), a ticket or voucher into the payment, note or bill acceptor. In other alternatives, devices such as readers or validators for credit cards, debit cards, credit slips or the like may accept payment. A player may insert an identification card into a card reader of the wager stations 14 and wager terminals 16. The identification card may be a smart card having a programmed microchip or a magnetic strip coded with a player's identification, credit totals (or related data) and other relevant information. A player may carry a portable device, such as a cell phone, a radio frequency identification tag or any other suitable wireless device, which communicates a player's identification, credit totals (or related data) and other relevant information to the wager stations 14 and wager terminals 16. Money may be transferred to a wager station 14 or wager terminal 16 through electronic funds transfer. When a player funds the wager station 14 or wager terminal 16, the processor determines the amount of funds entered and displays the corresponding amount on the credit display or other suitable display. As should be understood, where the term "money" or reference to some form of funds is made herein, both actual currencies and virtual currencies would equally be captured by this term.

In one embodiment, the wager stations 14 and wager terminals 16 may further be configured to: read the receipt of a purchased ticket, make a buy back offer on the ticket, accept that buy back offer, print a ticket for the cashed-in value, print another ticket, and/or adapt the first ticket so the client has a record his ticket is now partially owned by him.

The wager stations 14 and wager terminals 16 may include at least one and preferably a plurality of input devices in communication with the processor. The input devices can include any suitable device which enables the player to produce an input signal which is received by the processor. After appropriate funding of the wager station 14 or wager terminal 16 the input device is a game selection device or a game play button which is used by the player to identify the selected outcome of each of the games/matches/legs of the pool wager on the wager station 14 or wager terminal 16.

As this first embodiment of a pool bet system is premised on betting of sporting events, the server has an input device 26 allowing an operator to enter the results of the sporting events, the winners of the matches or games, the final scores and/or other parameters such as the total score of the game or the point differential. It is contemplated that this information will be entered reasonably promptly following the completion, and if required certification, of the sporting event. With the results of the sporting events for a first sequence of events, the system will make a determination as to whether any individual wagers recorded in the system have correctly selected the winners (or point spread etc.) of the sporting events.

After some percentage, such as a majority, of the sporting events have occurred, the server system 12 may be configured to identify the remaining potential winning ticket or tickets for the Jackpot Pool, i.e., those tickets that have correctly selected each of the results (win or consolation) of the events of the completed legs, or remain eligible for the consolation prize for selecting a certain percentage of the actual winners (i.e., 6 of the 8 winners). Upon determining the number of remaining potential winners of the Jackpot Pool, the system will determine the likelihood of each ticket winning the Jackpot Pool (alone or shared with other players, which may be known or modeled), and on that basis make a determination as to the attributed value of the ticket based on its respective probability of winning the Jackpot Pool (and the prize if split multiple ways). The server system 12 then makes the determination of what the appropriate value would be for a ticket in order to make an offer to buy-out to one or more players (as disclosed herein, in other examples one or more other sources may also be used in addition to, or as an alternative to, the server system 12 for determining the appropriate value). In one example, the buy-out offer is for buying an entire ticket from a player (i.e., 100%) for an indicated value. As should be understood, the buy-out offer may be for any desired percentage of a ticket (i.e., any percentage between 0%-100%). The player presented with the buy-out offer may decide if it will sell the ticket at the indicated value, not sell at all and retain 100% of the ticket and/or make a counter offer (i.e., such as a different percentage amount and/or a different value, etc.), as examples. If the buy-out offer is accepted, the player will receive the indicated value (which may occur in a variety of different ways as described herein). In certain examples, when a buy-out offer is accepted, the entity that initiated the buy-out offer will in return obtain legal ownership of the ticket from the player. In certain other examples, the entity that initiated the buy-out offer will not obtain legal ownership of the ticket, but merely obtain an entitlement (e.g., a contract) to obtain all or any portion of any future Jackpots, awards or other prizes, etc. (i.e., depending on the ticket percentage related to the buy-out offer) that may occur in connection with the ticket from the point of purchase moving forward. In certain other examples, the player may also have the option to offer (i.e., counter offer) or sell something different than the original buy-out offer, such as just a portion of a ticket in response to a buy-out offer. As an example, and without limitation, depending on how a desired system is set up, the player may have the option to provide a counter offer for consideration by the entity that initiated the buy-out offer (e.g., something different than the original buy-out offer, such as a different percentage of a ticket and/or a different designated amount for the value, etc.), and with the entity being able to accept the counter offer (or alternatively where set up in this manner, to otherwise deny or provide yet another counter offer back to the player, etc.). Similarly, where desired, rather than the entity providing the acceptance, the entity may merely provide an indication to the player that is agreeable to the terms and/or provide to the player a new buy-out offer along the lines of the counter offer, which may then be accepted by the player. However, it should be understood that this is merely a matter of logistics for how acceptance is to be made to a counter offer (either by the entity or player), but both approaches will accomplish the same objectives and may be utilized where desired. In addition to, or alternatively, depending on how a system is structured, the player may have the ability to sell something different directly in response to a buy-out offer, such as a different percentage of a ticket. As an example, and without limitation, in response to a buy-out offer for 100% of a ticket, a player may sell only 50% rather than 100% of a ticket, and the amount paid to the player would then be similarly reduced, such as being reduced proportionately by 50%, or alternatively reduced less than 50% if a premium was associated with the 100% buy-out offer, or any other desired amount depending on how a system is desired to be structured. As should be understood, and without limitation, a player may offer or sell in response to a buy-out offer any different percentage of the ticket in return for a percentage of the indicated value. The percentage of the indicated value may also vary as may be desired based on the percentage of the ticket offered or sold. For example, in certain situations, partial cash-in of a ticket may be proportionate to the ticket's full value, while in other situations partial cash-in of the ticket may not be proportionate with the ticket's full value, as the operator may want to incentivize certain behaviors around cash-in, according to particular preferences of the operator. In one example, sale of 50% of a ticket may correspond to 50% of the indicated value of a ticket. In another example, a certain defined "premium" may also be allocated against the player for a sale of less than 100% ownership of a ticket; for instance, sale of 50% of a ticket may correspond to payment of only 45% of the indicated value (with the premium corresponding to 5%), although as should be understood, the amount of the premium can vary and/or may also be adjusted based on the amount of the ticket sold, as may be desired (i.e., a lower premium the greater the amount of the ticket sold and the higher the premium the lower the percentage of the ticket sold). The premium may also vary, on the value sold or the proximity to the end of the game, as examples, and it would be expected that large sums and closer to the end of the game tickets would attract the biggest premium, as users should be less price sensitive.

In yet another example, where a player sells 100% of a ticket, they would receive in return the indicated value together with a "bonus" for selling 100% ownership of the ticket, and that bonus may be set at any desired value, such as a certain percentage of the indicated value of the ticket. In yet other examples, the buy-out offer may be for buying all or a portion of a ticket from a player. In another example, a player may receive a bonus for a partial-cash in, should there be a desire to incentivize a player to sell less than 100% of a ticket. Other variations are also possible according to the preferences at issue. In various examples, the buy-out offer may be initiated from any type of entity. For example, the entity could correspond to one or more parties of any type. This may include, for example, a private party or parties working in collaboration and/or a government or quasi-governmental party, etc. For instance, and without limitation, the party or parties may be the operator(s) of the network or just user(s) of the network.

By way of example, upon presentation of the ticket to one of the wager stations 14 or wager terminals 16, the ticket will be verified and the system will present the offer to purchase the whole ticket will be displayed on the display devices, and the player will have the option to accept or reject the offer via an input to the wager station 14 or wager terminal 16. The player can also respond, or alternatively be presented with the option, to sell any fraction of a ticket he/she wishes to sell through the wager station 14 or wager terminal 16. The player may also be able to respond, or offered the option of, selling different fractions of the ticket at different stages or after respective legs of the pool event. For example the player may sell 10% after fourth leg, another 20% after the fifth leg and 30% after the sixth leg, thereby still retaining 40% of the original ticket to the conclusion of the game after the seventh leg.

As another example, if after 5 matches (or legs) of a 6 match pool there are 3 remaining tickets that have correctly identified the outcomes of the first five matches (or legs), and all having an equal chance of winning the $1 million Jackpot Pool, then the server system 12 may calculate that each ticket has an actual value of $100,000. This would be the case if each person held an outcome in isolation of the other two tickets, and then the probability of each of the three owned outcomes was 10% or a price of 10.0 in decimal terms. Upon application of a risk factor and/or margin discount, the server system 12 would establish an attributed value and then communicate an offer to purchase the respective tickets to each of the ticket holders, at a price of for example $80,000 for each ticket, representing a 20% margin for the purchaser. The offered amount would represent a substantial return on a $2 ticket, and removing significant volatility for the player, that was one step from winning $1,000,000 but also one step from winning nothing. The offer may be for 100% of the ticket, or alternatively could be for a partial portion of the ticket, for example an equal fifty percent share, at $40,000. In this option, it is contemplated that various percentage offers could be made, for example any 10% interval from 10% to 90%, at an appropriate monetary amount. Thus, the player in the above example could sell 10% of the ticket for $8,000 and retain the potential of receiving 90% of the $1,000,000 Jackpot Pool.

It is also contemplated that the server system 12 will have the ability to receive additional data via the input device 26, for example various odds on respective wagers concerning the sporting match or event, that may impact the attributed value calculated for any given ticket. That additional information could be used to calculate with greater precision the potential odds, and attributed value, of the remaining tickets after each round or leg of the pool. Thus, in the example above, if one of the remaining 3 potentially winning tickets has predicted the final score of the final soccer match as 2-1, while another has selected the final score as being 1-10, then the more likely score of 2-1 will have a higher attributed value than the ticket having selected 1-10. In that event, the ticket holder of the 2-1 score match may be offered more, as that ticket's attributed value (or expected value in mathematical probability terms) will be higher.

To further explain the example, the outcome probability factor (OPF) and the Expected Value (EV) of two respective tickets with the following score predictions may be set as:

2-1 price (OPF?)=10.0, and 1-10 price (OPF?)=1000 (as it is an unrealistic score but useful for this example), with EV=1,000,000 (POOL)/Price of outcome/number of tickets holding that outcome.

Therefore, the ticket with the score of the final leg being 2-1 will have an estimated value in a $1,000,000 pool calculated as 1000000/10/1=$100,000 while the ticket with the score of the final leg being 1-10 will have an estimated value in a $1,000,000 pool calculated as 1000000/1000/1=$1000. Therefore the person having the ticket predicting the 2-1 outcome will be offered in the region of 100 times more for his ticket as his ticket is 100 times more likely (than the ticket with the 1-10 score) to win the $1,000,000 jackpot.

This mathematical calculation of EV for fair value can be extended to the entire range of tickets that exist and extended backwards to the tickets remaining after the very first leg if appropriate. The ticket holders could be offered "cash in" values at any time, such as from as soon as is acceptable and viable. In certain examples, it is envisaged that cash in circumstances will increase later in the game when the potential values begin to rise significantly. In addition, in certain examples, games may include a Consolation Pool and/or a Bonus Pool in addition to a jackpot. Also, in certain examples, the ticket cash-in or buy back may include the purchase of the rights to other pools. As merely an example and without limitation, in games where there is a Consolation Pool and/or a Bonus Pool in addition to the jackpot, the ticket cash-in or buy back may include the purchase of the rights to the other pools, and the price offered will include the EV/FV/theoretical value of the bonus ticket (and any potential dividends from the Consolation Pool) given the live tickets remaining. As should be understood, in other examples, the ticket cash-in or buy back may still include the purchase of the rights to other pools even where no Consolation Pool and/or a Bonus Pool is provided.

As another option in the system, the buy-back or cash-in offer may be staged as an iterative bidding process. Thus, even after a first offer is made and rejected, the operator may elect to make another higher offer upon a subsequent presentation of a ticket. However, the holder of the ticket will not necessarily be given a second offer once the first offer is rejected so that the ticket holder will be unaware of whether a greater offer will follow or if they will be locked into the "hold" position until the conclusion of the next match or leg of the game.

An output device such as televisions 24 may also be coupled with the central server system 12 computers 120 and configured, for example, to display the pool of betting combinations and a representation of the tickets or wagers that are active in the system resulting from the bettor-selected game predictions and the results of the respective games or events that have been completed which form part or all of the pool events. Such an output device 24 may also include, for example, a visual display and/or a printing device. Additionally, such an output device 24 may be configured to display the results of an event taking place at a remote venue, such as the event forming the next leg of the pool. Thus, a betting parlor may have a series of televisions and monitors broadcasting the event (i.e., a soccer match), while also displaying streaming data concerning for example the number of tickets that remain in the pool, alerts when a goal is scored that eliminates tickets from the pool, and potentially the offers to buy outstanding tickets.

The wagering stations 14A and wager terminals 16A may be located at a first venue, while other wagering stations 14B-14N and wager terminals 16B-16N may be located at other remotely located venues. Thus, the network formed of the plurality of wagering stations 14A-14N and wager terminals 16A-16N may enable wagering on, and monitoring of, events at multiple venues substantially simultaneously if so desired. Accordingly, it is contemplated that the operator could have wagering stations 14A-14N and/or wager terminals 16A-16N in multiple locations within a city, or multiple locations within a state, country or region, so as to allow pooling of bets in the game across a significant population to drive the amounts of the Jackpot Pool to substantial values for each individual game, series of events/matches.

In another embodiment, the wagering stations 14A-14N may be located in a single venue such as a race track where, for example, a first wagering station 14A acts as a server for all of the other wagering stations 14B-14N networked to it for conducting the pool wagering activity, with wagering stations 14B-14N acting as terminals coupled with the server of first wagering station 14A.

It may be appreciated that the wagering activity and buy-out option according to the present disclosure may be effected in a specific environment at a specific location on a stand-alone (or closed) system or may be electronically linked to include play in a plurality of environments or at a plurality of locations. For example, the wagering stations 14A-14N and wager terminals 16A-16N may be distributed throughout a variety of wagering venues including race tracks, off-track betting facilities, retail establishments (where legal), casinos, lotteries, and on the Internet. Further, such wagering activity and evaluation thereof may provide automatic and immediate performance feedback (individual and team performance, leader boards or other indicia of participant standings, contest time remaining, account balances, etc.) to participants via text messaging, cellular telephones, PDAs, interactive television, email, Internet browsers or other applications. Here again, the wide distribution of available outlets and devices for entering into the game is intended to allow pooling of bets in the game across a significant population to drive the amounts of the Jackpot Pool to substantial values for each individual game, series of events/matches.

In a sports or event based wagering environment, the product concept can be applied to a number of different sports and markets. For convenience, the first implementation of the product will be described with respect to a series of soccer correct score and "Home/Draw/Away ("H/D/A") markets pooled and bet on a weekly basis. The system operator will select multiple game (three, four, five, six or seven or more games) that will occur over the following days or a weekend. For example, the system operator may select three games on a Saturday, two games on a Sunday and the final one or two games on a Monday. Players will be challenged to select the correct score for each of the games. To win the Jackpot Pool, the player must select the correct score of each of the six or seven games. The cash in function described herein may be applied even on low leg games such as a pick 3.

Accordingly, the system operator may offer several different multi-leg outcomes. For an exemplary description, a version of the pool wagering system will be described using a six leg correct score game run over six soccer matches. However, it should be readily apparent that the pool wagering system may be adapted to a PICK-n correct score model. In this example, it is assumed that the most likely result in any soccer match will have a high score of three for either team, as shown in FIG. 4 which shows the total goal expectancy over six years for six premier leagues and the world cup. In the six leg pool wagering system, each leg may consist of seventeen outcomes, these being 1-0, 2-0, 2-1, 3-0, 3-2, 3-2 and "AOH" (any other home win) then 0-0, 1-1, and "AOD" (any other draw) and the reciprocal away results, to allow each leg to consist of 17 outcomes. The inclusion of terminal group scores "AOH, AOD, AOA ensure better user experience and manageable number of probable selections. Such group could easily be extended to point spreads in games like basketball or any others, where the selections might be minus 25 points (−25), minus 24 points (−24), minus 20 points (−20) . . . plus 20 points. (+20), plus 24 points (+24), plus 25 points (+25), etc.

It should be understood that the foregoing is exemplary and the potential outcomes can be varied and may not be consistent over various leagues where the number of goals scored may be higher on average. The alternative anticipated scores for such a league may only influence the distribution, but not the applicability of the game, which will have a set of probabilities for each respective outcome that may be league dependent.

It is contemplated that the operator may provide that the minimum amount of the "Jackpot Pool" is guaranteed at a set level, and most of the other bets offered could be guaranteed to insure first day retail popularity. Those players who correctly select scores and winners of each leg will share the maximum of either the guarantee, or the stakes of all the others (less any applicable deductions) and also gain entry into a bonus pool. The Bonus Pool may be won or shared by any individuals that successfully choose one or more correct score(s) the following week, or a nominated time or similar.

A Consolation Pool may be shared by those who select all the correct outcomes (H/D/A) or another subset of the correct score game, or on other variations based on, for example, any five of six or six of seven. The player in this example will not need to nominate H/D/A but his correct score prediction 'Home 2-0' will naturally be allocated to a "Home" outcome in the H/D/A determination of the Consolation Pool. As such on a correct score pick 7, 7 correct H/D/A results in-line with a player's CS selections will mean the player "wins" the consolation prize. In racing terms, the consolation will frequently be based on the horse, dog, race car driver, etc. placing as opposed to winning.

As each match is played—and each goal is scored—player bets represented by their respective tickets will gradually be eliminated from the remaining tickets that can still win the Jackpot Pool. Those that remain will be able to anticipate that the value of their tickets increases as they see the results of each game. The central server system 12 may be configured to allow the display of the tickets that remain active for the Jackpot Pool on each of the wagering terminals or alternatively a display board at distributed wagering locations as commonly provided in present establishments for example to display soccer matches, racing events and available wagering events and odds. While the flagship of the pool play will be the Jackpot Pool for correctly selecting the six or seven correct scores, other games such a pick three could also be offered to be completed within a single day or short time period.

Between legs, and preferably after several of the games or matches have been completed, but potentially also during the course of an event for example at the half-time of a match or event, players with "live" tickets may be offered the option of selling all or a portion of their tickets back to the system operator (or alternatively, directly or indirectly through the system operator, or directly to, any designated third party, such as, without limitation, one or more third party operator(s), business entity or entities such as a merchant(s), one or more other persons, etc.) or to retain their tickets and see whether their correct score predictions will unfold for the remaining games. As should be understood, any reference to system operator herein should be construed to apply equally to any third party as an alternative, even if not specifically mentioned. The buy-out option will preferably be communicated through the wagering station 14, wagering terminal 16, or internet connected computing devices 18-24 from which the respective wager was placed and ticket purchased. However, as the wagering stations 14 wagering terminals 16 may not be accessible to the player, it is further contemplated that at the point in time that the player places a wager in the pool play of the present disclosure they will provide contact information to allow communication with their computing system 18 that is linked on the central server system 12 to the particular ticket. Thus, the central server system 12 will be able to send a message to the ticket holder's computing system 18, smart phone 20, or tablet computer 22, providing details of the buy-out offer. If the ticket holder decides to cash in the ticket in response to the offer, the ticket holder may communicate the acceptance via the computing system 18, smart phone 20, or tablet computer 22, to the central server system 12. Alternatively, the ticket holder would present the ticket to one of the wagering stations 14 or wagering terminals 16 which in turn communicate the acceptance to the central server system 12, and upon verification, provide the ticket bearer with a payout in the form of cash, a voucher or check. If necessary or appropriate in the respective jurisdiction, the amount of the payout may be reduced in an amount required to be withheld for tax purposes.

It is anticipated that for the pool wagering system with the buy-back option of the present disclosure that there will be an initial guarantee by the operator of the Jackpot Pool in an amount sufficient to create initial interest, for example $1 million. Thereby, Jackpot Pool winners will always be guaranteed to win all or a share of a Jackpot Pool equal or in excess of $1 million. In a first embodiment of the system and product, with respect to each ticket purchased the split following the takeout (e.g., set at 25%) may be as follows: 75% to fund the Jackpot Pool, 15% to fund the Bonus Pool, and 10% to fund the Consolation Pool(s). Other splits may be desirable and are expressly contemplated. Therefore if $250,000 (i.e. 125,000×$2 per ticket) was bet into the pool in the first week, the Jackpot Pool would stand at $140,625 (i.e. $250,000×0.75×0.75=$140,625), but any winners would share in the $1 million guaranteed Jackpot Pool. Any winners of the Consolation Pool (i.e. those selecting five out of six of the correct scores accurately) will split a share of $25,000 between them less deductions (i.e. $25,000×0.75). The following week, winners would get the opportunity to select a correct score (for each successful ticket) from a featured match to be in with a chance of winning the Bonus Pool. Anyone who correctly predicts that correct score would therefore net a share of the Bonus Pool.

Should the Jackpot Pool and Bonus Pool not be won for a few weeks, then those pools may build up to very significant amounts. For example, if players bet a total of $3,000,000 into the Jackpot Pool (over a period) but fail to win the main Jackpot Pool prize, then a total win/jackpot payout of $2,250,000 will have built up and any winners the following week Jackpot Pool winners will get a share of that amount plus a share of the amounts staked in that week. Therefore, if another $3,000,000 is bet into the Jackpot Pool then the potential winnings will stand at $4,500,000. Should three people win the game, then they will split $4,500,000, giving them $1,500,000 winnings each (less their price of purchase and/or deductions other than the takeout, if applicable). The Consolation Pool will have been won previously—in all likelihood—and will for example stand at about $300,000 from the current week's stakes. If 30 players select five out of six correct scores that week, then they will win $7,500 each. The Bonus Pool will not have been won (yet) and will stand at $900,000. The three winners will have the chance to win the Bonus Pool in the next week, each getting one selection.

As the matches or games for each of the respective tickets are preferably staggered over 2, 3 or even 4 days (typically 3 days Saturday to Monday), the system operator will have the ability to communicate to the respective wagering outlets or through an online interface to offer players the ability to sell back any tickets which are still 'live' after one but preferably several of the matches as discussed above. In other circumstances, such as in tennis as an example, buy-back of tickets may be enacted intra leg (between sets or games), or in later legs. In football, for example, buy back may occur during live play.

To further illustrate, if a player has a ticket where the first three matches/games on a Saturday were predicted correctly, he/she will have the facility to sell back to the system operator the same ticket and close out their position before Sunday's matches. The buyback value will be calculated by the server, potentially under the control of the system operator or the business partner, based on the number of match legs the ticket has already correctly predicted plus the remaining predictions for the subsequent games. When a ticket is cashed in (i.e. bought back by the system operator), the ticket and all the rights of the ticket will vest in the system operator. In addition, this buy-out facility will include a margin for the system operator, anticipated to be around 15%.

For example, if, going into the Monday night games, a player has two tickets which are still in play, and their predictions for the final two matches are 2-3 and 1-0 on one ticket and 2-2 and 1-0 on the other ticket, they will have the option to cash in either or both of their tickets. The server system under the direction and control of the system operator will calculate the estimated odds of winning the pool (and pay-out) with either ticket and will offer a buyback value to the player. The mechanism will be clearly explained to players who can opt to either exercise the opportunity to sell back their position or stay in the game until the end. While as noted above the central server system 12 may have the ability to provide information on the number of tickets that are still in play after each leg or match in the pool, it is also contemplated that the information may or may not be communicated to the respective ticket holders who receive the buy-out offer. Thus, the ticket holder may not be aware that there are only a few as opposed to dozens of still viable tickets in a given pool when the buy-out offer is communicated. If the player is given some information for transparency, it may or may not be leg by leg information, and as such he might know how many tickets remain but he cannot know if he owns the exact permutations he owns unless the game is in the final leg. It may however be beneficial to communicate with the holders of every remaining live ticket the exact number of outstanding live tickets, and the scores those tickets have allocated in each leg. The only time the disclosures may not be communicated will be during concurrent games. The information, if given leg by leg, gives 100% clarity on the potential to split the jackpot once published for the final leg. Individual permutations and their ownership level may or may not be given, but they potentially could be.

It is also envisioned that cash-in buy back may also operate during live play and offer continuous cash-in ability as soon as it is technically possible, for example at the half-time of a match or during the running of a match when possible. It is also contemplated that a ticket could be purchased with two or more potential outcomes selected for the final legs or events, for example by paying twice as much the player could have one selection in each of the first five legs and then have two different selections for the sixth leg. In such an event, the system may offer to buy both outcomes, or each outcome and thereby divide the ticket as between the original player and the system operator. This type of fragmentation of the tickets could be extended to any leg of the event.

The ticket buy back process may include an interactive process that bids the ticket holder in a sequence of events for the ticket. For example, the system operator might originally offer the client $100,000 for a ticket that has 5 correct scores, if the client declines to sell the ticket, the system operator might revert to offer $105,000. At each step the ticket holder may not be aware if that is the final buy-out offer or a better buy-out offer will occur. In certain examples, there may also be only a limited number of buy-out offers made and/or capable of being accepted with respect to a particular game or games, (i.e., made to/accepted by players participating in a particular game), so the greater the number of buy-out offers declined by a player and/or longer the time period before a player accepts an outstanding buy-out offer, the greater the risk may be that no additional buy-out offers will be made to that player or an outstanding buy-out offer made to a given player may be withdrawn (i.e., once the maximum limit is reached). Furthermore, the ticket holder may have the period between the offer and the start of the next leg of the bet in which to make up their minds. Once the next leg has started, buy-out offers may be automatically withdrawn. It is further contemplated that the ability to trade or sell tickets back to the system operator may be continuous, and also in these circumstances, the bid may be extremely time sensitive. Additionally, as discussed above, the player or ticket holder may have the option to sell a fraction of their ticket to the system operator or other third party. In the first instance, this facility may be limited where desired, such as to 10% fractions. A player that sells a portion of his ticket back to the system operator may then only get paid in respect of the remaining fraction of the bet should the ticket be successful. The system operator may pay the other portion to itself (or the third party ticket purchaser) if that ticket was successful.

If a player retains a portion of a ticket that is successful and thus entitles him to play a bonus game, in certain examples, the player will be allowed one selection (or other desired selection amount(s)), but will only win the fraction of the Bonus Pool that he holds in the winning ticket. In other examples, a player may be allowed to decouple a ticket, such that a player may accept a full or partial buy-out of only certain parts of a ticket (i.e., for a given Jackpot, or only certain events listed on a ticket, such as particular games) and with the remaining parts of the ticket being unaffected, so that the player retains the entirely of these remaining parts of the ticket (i.e., such as a bonus and/or consolation pool, or any other events listed on a ticket, such as remaining games). As mentioned above, when a ticket is cashed in (i.e. bought back by the system operator), the ticket and all the rights of the ticket will vest in the system operator. As such, the system operator would hold the other portion of the ticket and be entitled to select an outcome in the bonus leg and win the portion (or whole) bonus. It is contemplated that where the system operator holds a whole or part of a bonus ticket, they will need to nominate their selection earlier than the remaining players, for example, the system operator must nominate their selection 2 hours prior the start of the bonus game, and members of the public will only need to offer their selection 1 hour before. This rule would help ensure that the system operator's selection cannot be made with the prior knowledge of the public selection. As a default, any player having a valid qualifying ticket that does not make a selection in the Bonus Pool for their bonus ticket will be allocated a selection having a high probability, for example a 1-1 draw. This may be provided in the terms and conditions ("T&Cs") of the game.

In the context of a lottery game, in certain implementations any player having a valid qualifying ticket that is not present or found in time for the cash-in phase will be deemed not to sell. In the context of slot games, in certain implementations if a timer expires, the player will have been deemed not to have sold. Thus, generally speaking, if a player does not give input or is not present to make a decision as to what he/she wants to do, the game will proceed as if player does not want to sell.

In a first implementation it is anticipated that only the system operator will be able to offer the buy-out option to the active tickets holders using the central server system 12 to communicate the offers. However, it is also contemplated that the system operator may use the central server system 12 to solicit offers from third parties that would be communicated to the active ticket holder. In this embodiment, the central server system 12 could communicate the details of the outstanding active tickets through all or a select number of wagering terminals 16 and allow bids for the outstanding active tickets to be submitted via the wagering terminals 16. As another alternative embodiment, it is contemplated that the system operator could facilitate the ability of members of the public to buy and sell active tickets like in the manner of a person to person betting exchange, such as, without limitation, of the type offered by Betfair. Thus, it is also contemplated that the central server system 12 could allow the posting of available buy-back options so that the public could place buy-back offers for example though the wagering terminals 14 and the ticket holder could select the buy-back bid of his or her choosing.

Figure 5:
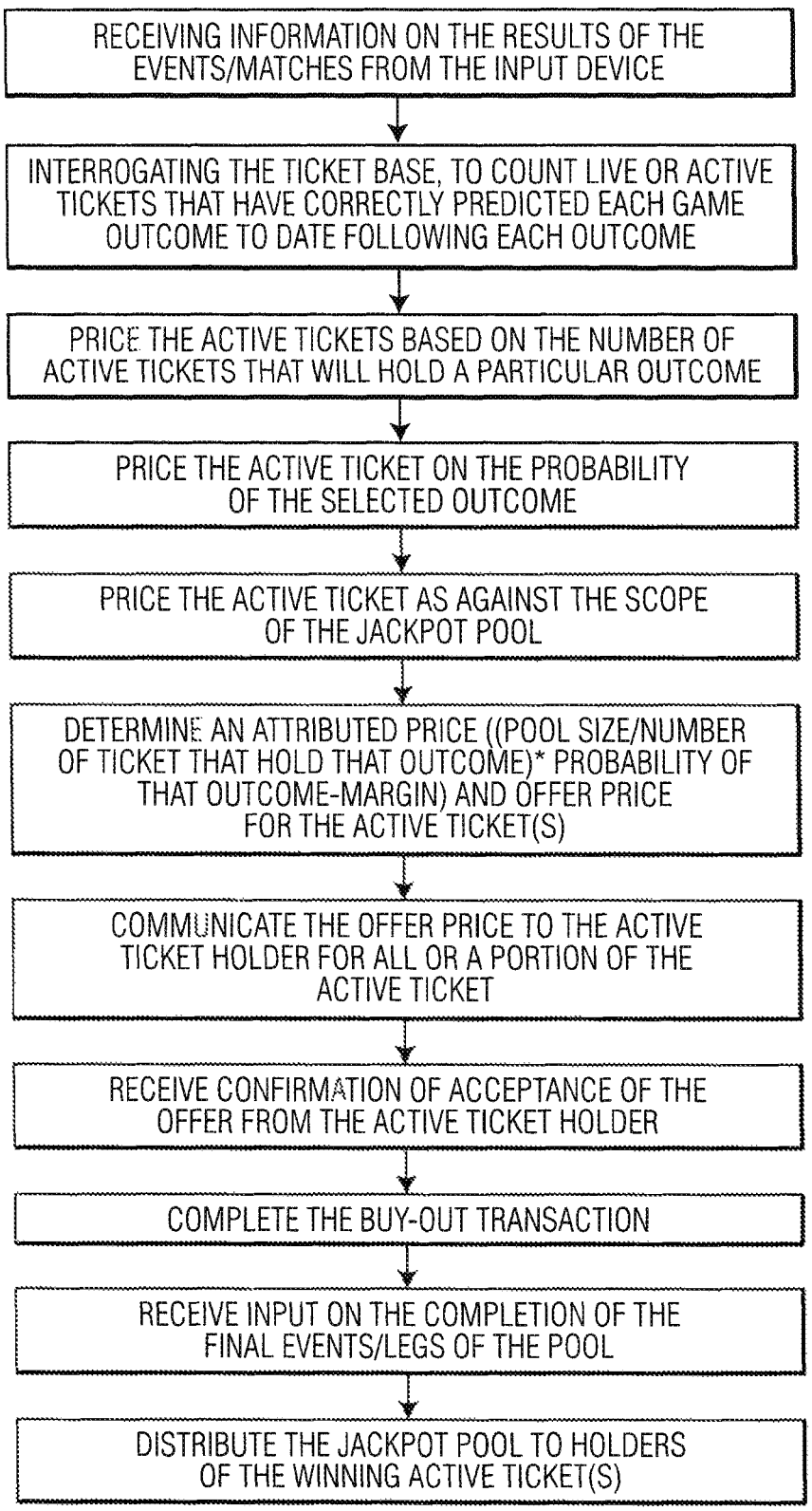
FIG. 5 is an exemplary flow chart of the logic of the software subroutine program of the central server system.

With the foregoing description of the implementation, it may be appreciated that during the course of an exemplary wagering event (e.g., such as a pool, a parlay, an accumulator, etc.), the central server system 12 may go through certain of the following process steps, and in one or more rounds as may be required to complete a particular wagering event, as shown in FIG. 5, comprising:

a) receiving information on the results of the events/matches from the input device;

b) interrogating the ticket base, to count live or active tickets that have correctly predicted each game outcome to date following each outcome;

c) price the active tickets based on the number of active tickets that will hold a particular outcome;

d) price the active ticket on the probability of the selected outcome;

e) price the active ticket as against the scope of the Jackpot Pool;

f) determine an attributed price ((pool size/number of ticket that hold that outcome)*probability of that outcome−margin) and offer price for the active ticket(s);

g) communicate the offer price to the active ticket holder for all or a portion of the active ticket;

h) receive confirmation of acceptance of the offer from the active ticket holder;

i) complete the buy-out transaction;

j) receive input on the completion of the final events/legs of the pool;

k) distribute the Jackpot Pool to holders of the winning active ticket(s).

Further, the concept and system disclosed herein can be adapted for other multi-outcome wagering scenarios and may include any desired manner of wagering, including but not limited to those that accommodate accumulator or parlay wagering, as an illustration. For purposes of this disclosure, a parlay or accumulator wager comprises a single wager that links together two or more discrete events and in any combination (e.g., legs or divisible portion thereof) and is dependent on correctly selecting the outcome of the two or more discrete events. For instance, a parlay or accumulator wager as referenced herein may include a double, treble or any other type of multiple wager as may be known in the art. As one example, an accumulator or parlay may have much higher payoffs than wagers placed on individual discrete events since the difficulty of hitting it (i.e., correctly selecting all event outcomes) is much higher. If any of the discrete events in the accumulator or parlay lose (i.e., the selected outcome is incorrect) the entire accumulator or parlay loses. In certain other examples, where the parlay or accumulator wager includes combinations of discrete events, and one or more of those combinations lose, the player may be still eligible to win some portion of a jackpot, a consolation, or some other award as may be desired. Thus, in the context of the present disclosure, an accumulator or parlay wager may be placed on a multi-leg event (either in the entirety or a designated portion or portions of legs, etc.), such that the outcome of each leg corresponding to the accumulator/parlay wager must be correctly selected for the accumulator/parlay wager to be eligible for a designated prize or award (e.g., a jackpot) or portion thereof. In certain examples, the parlay or accumulator wager may be selectable by at least one of a player, a third party, the wagering system or some other manner as may be desired. Notably, for example and without limitation, the terms wagers, wagering, bets and betting as referenced herein may include, without limitation and for illustration purposes only, single wagers, multiple wagers, full cover wagers, full cover wagers with singles, 'Any to Come' (ATC) or 'if cash' wagers, specialty wagers, forecasts, fixed, variable, guaranteed, parimutuel wagering, fixed-odds wagering, and any other variations known in the art, etc., alone and in any desired combinations. For example, multiple wagers may include a parlay or accumulator wager.

As another example, a multi-outcome wagering scenario may include slot machines. In this alternative, the system could be incorporated into any type of slot machine game, such as a progressive jackpot played for example on a slot machine 26 as depicted in FIG. 1. In this example, each reel or defined number of reels of the slot machine 26 may correspond to a different leg of a multi-outcome wagering event. As noted above, each reel may be a virtual reel (as in a video or electronic slot machine, for example) or a mechanical reel as in conventional slot machines. Further, any of the type of wager input devices described above in connection with FIG. 1 may be used, or alternatively a conventional slot machine may operate as the wager input device. In addition, there may be a plurality of slot machines 26 provided for participation by multiple participants, and each of the slot machines being in communication with a server system controller. Currently, slot machine based games have an outcome which is determined almost immediately even though the machine may take a few seconds to display the results. Even in the present systems, the game is complete before a person has the chance to realize that they are getting closer and closer to the premier prize. In most examples the reels stop one by one, with only 1 second or so between each reel. However, the display of each reel stopping is primarily for effect as the outcome of the game is determined by the random number generator in the game controller shortly after the play is initiated.

The present disclosure may be implemented in various configurations for gaming machines or wager terminals known in the art, including but not limited to a dedicated gaming machine or wager terminal, wherein the computerized instructions for controlling any games (which are provided by the gaming machine or wager terminal) are provided with the gaming machine or wager terminal prior to delivery to a gaming establishment, and a changeable gaming machine or wager terminal, where the computerized instructions for controlling any games (which are provided by the gaming machine or wager terminal) are downloadable to the gaming machine or wager terminal through a data network when the gaming machine or wager terminal is in a gaming establishment. These types of gaming machines and their respective operation in both stand alone and pool or progressive games are disclosed in detail in U.S. Pat. No. 8,105,149, incorporated herein by reference.

By incorporating the concept of the present disclosure, the slot machine could be programmed such that once a first level of jackpot indicators appear in a winning sequence according to a first random number generation, the selection and display of the remaining indicator or indicators is paused and an offer to buy-out the player is presented. For example, a person with four "$" on the first four reels and the last reel spinning is one step from a jackpot, (e.g. $2,000,000) and if the machine has a 20/1 odds to get the last reel on a "$" then the operator could offer to buy-the spin for $100,000, or any fraction of it for the proportionate amount. If the player accepted the buyout, the machine would print a cash-out ticket for the buyout amount. The player either accepts the offer, in full or in part, or rejects the offer whereupon the random number for the remaining wheel is generated and the spin is completed. If the buyout was accepted and the final indicator selection results in a win, then the operator banks the amount of the jackpot. If the player sells only a fraction of the potential jackpot, then the player receives credits, either on the machine or in a ticket print, of the fractional remainder and the operator banks the balance.

It is anticipated that the concept will provide great drama and a limited period for it to be resolved, and allow players to trade and control their fate. From an operator standpoint, there may be a limit on the duration of the buyout offer, for example thirty seconds or one minute. This may be counted down for the player on the display, so that the player is forced to make a decision or simply allow the time to expire and the last indicator to be selected. While in theory the system could be used as soon as a single indicator is selected, it is believed that the system is more practically implemented when there are several indicators that must align before extending the final spin to provide the buyout or trade-in option. Thus, it is contemplated that the option would not be provided until the bet/selection has been 70-90% resolved or else the value of the buyout option is not sufficient to entice the player to cash-out and the progress and rate of play may be unacceptably slowed down.

The slot machine based system provides additional benefits to the house or casino in which the machine is located. First, for an in-house only progressive or pool game system, the buy-back option allows the house to bid on and potentially receive (if the bid is accepted) the accumulated jackpot pool. In addition, in the event that the jackpot pool is a progressive or pool game distributed over a number of properties, so that the jackpot pool will grow faster or in the event that a gaming machine manufacturer licenses the use of the machines across various properties, the casino hosting the game (or the gaming machine OEM) may offer the buy-out of the jackpot pool option at the termination of any spin, including the first spin and, again if the bid is accepted, the casino making the offer would receive the jackpot pool as if it were the player who had won. In this situation, the host casino would generate revenues from the game play contributed to the jackpot pool that occurred in other casinos. They can also make money by buying back at less than actual value, i.e., charging margin on the sold ticket or fraction of a ticket In accordance with the buy-out pool option of the present disclosure, the cash out button of the gaming machine 26 may be illuminated when the first sequence of the display for example the first three of four reels align such that the player may be on track to win the Jackpot Pool. In that event, the central server system 12 or the wager terminal itself causes the display to present a buy-out offer to the player. If the player elects to cash-out, the player may push the cash out button and cash out to receive a cash payment or other suitable form of payment corresponding to the offer presented on the display, whereupon the remaining random selection is made to determine if the Jackpot Pool is won.

In one embodiment, the player may be offered the option of cashing out a percentage of the potential Jackpot Pool, for example by depressing the cash out button the players sells 10% or 25% of the potential Jackpot Pool for the amount offered on the display. If the player for example sells 50% of the Jackpot Pool opportunity for $50,000, the player will be issued a credit for the $50,000 and then the remaining wheel spin or leg is completed. If the result is a win of the Jackpot Pool, then the player will receive credits for 50% of the Jackpot Pool, while the operator or house retains the remainder.

When the player decides to end the game play, he can select the cash out button at which time the player may receive cash or other payout mechanisms such as tickets or credit slips redeemable by a cashier (or other suitable redemption system) or funding to the player's electronically recordable identification card or the player's online account.

It is further contemplated that the jackpot buyout option and the concept and system disclosed herein can be adapted for a variety of other 'multi leg,' multi-outcome wagering scenarios, such as, for example, keno, poker, racing, video games (including live and online video games, as examples) and lotteries, including but not limited to private, public, state, national, international, social (e.g., health care or social lottery types) or any other type of lottery systems, etc. For example, in a lottery system, after the periodic ticket purchase interval, the lottery operator may draw a defined number of items, such as numbered balls. As should be understood any indicators other than numbers may also be utilized where desired, such as symbols, colors, pictures, etc. In addition, the game may comprise items other than randomly drawn balls where desired, or pre-printed numbered tickets, that then may be selected by balls or random numbers or other process. Any of the type of wager input devices described above in connection with FIG. 1 may be used, or alternatively a conventional lottery machine may be utilized for input of player handpicked numbers, for providing electronically generated numbers, such as quick pick or smart pick numbers, and providing a record of the lottery numbers for the player, such as by printing of a ticket. In addition, a plurality of wager input devices or lottery machines may be utilized and each in communication with a server system controller. The total amount of numbered balls making up the lottery system may be any desired number.

In addition, the lottery system may be comprised of different legs by having one or more balls drawn at any given time that make up each leg. In this example, each of the balls may be selected in any desired manner, such as being hand selected from a container or selected via conventional lottery machines, such as gravity pick machines, air mix machines, or via computerized random number generators, as examples. The lottery system could also be set up in any desired manner for how players may win. For example, it could be an all or nothing arrangement where a player must win all legs to win a final Jackpot, or win a defined number of legs to win one or more interim Jackpots before all legs are completed, etc.

In addition, a buy-out offer (or partial buy-out offer) may be made at any time after a ticket is obtained until completion of the event, including (without limitation) after a predetermined number of numbers have been drawn, to a player and the player may sell all or a portion of their ticket. The buy-out offer may also come from a single party or multiple parties; for instance, multiple parties operating in collaboration or multiple parties that may not be operating in collaboration (for example, where the lottery system may "bring" certain parties together for purposes of accumulating adequate resources for purposes of a buy-out offer being made). In certain examples, the party or parties buying all or part of the ticket in response to an accepted buy-out offer will obtain legal ownership of the ticket (100% ownership or a fractional ownership share where only a part is sold, i.e., where both the buyer and seller will end up with part ownership), and will be entitled to win at least a portion of any future Jackpots or other prizes that may occur from the point of purchase moving forward (or even share in the proceeds of prior Jackpots or prizes if set up in that manner). In certain other examples, the party or parties buying all or part of the ticket in response to an accepted buy-out offer will not obtain legal ownership of the ticket, but merely obtain an entitlement (e.g., a contract) to win at least a portion or all of any future Jackpots or other prizes that may occur from the point of purchase moving forward.

As should be understood, wherever the term "party" is used throughout this disclosure it should be broadly construed to comprise a single entity or plurality of entities. Also, it should be understood that both the player or ticket owner as well as the party making the buy-out offer may be comprised of a single entity or a plurality of entities.

The value or price of the buy-out offer and/or ticket sold may be variable as may be desired. For instance, the value or price of the buy-out offer can be set by various sources, and be based on any objective and/or subjective standards, such as an auction, a calculated probability (e.g., of winning one or more legs of a multi-outcome wagering event), random-number-generated probabilities, a lottery system similar to server system 12 discussed above, a party or parties initiating the buy-out offer, an independent third party/parties or resource(s), such as the system operator, the seller of the ticket, and/or it may be the byproduct of negotiations or a barter between the buyer and seller to arrive at an acceptable price, etc. In addition, the value or price can also be affected by the number of parties receiving a buy-out offer; for example, an amount X where there is one party and X divided by 3 where there are 3 parties, etc. As for timing, the buy-out offer could be made prior to any legs occurring or at any time prior to completion of the event, such as between any of the defined number of legs, and may be made just to winners or to any other parties, such as partial winners or to players who have not won at all, but who still have an active ticket, such as before any legs have been completed or a ticket that has separate divisions, etc. In addition, the value or price relating to a particular buy-out offer (or ticket sold) may be represented, conveyed or otherwise characterized in any desired manner, such as, and without limitation, as a jackpot or portion thereof (e.g., as at least a portion of at least one jackpot; for example, a designated jackpot that may be smaller (i.e. in value and/or price) than a larger jackpot that may be available to a winner/winners of a multi-outcome wagering event and set by any of the various sources above), as a prize, a payment, an award (e.g. monetary and/or nomnonetary awards, such as those described above), or any other suitable manner. Separate and apart from buy-out offers, tickets may be exchanged or transferred from one player to another or to any other party or entity type and at any desired time, and with legal ownership also being transferred at the same time. In some circumstances there may be merely an exchange of tickets and no other value or payment made from one party to another. In other circumstances there may be a value or payment made from one party to another, which can comprise anything the parties may agree to, such as some form of monetary payment or credit, or some other form of "value", such as, without limitation, any goods or services or incentives, etc.

In one example of a lottery system, the first x number of balls would be drawn at one or more predetermined times, such as from one "barrel", which would correspond to one or more legs, and after a delay of a certain interval, such as one week, the last leg or bonus ball would be drawn. For instance, 5 balls would be drawn on a weekend day and make up the first leg, although any other day may be utilized as well, or even a shorter or longer interval, such as within minutes or hours, or a desired number of days, weeks, months or years. Also, as should be understood, the number of balls drawn making up the first leg may vary as well, such as fewer or more numbered balls. A determination would then be made as to the number of tickets having the correct numbers. This may be accomplished electronically via the server system controller. In certain examples, the determination may involve identifying tickets having all 5 numbers correct. However, in other examples, the determination may involve identifying those tickets that have some designated number of balls correct less than 5, such as 4 out of 5, or 3 out of 5, or 2 out of 5 or 1 out of 5, etc. In addition, in certain examples the particular order or sequence of numbers on a ticket are required to correspond to the order of the balls drawn to be considered correct. In certain other examples, the order or sequence of numbers on a ticket do not need to correspond to the order of the balls drawn; so long as the ticket contains the requisite number of balls that were drawn somewhere on the ticket (irrespective of the order drawn). Any number of the holders of tickets having the correct numbers may be provided with a buy-out offer, conducted as a fixed price offer (that may not be consistent to each player, if some players hold the same terminal number as others and as such are only eligible to share the jackpot), or as part of an auction system where a limited number of "buy outs" may be offered, as examples, followed by a drawing or drawings to determine the winners from the remaining ticket holders that did not accept the buyout offer. In addition, with respect to those examples where a ticket having less than all balls correct would qualify, the particular buy-out offer may be relevant to the number of balls that are correct, for example, a larger buyout offer the more correct numbers on a ticket, and/or entitlement to a larger or better prize or a bonus the more correct numbers on a ticket, etc. Alternatively, any of the players having winning tickets (or those having a certain amount of correct numbers) may qualify for a supplemental lottery drawing, which could be the final leg(s) of the lottery or a bonus round, as examples. For instance, the qualified players may select or obtain one or more additional number or numbers on a new ticket for purposes of the supplemental drawing. For example, the supplemental drawing could be in the form of a bonus ball, and the winner or winners matching the bonus ball would win or share in the Jackpot or a bonus Jackpot.

For instance, in this example, each of the holders of tickets having the correct numbers (or any other desired number of ticket holders) may be offered to attend the draw of the remaining number or numbers in an organized event, such as via a live event attended by all holders in person at a defined location, or attended by a communications medium from an offsite location, such via a video conference or web interface, such as Skype or ooVoo, as examples (perhaps the following week or other desired time). In addition, the live event could be made accessible for viewing by the public, such as an in person audience, or more generally viewed over any mass communications medium, such as broadcast over television, cable, satellite, the internet, radio, mobile communication device (e.g., mobile phones, tablets, computers, PDA (personal digital assistant), etc.), social media or any other desired medium. As an example, the lottery system may be set as a reality show that is viewed live or pre-recorded and broadcast over television or other medium to the viewing public. In addition, in this example, before the remaining number(s) are selected, the lottery operator may provide remaining ticket holders with a buyout option, available to a limited number of players or all of them on occasion. Further, in this illustration, a bidding process may be included as an option, which would have the effect to add drama to the conclusion of the game. For instance, the buyout bid could potentially be provided to all the people at the same amount for their ticket and let them rush to accept, and with the bidding process closed once a certain percentage have "sold" their ticket in response to the buyout offer, and then the last ball or balls would be drawn. As an alternative, for example to maximize interest and tension for television purposes, the bonus ball (or last leg or alternatively any other leg) may be determined by a multi-step process of elimination, resulting in one or more remaining numbered balls that are then used to compare against the players tickets to determine if there are any winners (i.e., removing one or more balls in each leg, and including a plurality of legs so that more and more balls are removed over time, until just a certain number of balls remain, such as one ball), rather than a process of selecting one or more balls in one action that are used to compare against the players tickets, but either process may be used as desired. Additionally it may be possible that between each elimination process or leg (or fewer than each but between specified legs) the individuals still eligible for a prize may or may not be offered an additional chance to "cash in their ticket" with a subsequent buy-out offer or offers, and the buy-out offers may also be increasing in value as their probability of winning increases as the event proceeds toward the last leg or bonus ball. Alternatively, the buyout offer could be provided to less than all players, at different times, at different amounts, and/or having a defined period of time for players to accept the buyout bid. It should be understood that the multi-step process of elimination may be used in any manner in connection with a lottery system, such as, including for either or both of any initial lottery drawings or any bonus drawings.

Further, the percentage of players required in order to trigger the close of the bidding process may be established at any desired value, for instance, ranging all the way up to 100% of the players that have accepted the buyout offer. The lottery operator may assume the ownership of the ticket from the players that have accepted the buyout offer. Any winners after the final number(s) are drawn would receive or share in the jackpot. If there is no winner, in one implementation the jackpot may be rolled into another game or event. Alternatively, players may also be allowed to sell a fraction of their tickets in response to a buy-out offer, to ensure the game is not 100% binary as an option, and with the proportion being any desired amount, such as being subject to commercial considerations of drama, and interaction of players.

Similar to that described above, with respect to a fantasy example, such as with any fantasy events, for instance, any fantasy games, a full and/or a partial buy-out/cash-in offer (and any desired number of full and/or partial buy-out/cash-in offers) may be made at any time and to any number of participants, for example and without limitation, until a designated action occurs or until a particular time period is met, such as completion of a fantasy league season, or any other desired criteria is met, including sub elements of a game such as time period or quarter or half, etc. As should be understood, the terms buy-out and cash-in as used herein have the same intended meaning. All other features and aspects as described above apply to a fantasy example in the same manner. For example, buy-out/cash-in offers may be made by any entity, including but not limited to any game operator(s) or through the game operator (or alternatively directly) from any third party or parties (e.g., one or more system operator(s), business entity or entities such as a merchant(s), one or more other persons, other player(s), anonymously, etc.). As should be understood, the buy-out/cash-in offers can thus come from any source, and also can be utilized in a variety of different implementations, including, as an example and without limitation, games that are organized specifically to have buy-out/cash-in as a feature (e.g., as arranged by a system operator), as well as games that are not originally organized to have buy-out/cash-in as a feature (e.g., where a system operator did not arrange for a game to include a buy-out/cash-in feature, but a third party, such as a competitor operator, makes a buy-out/cash-in offer to one or more of the game participants, and in this manner introduces the buy-out/cash-in feature into the game). Also, there can be any desired number of buy-out/cash-in offers that are made and/or accepted in connection with any event, such as any fantasy game(s), and between any desired number of entities, without limitation. In addition, the value or price of any full and/or partial buy-out/cash-in offers that are made may be based on a variety of factors, such as including the "performance" of a fantasy team, for instance, based on the ranking or total number of points accumulated by the fantasy team, or any other factors, including those described elsewhere herein as well as others that may not be described but suitable for use and implementation herein. In addition, as an example, a wager or similar may be placed by participants (i.e., via input devices similar to the wager input devices described above) and a prize, payment and/or an award may be paid out to any winner/winners. For illustration and without limitation, a wager and a prize, payment and/or an award may come in any desired form. As should be understood, for this example and elsewhere with other examples herein, the terms prize, payment and similar terminology as used herein should be construed broadly; as an illustrative example, such terms should be construed at least as broad to encompass each of the terms under the broad definition of award set forth herein. In addition, as should be understood, the value or price of any full and/or partial buy-out/cash-in offers and acceptances, as well as the form in which they may be made, should be broadly construed; for instance, the form may at least encompass each of the terms under the broad definition of award as well as other variations set forth herein or otherwise not described, but which may be suitable. For example, buy-out/cash-in offers and acceptances may cover a broad range of items that may be provided from one (1) party to another or others, or exchanged between two (2) or more parties that are involved in a transaction. As an illustration and without limitation, a buy-out/cash-in offer/acceptance may involve any monetary or nonmonetary value or item, etc. transferred from Party A to Party B in return for Party B's "ticket"; for instance, a payment, a new bet, property, etc. In addition, in certain implementations, it may also be possible for a transaction to involve Party B, in addition to providing their "ticket" to Party A, to also provide any monetary or nonmonetary value or item, etc. to Party A as well in connection with a buy-out/cash-in transaction. It is also possible to have multiple exchanges between parties in connection with a transaction or a series of buy-out/cash-in offers/acceptance to occur between parties, as may be desired and implemented. As another illustrative example, as described elsewhere herein, an award paid out to a winner/winners may also, where desired, be fixed (e.g. payout determined in advance and independent of the number of players participating or amounts paid in by participants), variable (e.g., payout determined by the amount paid in by participants) and/or guaranteed (e.g., payout determined in advance and takes into consideration amounts paid in by participants, and with a "host" being responsible for any overlay or shortage required to be paid to arrive at the guaranteed amount). As should be understood, any other suitable type of awards now known or to become known at some future time should all be construed to be covered under the present disclosure. For example, an award should also be construed broad enough to encompass a trading scenario, including but not limited to scenarios analogous to trades in commodities or derivatives that place a value on a particular commodity, derivative or portfolio, such as a fund; for instance, for purposes of executing trades between parties. Similarly, an award should be construed broad enough to encompass scenarios analogous to "remortgaging" or refinancing, such as may occur with any property, such as real estate, that allocates a particular value to property at issue, and at times with the objective to use the property as collateral. In the context of the present disclosure, a particular value may be determined and allocated in connection with any participant/player's game, position, wager(s), wagering, bets, betting, etc., and at any particular time, such as for purposes of determining the appropriate amount or award to be allocated to any winner(s) and/or in connection with any full and/or partial buy-out/cash-in offers that may be made and/or accepted. In addition, for this example and elsewhere herein with other examples, the terms wager, wagers, wagering, bets and betting as referenced herein should be broadly construed; for instance, in certain examples such terms may encompass anything that may be designated or otherwise required or optionally to be provided by a player in order to participate in an event, such as any type of payment, or anything else that may be provided, including but not limited to any monetary and/or nonmonetary items, which should be construed broadly so as to at least encompass each of the terms under the broad definition of award as described above (herein referred to as an "entrance fee"). In some examples, the entrance fee may not require any payments or any other monetary or nonmonetary item required from a player desiring to participate in any event; for example, this may be implemented in any manner as desired and for any reason, such as without limitation, for marketing reasons or trial reasons in order to attract users or in connection with free to play scenarios, as just some nonlimiting illustrative examples. Also, as another illustrative example, in connection with the entrance fee, players may also be required, or optionally may provide, other information, such as, without limitation, identifying information (e.g., certain personal information to sign up as a user), account information, redemption code(s) (e.g., to redeem coupons or credit vouchers or free play awards, etc.), payment information, such as a credit or debit card, or any other type of payment mechanism, etc. Other examples may also include "incentives" that are offered to players in return for providing certain information, such as membership privileges, vouchers, free play, etc. As should be understood, the entrance fee as described herein is not limited and can also correspond to any of the wager, wagers, wagering, bets and/or betting aspects and features as set forth and described elsewhere in this disclosure. A winner of a fantasy event may be based on any desired factors or criteria, such as the participant or participants with the highest point totals, such as based on the cumulative statistical performance parameters of the "players" on an individual's fantasy team. Other factors may also be utilized to determine the winner/winners of a fantasy event. Bonus and/or consolation awards/prizes may also be provided, similar to discussed above. In addition, similar to that described above, a participant's game, team, players, ticket, position and/or anything else of value or in the possession of a participant and/or providing "ownership" to a participant in connection with a fantasy game may be transferred from person to person or otherwise.

It should be understood that various changes and modifications to the presently preferred embodiments and examples described herein will be apparent to those skilled in the art. For instance, each of the features and aspects described in connection with any of the various presently preferred embodiments and examples can also be used in connection with any or all of the other of the presently preferred embodiments and examples alone or in combination, even though not explicitly described therein. Further it should be understood that all of the features and aspects described herein may be provided through use of any suitable hardware, software or combination of both, as may be desired and in any manner. In addition, for example, the gaming system disclosed herein may provide the awards to winning players in any suitable manner, such as through a suitable bonus or secondary game or event determined by the implementer or operator of the gaining system, and may include, without limitation:

1) Dividing any multi (betting/dealing/trading) outcome into its sub components.

2) Allow change of ticket ownership or ticket exchange between players or other entities at any time, including at any point after a ticket is obtained or an event is initiated up through completion of the event, after each stage of the game being resolved, or at any other desired time. The recipient of the ticket that has changed ownership or been exchanged would assume the same position as the original owner; in effect stepping into the shoes of the original owner, and legally supersede the original owner with all rights associated with the ticket. For example, a change of ticket ownership can occur via a buy-out, and the party acquiring the ticket would have all the rights as the original owner, including being entitled to win any award or jackpot that may relate to the ticket in connection with any wagering event. In other examples, legal ownership of the ticket would remain with a player, but the entitlement to any award or jackpot is what would reside with another party where a "ticket change" has occurred, such as through a buy-out, or trading or giving a ticket to another player, etc.

Similarly, a party purchasing a partial buy-out of a ticket (i.e., less than 100% of the rights associated with the ticket) would be entitled to win any award or jackpot for which the ticket is redeemable in proportion to the interest purchased via the partial buy-out. Thus, if the party purchased a 30% interest in the ticket, the party would be entitled to 30% of the winnings for which the ticket is redeemable. As with full buy-outs, partial buy-outs can occur prior to or at any stage of a wagering event.

In an illustrative example of a ticket exchange, a pool may be "seeded" (i.e. a operator may place £3000 worth of bets into the pool) 4-5-6 hours in advance of a particular wagering event. As the public play into a pool becomes significant, rather than continuing to grow the pool (i.e., continuing to add money from bets) and have the operator's commitment to keep the prices inline escalate, the operator can transfer some of the existing seed money or investment to a player buying a tote ticket. Notably, the tote ticket may change ownership in whole or in part, before the pool is closed, or after the pool has closed but before completion of the wagering event.

l) 3) Calculate the odds specifically, allow market forces to determine a sale price, use other particular subjective and/or objective factors, and/or use any desired combination of the foregoing.

m) 4) Allow the ownership of remaining tickets or number to be transparently displayed to the player and or audience, to help cash in or buy-back offers or process.

n) 5) Transact, with or without a bidding process or joint bidding process, or auction the ticket exchange. The implementer or operator of the gaming system disclosed herein may also designate the number of awards, the time at which those awards are provided to each winning player, the number of rounds in the bonus event, the number of designated outcomes in each round and/or the number of available outcomes in each round to suitable values.

As described above players may make selections in a number of different legs which can include any of a variety of different discrete events (e.g., an auto race), partial events (e.g., an inning of a baseball game, a set in tennis), components of events (e.g., one or more at bats by a particular player in baseball game or numbers selected in a particular position in a lottery drawing), multiple independent events (e.g., two football games that may occur sequentially or concurrently) and/or compilations of events (e.g., a championship series). Those players who correctly select all (or some predefined portion) of the winners of each leg have an opportunity to solely obtain and/or share in the proceeds of the stakes of all the other players, less any applicable deduction to cover operating costs and/or operator profit, and have the opportunity to win a prize. For example, in multi-leg event pools, prizes may include without limit a full or fractional portion of a Jackpot Pool (e.g., for all correct selections), potentially a Bonus Pool (e.g., for one additional outcome the following week, game, or event) and/or a possible Consolation Pool (e.g., for a subset of correct selections, or other pre-defined forms of partial correctness, such as, for example: did a horse place for consolation, rather than win for jackpot). As another example, if the multi-leg event accommodates accumulator or parlay wagering, the players that correctly select the outcomes of each leg (or any other number of designated legs, for instance) have an opportunity to solely obtain and/or share one or more prizes.

In either case, if no player selects a correct winning combination of results, as one example, the amounts staked available to win may be carried forward until a next betting cycle, for example the next week, and may be available to win by anyone selecting a correct combination of outcomes, or alternatively all or any portion of the amounts staked available to win may be retained by an operator or other designated entity. As should be understood, although not explicitly disclosed herein, there are many other outcome for how the amounts staked available to win may be handled and/or disposed of, and should be considered incorporated herein.

However, to ensure that a significant prize is available in the first cycle or first week or after a prize is claimed, in one example it is contemplated that there may be an operator guaranteed amount available to win each time the games are played, at least until significant reserves have been built up.

Notably, various implementations may be betting scenarios or alternatively in other implementations players may choose to play just for fun, where no stakes are actually wagered.

In one embodiment, at any desired time after initiation of an event (such as at any time after a "ticket" is purchased until completion of an event, after each leg has been completed, between legs, including potentially as a leg is "in-play", and/or during a designated span of time before, during and/or after any of the legs), any desired number of players who remain eligible for a prize (and potentially those still eligible for bonus and/or consolation prizes) or to win or have correct (win) predictions for each of the events or legs that are completed, may be offered a "buy-out" or an opportunity to sell their tickets (in whole or alternatively may be in part (i.e., a fractional amount) to the game operator or through the game operator (or alternatively directly) to a third party (e.g., one or more system operator(s), business entity or entities such as a merchant(s), one or more other persons, other player(s), etc.). Thus, for example, the game operator (or any other entity) may offer the player a fractional amount of the potential Jackpot Pool to buy the ticket for the still pending game(s) and thereby provide the player the opportunity to cash in and avoid the risk of being eliminated on a later leg or the final event. In other examples, a ticket held by players may be comprised of one or more divisions, and the buy-out offer or sale may involve just certain divisions of the ticket, so that those divisions are sold but the player retains ownership of the remaining divisions of the ticket. In yet another example, a ticket held by a player may include an accumulator or parlay wager, in which case the player may receive (or initiate) a buy-out offer or sale for a fractional amount of a prize (e.g., a jackpot), and which may occur at any time, such as before, during and/or after any of the legs specified by the wager have been completed.

Additionally, as discussed above, in addition to the Jackpot Pool or final Jackpot, there are other pools that could form part of the pool game. Part of the amount staked could be reserved to provide one or more Consolation Pool(s) which may be won by those who correctly select a portion of the correct outcomes or another consolation scenario. As an example, a player may be eligible for a Consolation Pool by selecting "any 5" of a Breeder's Cup Pick 6 pool, 5 of 7 such as V75 (a Swedish multi-leg pool bet based on the sport of 'trotting'), or every selection "placed" in the event every selection did not win, as is the consolations in the UK scoop6. In addition, another part of the amount staked could be reserved to provide a Bonus Pool which will be available to winners of the main pool, if they are able to select additional outcomes after they have successfully won the Jackpot Pool. In addition, the players that correctly select the winners of any number of legs can also win one or more interim Jackpots that occurs prior to completion of the event. Thus, the amount staked for the various interim Jackpots would be different than the final Jackpot, which occurs where there is a winner(s) of the last leg that occurs at the end of the event. When either of these pools are offered, any purchaser of a ticket such as the operator discussed above would become the owner of the rights in the ticket with respect to the opportunity to win the Consolation Pool(s), interim Jackpot(s) or Bonus Pool.

In one embodiment, a syndicate (i.e., grouping of two or more players) may participate in the wagering system and methods described above. For example, in a syndicate, while one player may structure and propose or purchase a wager, bet, and/or investment, multiple players may contribute towards funding a portion of the proposed/purchased wager, bet, and/or investment. Exemplary embodiments of such a system is depicted in FIGS. 6-23.

A syndicate may be treated as if it were a single player by the wagering systems and methods described above. Syndicates may engage in wagering events such as lotto, keno, slots, random number generator games, fantasy betting, games involving fixed odds (both single and multiples), games involving fixed odd multiples containing multiple permutations or 'system' bets with multiple lines, pools including exotics like quartet bets on single leg events, pools with multi-leg events, or any of the other wagering events described herein.

Other players (that are not a part of the syndicate) may or may not be aware that a ticket is associated with a syndicate (i.e., the ticket is constructed and crowdfunded by multiple members who together form the syndicate).

In an exemplary embodiment, a wagering system may include one or more wagering input devices that allow the placement of a wager that is generated by a syndicate on a wagering event. Wagering input devices may include wagering stations, wagering terminals, laptop computers, smart phones, tablet computers, televisions, slot machines and the like depicted in FIG. 1 and FIG. 2. The wagering input devices may be communicatively coupled by the means described above with a system controller. The system controller (depicted in FIGS. 1-3) may be configured to initiate the wagering event for one or more players, where the one or more players are eligible to win at least one award based on an outcome of the wagering event. The system may also receive a wager associated with a syndicate via the one or more wagering input devices from one or more players desiring to participate in the wagering event. The wager associated with the syndicate may be crowdfunded (i.e., multiple players may contribute towards the wager). Contributions to the wager may be monetary or non-monetary.

A wager may be proposed by an initiating individual(s) or initiating player(s). The initiating player may create an initial proposed wager that is then made available for crowdfunding. The initial proposed wager may also be initiated by any other parties, including but not limited to the system operator, thereby making these other parties as the designated initiating individual(s)/player(s). The initial proposed wager may be made available to a select group of players that are known to the initiating player or open to the public. For example, the initiating player may allow only other players with a particular code, belonging to a certain association, and/or registered with a particular merchant or administration to contribute to the proposed wager. Alternatively, the proposed wager may be broadcast widely (such as on a website), and any other player may be eligible to contribute to the wager. In one embodiment, the initiating player may be required to contribute towards the proposed wager before the proposed wager is made available for contributions made by other players. In one embodiment, the initiating player may be required to make a minimum contribution. The minimum contribution may be a flat fee, a percentage of the wager, or the like. In one embodiment, a minimum contribution may not be required (the minimum contribution is zero). In one embodiment, there may be a restriction on the amount of time available for other players to contribute towards the proposed wager. For example, an initiating player may propose a ticket and be required to fund a minimum contribution equivalent to 10% of the total wager before the ticket is open to crowdfunding for 10 days by other participants the initiating player shares a ticket code with. As should be understand, the foregoing requirements are optional and also may be varied however desired.

The initiating player may propose the syndicate ticket on their own volition, as a part of a voting process, and/or a committee. Parties interested in crowdfunding the proposed wager may include, for example, a closed circle of friends who operate on and are registered with the mid tier 402 and micro tote 408 architecture described in relation to FIG. 3. For example, each of the parties interested in crowdfunding the proposed wager may be registered with a platform that is responsible for administrative tasks such as receiving and distributing funds to each of the parties in accordance with the systems and methods described above. The parties interested in crowdfunding the proposed wager may also belong to a global network and administrative system such as that described above. The parties interested in crowdfunding the proposed wager may or may not have knowledge of one or more of the other parties contributing to the proposed wager.

In one embodiment, the initiating player may receive interest and/or contributions for a proposed wager before a proposed wager is formally created, and made available for crowdfunding. In such an embodiment, the proposed wager may be established based on the received interest and/or contributions. For example, consider a syndicate including a group of friends. In this example, a first player, Player A, may receive contributions from other players, Players B-E, based on an off-line discussion that occurs before Player A initiates or creates a proposed wager using the platforms, systems, and methods described herein.

In another embodiment, the pre-established criteria may be determined or (adjusted) based on interest and/or contributions received prior to or after the proposed wager is made public. For example, if a Player A receives interest from 10 individuals within a minute of making the proposed wager available for crowdfunding, the pre-established criteria may be altered to 1000 individuals instead of 100 individuals.

The system controller may be configured to receive contributions for the proposed wager from parties interested in crowdfunding the proposed wager. The proposed wager may cover (but is not limited to) wagers for a single simple bet, wagers for a complex exotic bet in a single event, and complex exotic bets across multiple events (e.g., pool, fixed odds accumulator, or parlay). The system controller may aggregate the received contributions to determine whether the cumulative of the contributions meets or exceeds a pre-established criteria. The pre-established criteria may be monetary, or non-monetary (time, number of individuals). In one embodiment the sum of monetary contributions received from the parties interested in crowdfunding the proposed wager and the initiating player may have to meet or exceed a pre-established criteria, namely the amount of the wager. Additionally, the system controller may determine if the number of contributing participants meets the pre-established criteria. For example, in one embodiment, a wager may require the participation of at least five players before the proposed wager may be finalized and converted into a wager. The wager may be capable of being used in the wagering system in accordance with the methods described above.

In one embodiment, in exchange for contribution(s) towards the proposed wager, each of the contributing participants may receive a proportional ownership stake in the syndicate's ticket associated with the wager. In one embodiment, the initiating member's ownership stake in the syndicate's ticket may be adjusted in accordance with the received contributions from the parties interested in crowdfunding the proposed wager.

In one embodiment, the value of the proposed wager may be fixed and no contributions that would cause the cumulative of the contributions to exceed the value of the proposed wager may be accepted. In such an embodiment, contributions received from parties interested in crowdfunding the proposed wager may be adjusted such that the cumulative meets the value of the proposed wager. Alternatively, contributions received from parties interested in crowdfunding the proposed wager that would exceed the value of the proposed wager may be rejected by the system controller. In another alternative, the value of the proposed wager may be variable and contributions that would cause the cumulative of the contributions to exceed the value of the proposed wager may be accepted such that the value of the proposed wager is adjusted to reflect the cumulative of the contributions. For example, if the pre-established criteria requires 10 participants and 15 parties demonstrate an interest in crowdfunding the proposed wager, the properties of the proposed wager may be adjusted to accommodate the 15 interested parties before the proposed wager is finalized and converted into the wager. When the cumulative of the received contributions and contribution of the initiating player meets or exceeds the pre-established criteria, crowdfunding of the proposed wager is complete, and the proposed wager may be finalized and converted into a wager that is compatible with the wagering systems and methods described herein.

In one embodiment, if the pre-established criteria is not met or exceeded, the proposed wager is not converted and finalized into a wager. In such an embodiment, the contributions from the parties interested in crowdfunding the proposed wager and the initiating player may be returned to the contributing parties, forfeited, or held by the platform.

The system controller may determine if any one of the players (including the syndicate) has won an award (or any portion thereof) based on the outcome of the wagering event and the wager submitted by the syndicate.

In one embodiment, one or more of the members of the syndicate may be designated as authorized players that retain control over administrative tasks related to the ticket. Authorized players may be referred to as manager, captains, and the like. In one embodiment, the initiating player is automatically categorized as an authorized player.

In one embodiment, the ticket constructed by the syndicate may be used with the cash-out, buy-out and/or partial buy-out mechanisms described herein. For example, an authorized player from among the syndicate may control cash out actions associated with the syndicate's ticket. Alternatively, each of the members of the syndicate may retain the rights to control any cash-outs, buy-outs, and/or partial buy-outs with respect their ownership stake in the syndicate's ticket. Syndicates may be integrated into the front-end such as the website 404, microsites such as the Merchant Microsite 500, central API such as the Mid Tier 402, and database structures such as Micro Tote 408 described herein (see FIG. 3). In one embodiment, syndicates may be stored as a "group" of customers, in a separate but linked table in a database, referred to herein as a "syndicates" table. Data displayed regarding the syndicates, proposed wagers, contributions by members of the syndicate, cumulative of contributions, pre-established criteria, ownership stakes and the like may be stored in the database. The database may receive input from one or more players by input through the front-end. Data from the database may be displayed on the front-end, after transport through the central API and microsite.

When creating a proposed wager, an initiating player may create a syndicate by inputting information into the front-end of the system. The information may then be used to construct a new record in the database structure. In particular, the information may be used to create a new record in a designated syndicates table. The record may include information regarding the syndicate (and the associated wager) such as a name or other identifying means for the syndicate, identifying information for the initiating player, the total value associated with the proposed wager, the contribution of the initiating player, the pre-established criteria, and the like. In one embodiment, an initiating player may be required to register as an authorized player (also known as manager or the like) prior to creating a proposed wager and syndicate. Information regarding authorized players or managers may be stored in the database.

Parties interested in joining a syndicate or crowdfunding a proposed wager may view syndicate and manager information via a request placed at the front-end website. The front-end website may then be updated from information retrieved from the microsite (which in turn requests data from the central API and the dedicated databases that store syndicate and manager information).

Parties interested in joining a syndicate or contributing towards the proposed wager may send a request from the front-end webpage to the microsite. The request may include (among other items) a session token (or other authentication means), identifying information for the syndicate, and information regarding the contribution. Upon receiving the request, the microsite may be configured to validate the information contained within the request, and determine whether the request is valid based on whether the contribution is compliant with the pre-established criteria set by the initiating player. If the request is valid, the microsite may contact a payment application to initiate a debit of the contributing player's funds so that a contribution may be made towards the proposed wager. In one embodiment, a transfer of funds between the contributing player to the platform may be completed prior to the conversion of the proposed wager to the finalized wager. If a successful response (or notification of a successful transaction) is returned from the payment application, the microsite may then send a separate request to the central database to initiate the creation of a ticket. The created ticket may include information regarding the wager, identifying the syndicate, the contributing player's ownership stake in the syndicate's wager and the like.

In one embodiment, if the cumulative of the contributions towards the proposed wager does not meet or exceed the proposed wager, the syndicate is not fully funded. If a syndicate is not fully funded by the time the wagering event starts, or by the end of the time the proposed wager is available for crowdfunded, the syndicate may be considered incomplete. Additionally, in some embodiments, each of the parties interested in crowdfunding the proposed wager may be refunded their contribution. Furthermore, each ticket issued to members of the now-incomplete syndicate may be voided.

In one embodiment, one or more authorized players or managers may elect to accept a buy-out offer, or partial buy-out offer, or request a cash-out offer. In such an embodiment, the authorized player(s) retain the ability to make decisions on behalf of all of the players in the syndicate. When an authorized player accepts a cash-out offer, buy-out offer, or partial buy-out offer, the central API may transmit a request to each microsite relevant to each player that owns a portion of the syndicate. The microsite may then transmit a credit notification to the relevant payment application. Information regarding the transactions related to the buy-out offer, partial buy-out offer, or cash-out may be used to update one or more fields in the central database. In one embodiment, information regarding the syndicates stored in the syndicates table may be updated to reflect changes related to accepting a buy-out offer, partial buy-out offer or cash-out offer.

In one embodiment, if the system controller determines that the syndicate's ticket has won at least a portion of an award, each player in the syndicate may be credited in accordance with their ownership stake in the syndicate ticket. This may be done through the payment applications described herein.

FIGS. 6-23 are illustrations of webpage(s) representative of an exemplary embodiment of the wagering system, and in particular, of the front-end system that may be used with an embodiment of the wagering system having syndicates.

The webpages (or portions thereof) illustrated in FIGS. 6-23 may be utilized as a front-end for a wagering system compatible with syndicates as is described herein. Although buttons, click boxes, text boxes, drop down menus and the like are depicted herein, any suitable alternatives such as sliders, radio buttons, tabs, etc. may be used in connection with the depicted webpages.

One or more currencies may be used for the webpages. All monetary values displayed in the webpages may be automatically displayed in the local currency, or a global standard currency for the wagering event.

Figure 6:
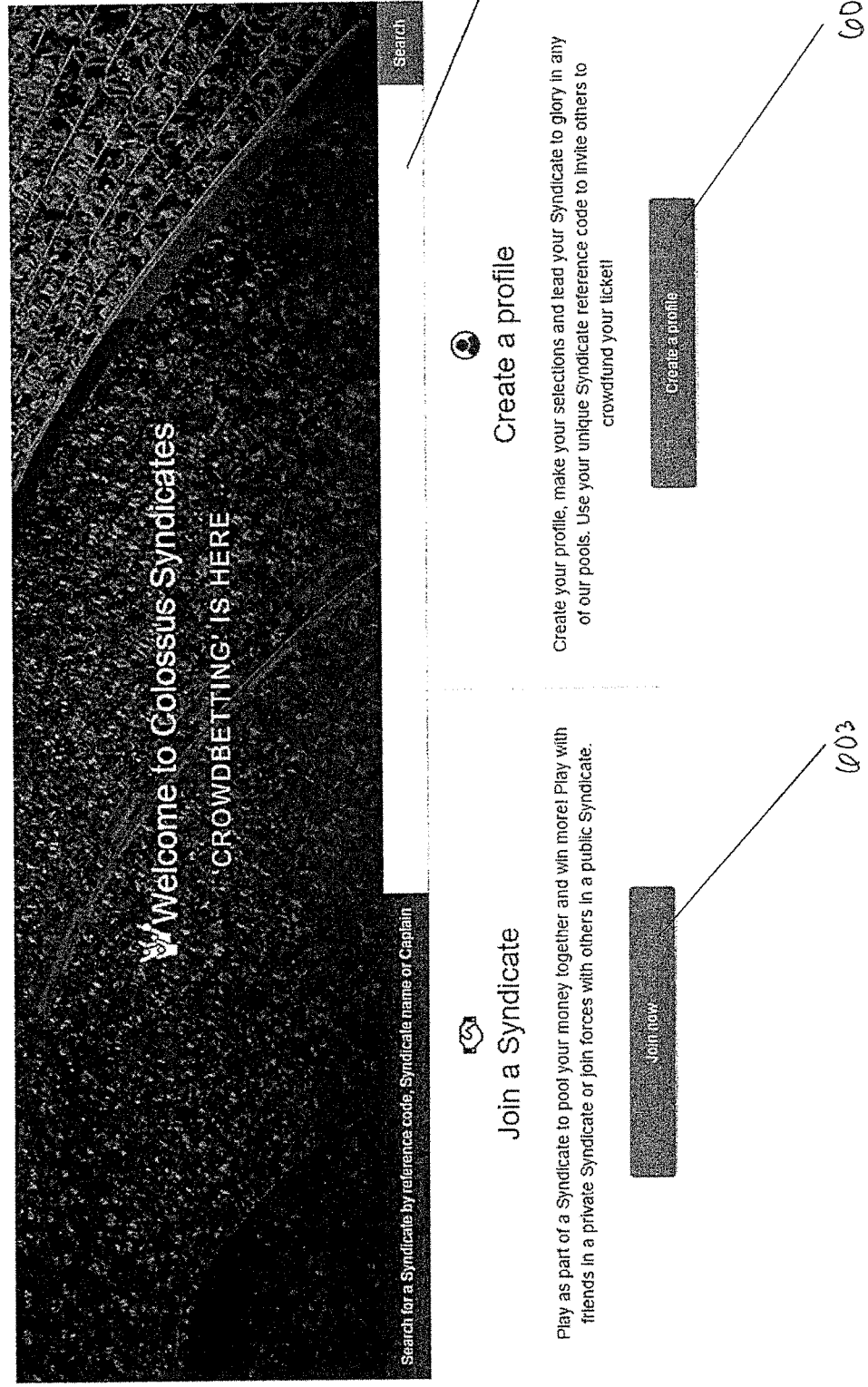
FIG. 6 is an illustration of a webpage representative of an exemplary embodiment of the wagering system.

In particular, FIG. 6 illustrates a webpage that may be accessible to a user (player) upon login and authentication. The webpage may include a search feature 601 that may be used to search for a particular syndicate by inputting information related to a syndicate such as a reference code, name, or authorized manager ("captain"). The webpage may also include options for creating or starting a syndicate 605, or joining existing syndicates 603.

Figure 7:
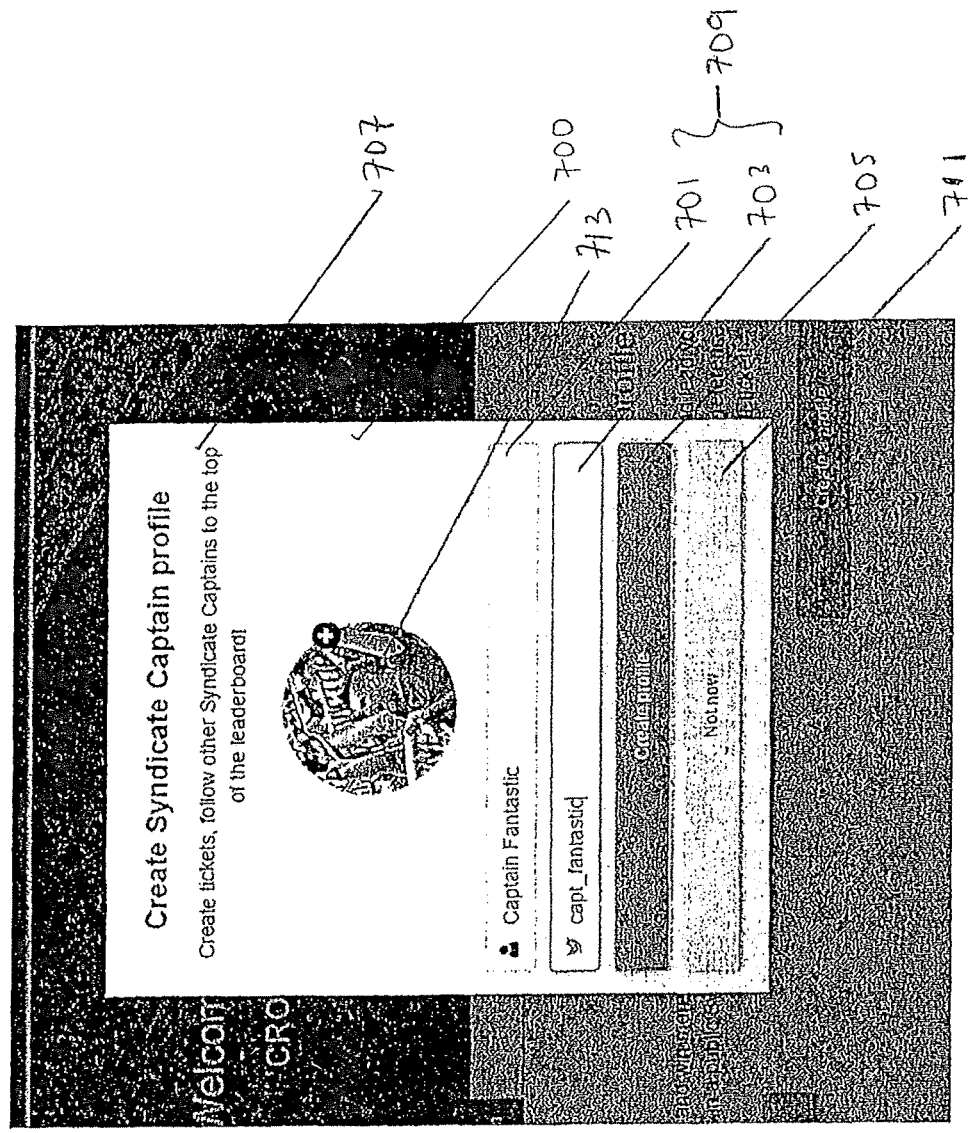
FIG. 7 is an illustration of a webpage representative of an exemplary embodiment of the wagering system.

Upon electing to create a syndicate, the webpage depicted in FIG. 6 may be "grayed-out" and a popup window 700 may display one or more input boxes configured to receive information from a player regarding the initiating player as is depicted in FIG. 7. In a first region 707 of the popup window instructions may be provided to the player. In a second region 709 of the popup window a player may be prompted to input information regarding the initiating player such as a name 701 and social media link 703. In the depicted embodiment, the user may create or upload an avatar or other representation of themselves 713. One or more of the fields of information may be optional. Once the information is input by the player, the player may elect to submit the information from the webpage (front-end) to the system controller by selecting a "create profile" button 705. Alternatively, the player may choose to abort the process of creating a syndicate by selecting a "Not now" button 711.

As illustrated in FIG. 8, upon receipt of the syndicate/manager information the backend system may send a message to the front end system to display a popup window 800 providing instructions, notifications, and the like regarding participating in a syndicate, and the responsibilities assigned to a manager. In one embodiment, player may be required to acknowledge the information and accept the terms displayed in the popup window 800 by clicking, submitting initials, electronic signatures, or the like. For example, in FIG. 8 the initiating player or manager is notified that the manager has a responsibility to choose which pools to play, what selections to make, decide how much to stake, purchase a minimum of 10% of the ticket, and manage cash out offers for the syndicate 801. Furthermore, in the example in FIG. 8 the manager is required to positively acknowledge the displayed text by clicking on the close button 803 to move on to the next webpage.

As illustrated in FIG. 9, one or more upcoming pools (or wagering events) may be displayed on a webpage 900. A portion of the webpage 901 may display instructions to the manager. A second portion of the webpage may display information related to upcoming pools. The pools may be organized and sorted by categories: Big Jackpots 903A, Football 903B, and subcategories such as dates (Monday 905A, Tuesday 905B), wager amount, number of participants, and the like. The information for each pool may be grouped together in a tile 915 including an icon or image 917, a name for the pool 907, a description of the type of pool 909, a value associated with the pool 911, and a timeline for the pool 913. A pool may be selected by the player moving a mouse to hover above the tile 915 and clicking on the tile 915. Alternatively, the player may use a touchscreen to select the tile 915.

As illustrated in FIG. 10, the player may then create their proposed wager using the website 1000. Information regarding the pool may be displayed in a first portion 1001 of the website 1000. Selections related to the proposed wager may be made by selections and input to second 1003 and third 1007 portions of the website. A value associated with the proposed wager may be automatically updated and displayed on the website 1005. The value may be based on the selections made in the proposed wager. As illustrated, the value may be the overall cost of the syndicate ticket. The player may elect to proceed with creating the proposed wager (and syndicate ticket) by selecting an icon such as "next".

Figure 11:
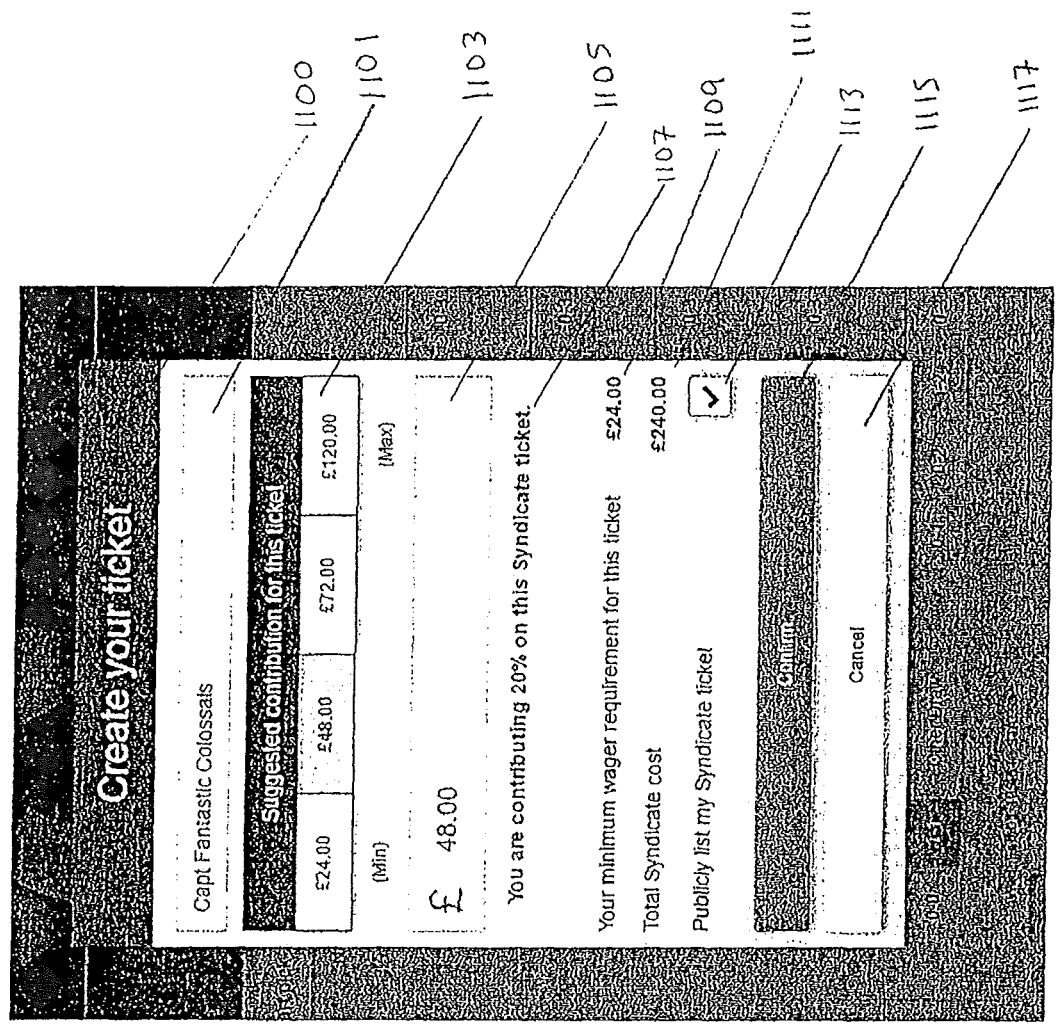
FIG. 11 is an illustration of a webpage representative of an exemplary embodiment of the wagering system.

As illustrated in FIG. 11, the front end system may then display a popup window 1100 configured to assist the player in creating the proposed wager (and syndicate ticket). The popup window 1100 may display the manager/initiating player's name 1101, provide a list of suggested contributions 1103 towards the proposed wager/syndicate ticket, and display the value or overall cost of the syndicate ticket 1111. In one embodiment, the suggested contributions 1103 may range between ten percent and fifty percent of the value or overall cost of the syndicate ticket. In one embodiment, the popup window 1100 may display the minimum contribution 1109 required of the initiating player or manager. The popup window may include a field 1105 to select or enter the initiating player's contribution. The field 1105 may be populated by selecting a suggested contribution 1103. Alternatively, the player may populate the field 1105 by text, voice, or other input. The initiating player's contribution may be converted and displayed automatically as an ownership stake 1107. The initiating player may also select preferences related to the display of the syndicate ticket 1113. In one embodiment, the manager may elect to keep the syndicate private (only those with the reference code will be able to access the syndicate). Alternatively, the initiating player may elect to list the syndicate publicly. After inputing the information and making selections, the player may elect to move forward with creating a proposed wager/syndicate ticket by selecting "confirm" 1115. Alternatively, the player may elect to abort the process and select "cancel" 1117. Once the initiating player elects to "confirm" the contribution, the initiating player's contribution may be debited from their account in accordance with the systems and methods described above.

Figure 12:
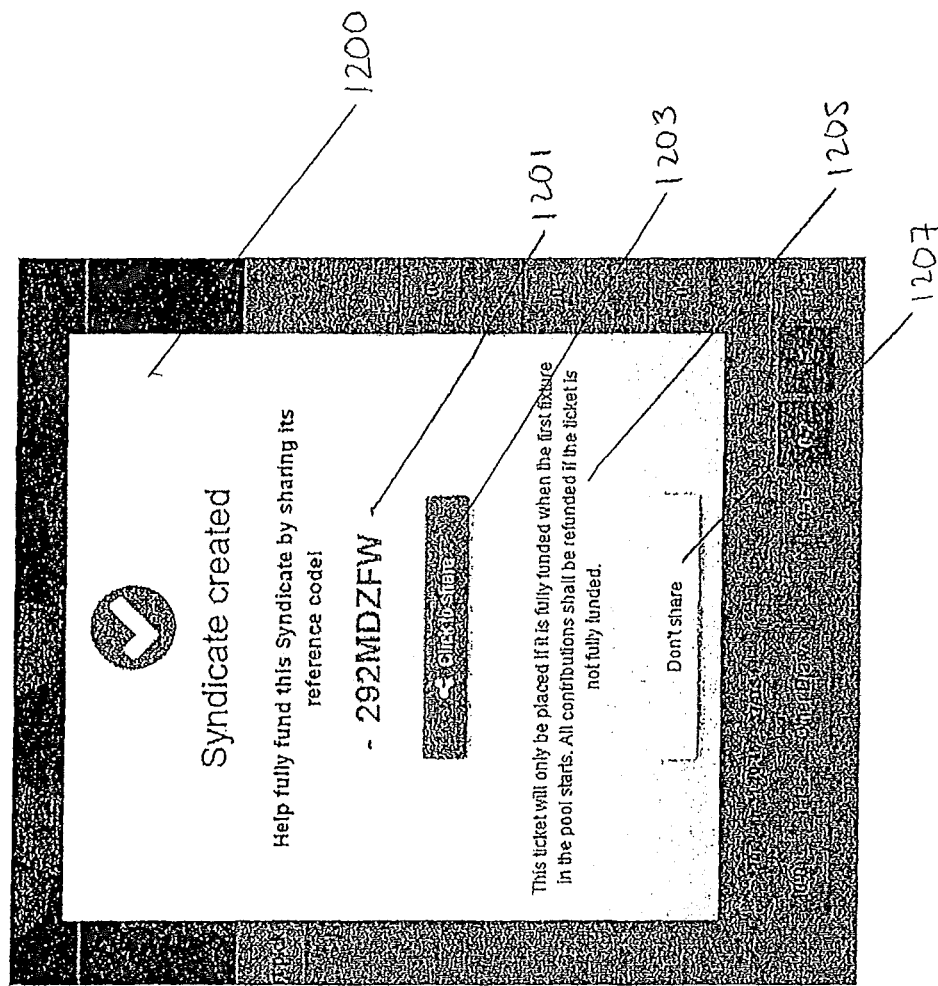
FIG. 12 is an illustration of a webpage representative of an exemplary embodiment of the wagering system.

As illustrated in FIG. 12, the player may then receive a notification via the webpage 1200 that a proposed wager or syndicate ticket has been created. The notification may provide identifying information regarding the proposed wager or syndicate ticket 1201. Optionally, the identifying information may be easily shared via one or more social media links 1203 provided on the notification webpage 1200. Optionally, the player may elect not to share identifying information regarding the proposed wager or syndicate ticket by selecting "don't share" 1207. Additional information 1205 regarding the setup of the syndicate and the crowd funding process may be displayed in the webpage. For example, the window may notify the initiating player that the ticket will only be placed if it is fully funded when the first fixture in the pool starts and that all contributions shall be refunded if the ticket is not fully funded.

Figure 13:
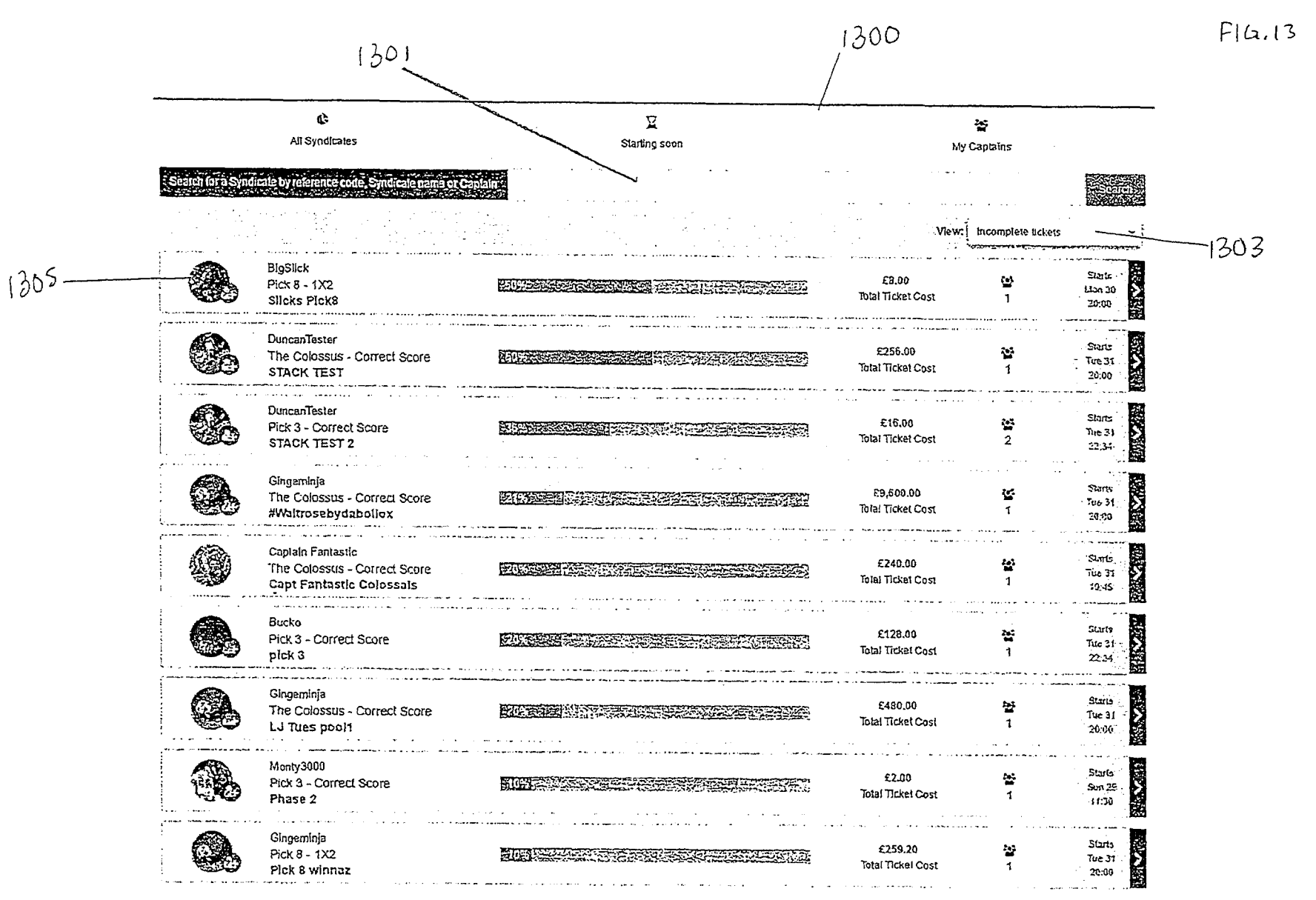

A party interested in contributing towards the proposed wager in an effort to crowdsource the wager or syndicate ticket may elect to join a syndicate by selecting an appropriate icon 603 (see FIG. 6) or searching for the syndicate using identifying information. As illustrated in FIG. 13, when a player elects to join a syndicate, information regarding one or more syndicates may be displayed on a webpage 1300. Optionally, the webpage may have search functionality 1301. Multiple syndicates may be displayed as tiles 1305. The tiles 1305 may be sorted and organized by manager/initiating player of the syndicate, type of wagering event, amount left to reach the pre-established criteria, total cost of the syndicate ticket, number of participants in the syndicate, and starting time of the wagering event (in any order). Optionally, the webpage may also include a filter 1303 to filter syndicates by criteria such as past tickets, incomplete tickets, complete tickets, most popular tickets and the like. For example, the syndicates displayed in FIG. 13 are sorted by the percentage of the pre-established criteria that has been met.

Figure 14:
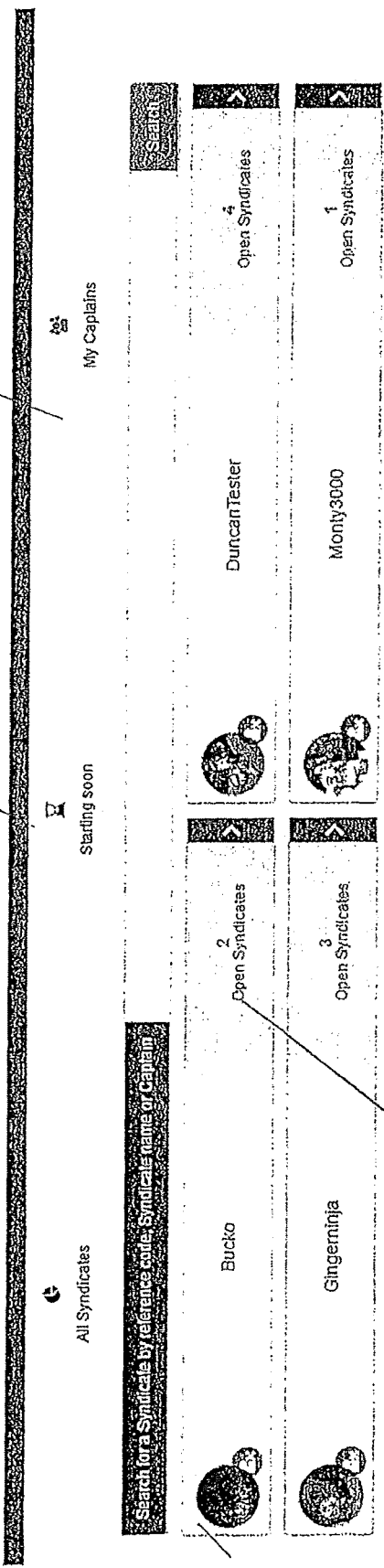
FIG. 14 is an illustration of a webpage representative of an exemplary embodiment of the wagering system.

As illustrated in FIG. 14, by selecting a different tab related to the initiating player/manager 1309 on the webpage 1300, syndicates may be grouped by their initiating player/manager 1311, and a player may select a particular initiating player/manager 1311 in order to view their open syndicates 1313.

Figure 15:
FIG. 15 is an illustration of a webpage representative of an exemplary embodiment of the wagering system.

As illustrated in FIG. 15, information regarding a syndicate may be displayed within a single webpage 1500. The information regarding the syndicate may be retrieved from one or more database structures that are dedicated towards holding syndicate information (e.g., a syndicate table). A first portion 1501 of the webpage may be dedicated towards displaying high-level information regarding the syndicate including, for example, the name, authorized representative, total cost of the syndicate ticket, amount left to reach the pre-established criteria, number of participants in the syndicate and the starting time of the wagering event, and the like. A second portion 1503 of the webpage may be dedicated to displaying information regarding the proposed wager and/or the award. A third portion 1505 of the webpage may be dedicated towards receiving a contribution from the interested parties. For example, the third portion 1505 may display suggested contribution amounts for the syndicate ticket and the corresponding ownership stake for each contribution. A player may select a suggested contribution or input their own contribution. The proposed contribution from the player is converted into a ownership stake and displayed on the webpage. The player may also be required to acknowledge that the manager or authorized player retains privileges and responsibilities related to the cash out. The interested party may then confirm a contribution towards the proposed wager by selecting "confirm" or abort the contribution by selecting "return to syndicate list".

Figure 16:
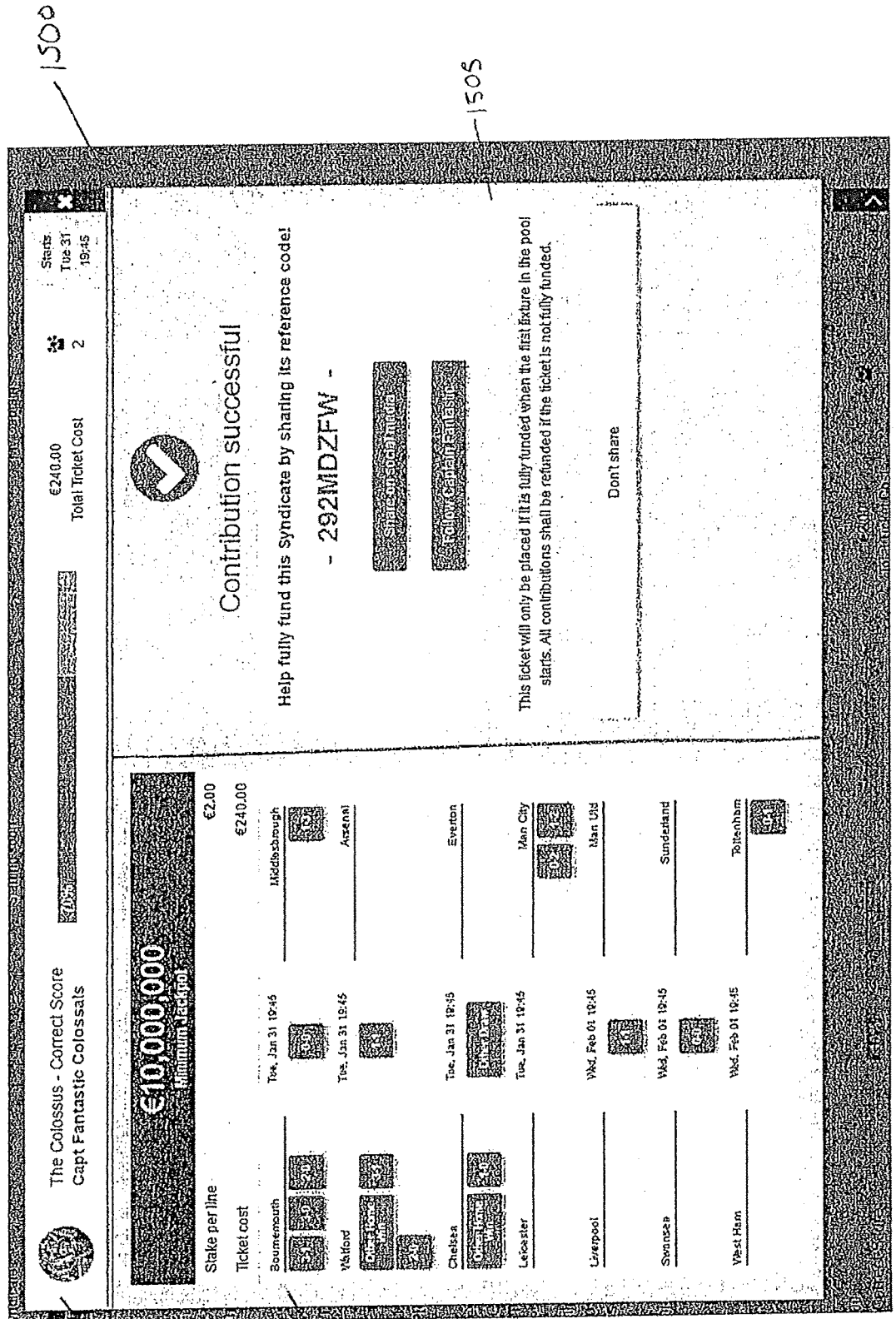
FIG. 16 is an illustration of a webpage representative of an exemplary embodiment of the wagering system.

If the interested party elects to "confirm" the contribution to the proposed wager, the third portion 1505 of the webpage may be updated to display a confirmation, as is depicted in FIG. 16. The confirmation may display that the contribution was successful, share identifying information regarding the syndicate (such as a reference code), provide links to the user to display syndicate information on social media, share identifying information regarding the manager, and notify the interested party that the syndicate ticket will only be placed once the pre-established criteria has been meet or exceeded. The syndicate information displayed in the first portion 1501 of the webpage 1500 may also be updated to reflect the effects of the player's contribution towards the proposed wager. For example, in FIG. 16 70% of the pre-established criteria for the proposed wager has been met.

Figure 17:
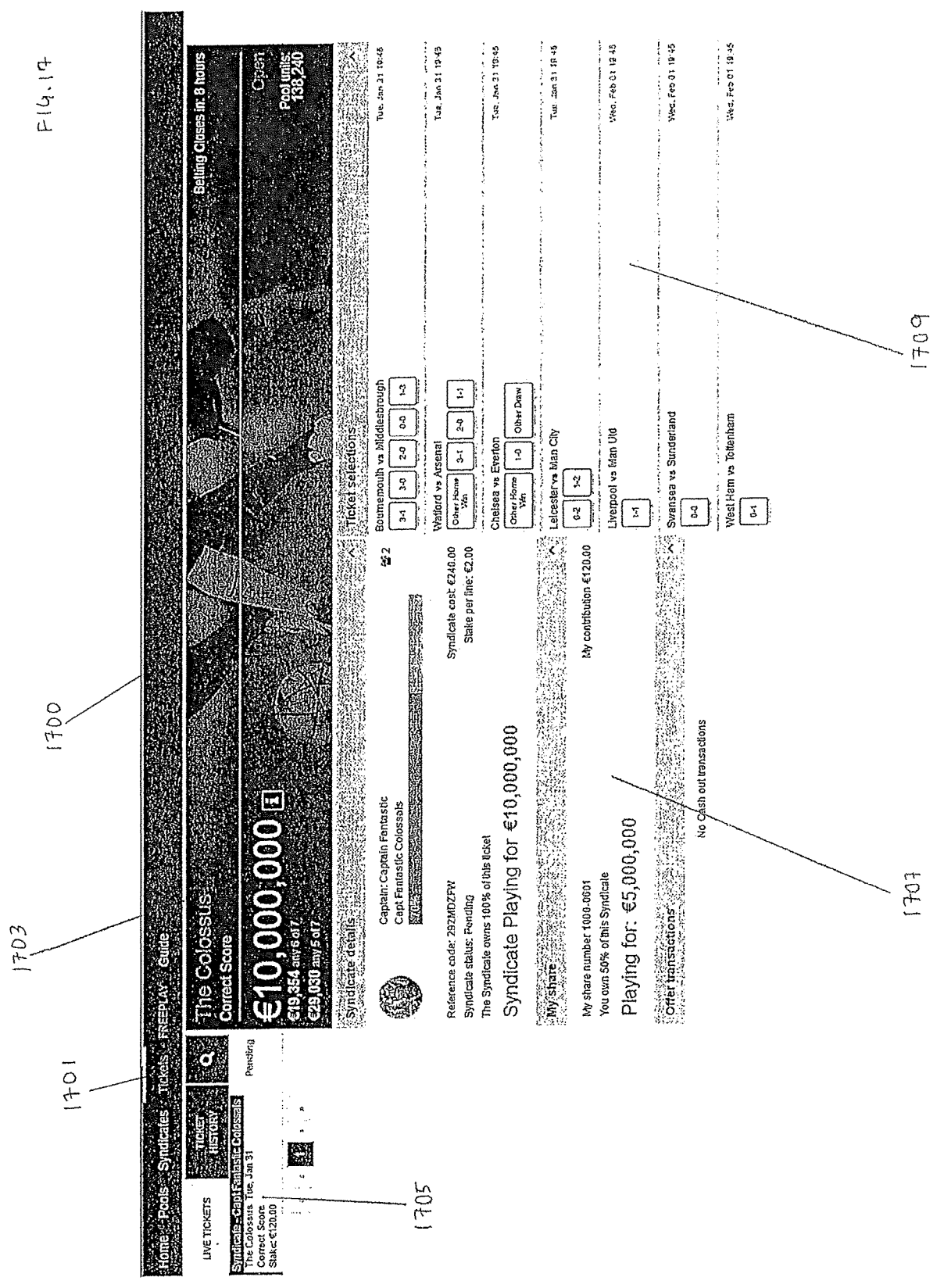
Figure 18:
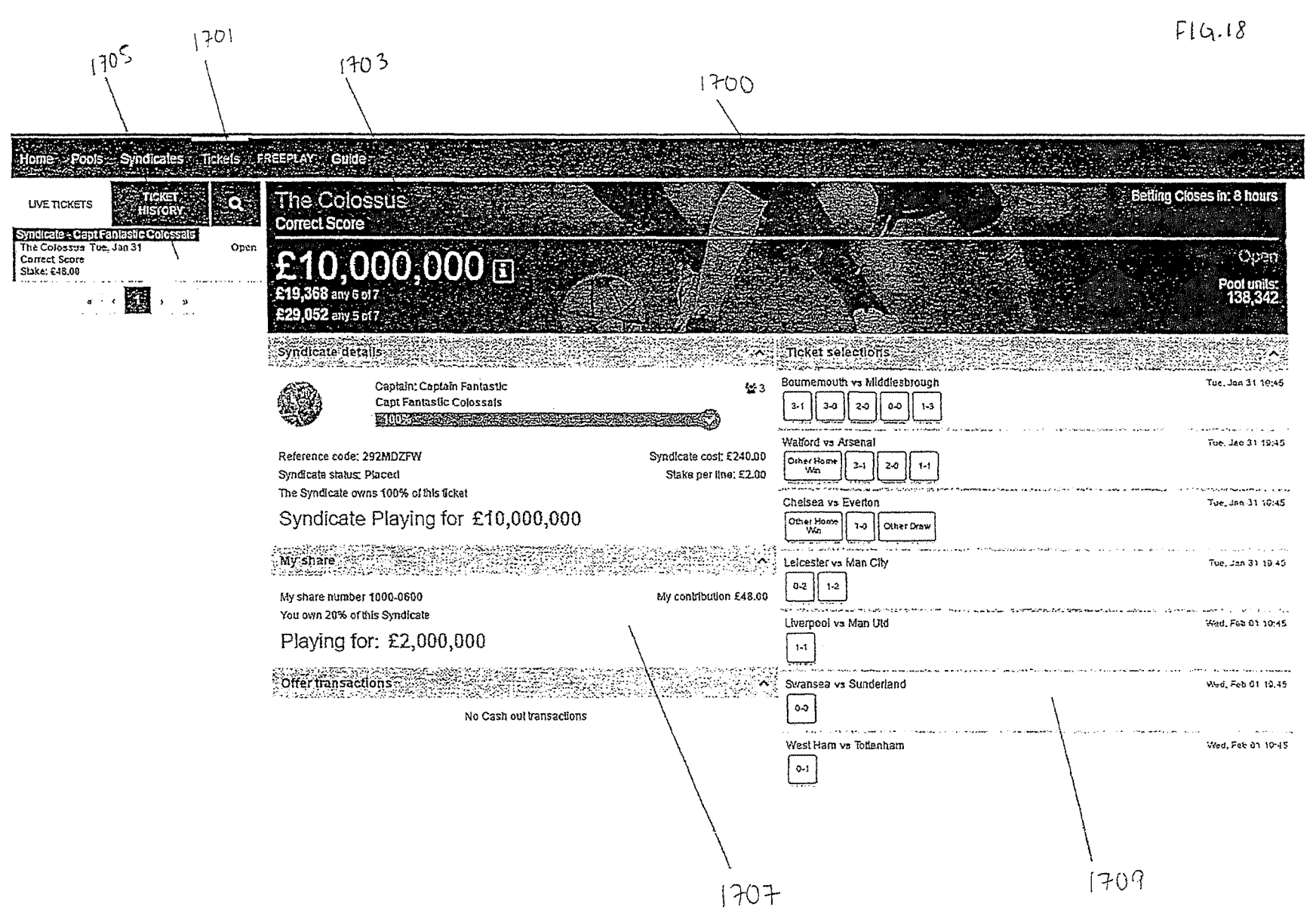

As illustrated in FIG. 17, tickets for the syndicate may be viewed within the webpage 1700 by selecting a tab 1701. In a first panel 1705 of the webpage a summary of live tickets or historical tickets that the player may be associated with may be displayed. A ticket may be classified as "pending" if the ticket is not yet filled and may be cancelled if the syndicate is not filled by the time the pool closes. A ticket may be selected from first panel 1705 such that details regarding the ticket are displayed in the second panel 1703, third panel 1707, and fourth panel 1709. The second panel 1703 may display information regarding the wagering event (pool) associated with the ticket, and/or the possible award. The third panel 1707 may display information regarding the syndicate, crowdfunding the proposed wager, and the share or contribution associated with the individual player. The fourth panel 1709 may display information regarding the proposed wager. In FIG. 18 the webpage 1700 displays information for a ticket that is fully funded (i.e., the pre-established criteria has been met).

Figure 19:
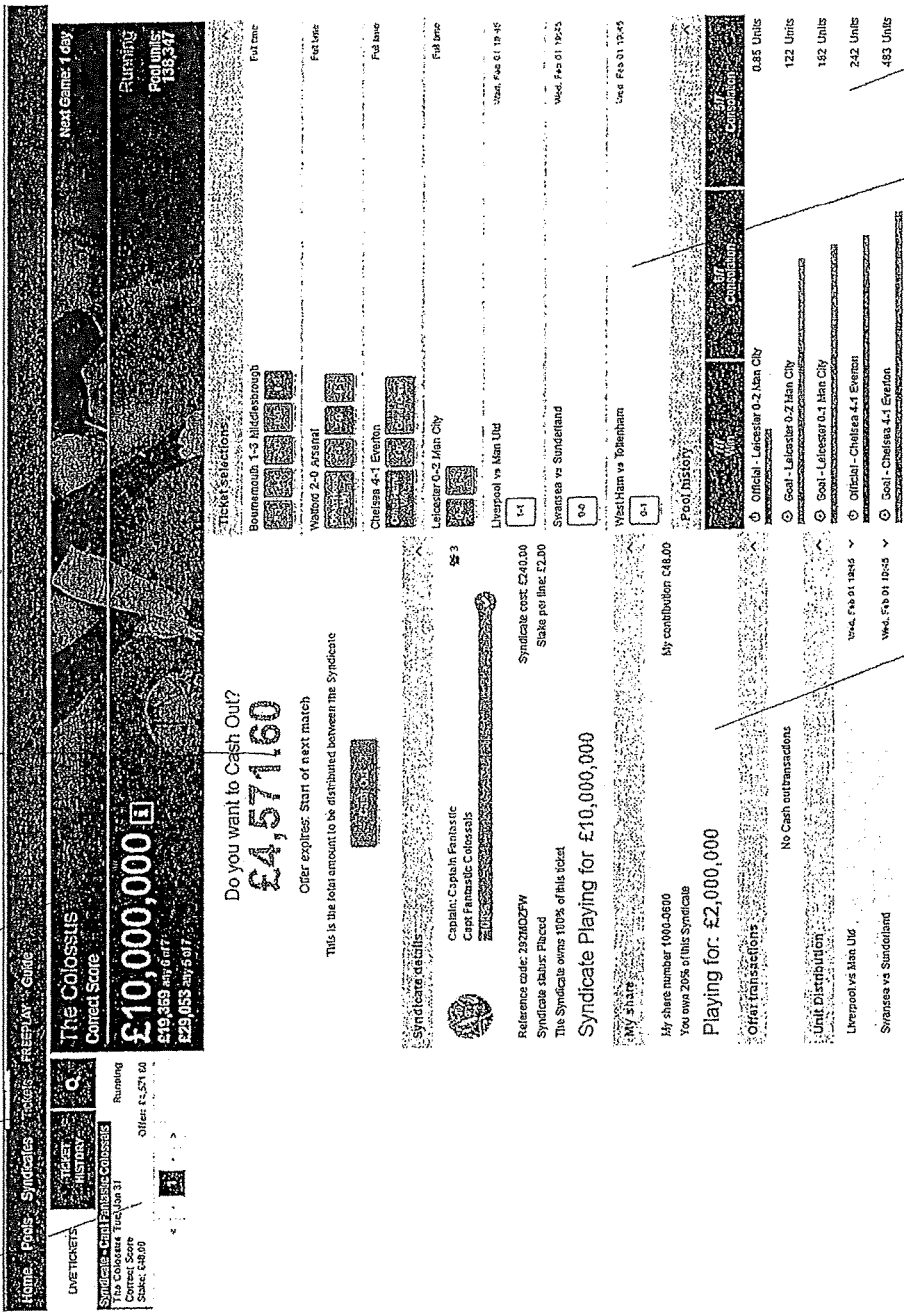
FIG. 19 is an illustration of a webpage representative of an exemplary embodiment of the wagering system.

FIG. 19 illustrates a webpage 1700 where a cash out offer is made to an authorized player or manager. The third panel 1707 may be reconfigured to display information regarding the cash out offer. The cash out offer 1711 may include the cash out value and expiration information. The authorized player or manager may then elect to cash out the ticket by selecting the "cash out" icon. Any desired portion of the ticket may be subject of a cash-out (e.g., any desired percentage from 0% up to and including 100%). The authorized player or manager may base the decision to cash out on historical information regarding the wager or ticket or any other objective or subjective criteria. As illustrated the fourth panel 1709 may be updated to display information regarding the historical performance of the wager/syndicate ticket and the wagering event 1713.

Figure 20:
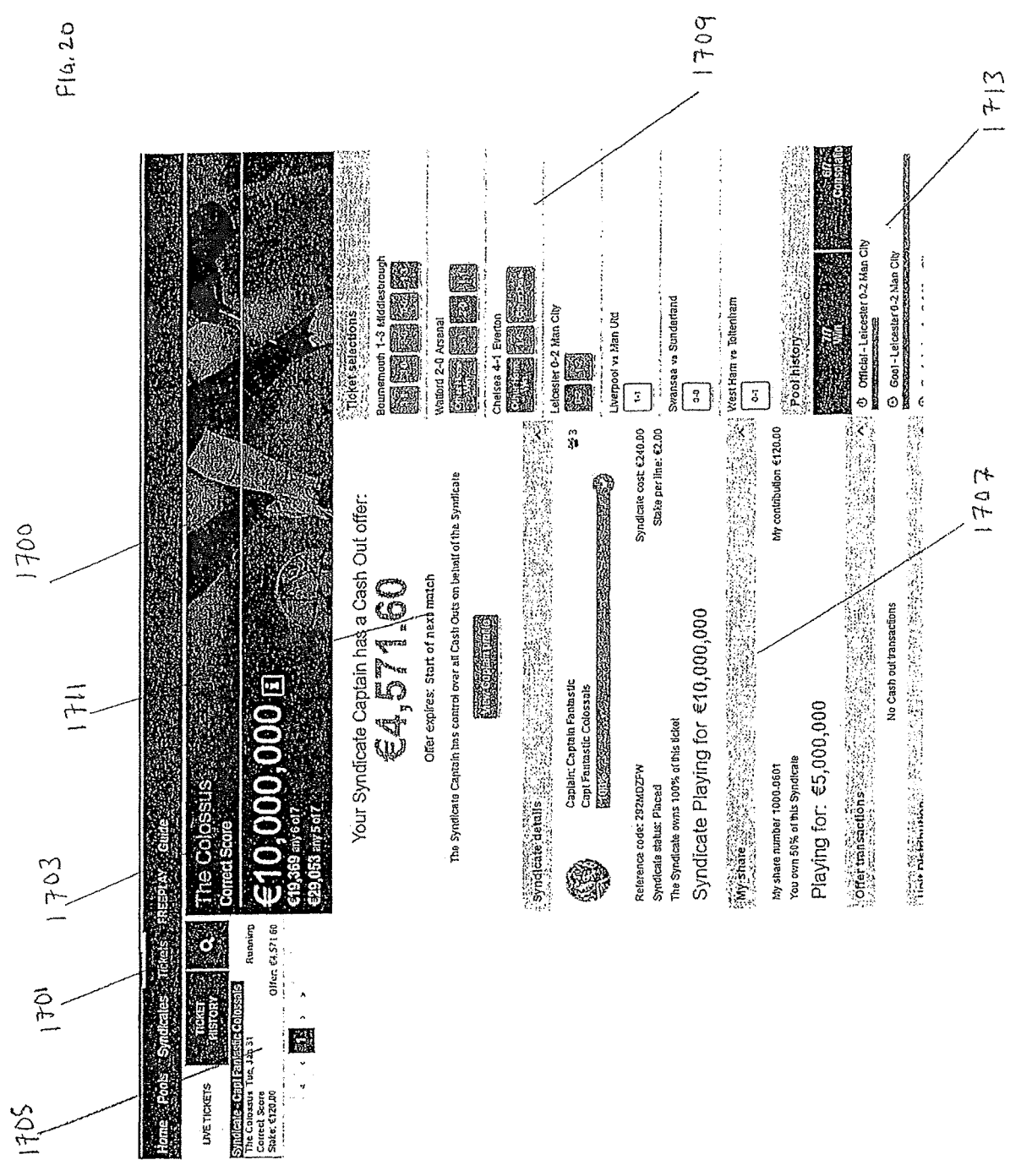

FIG. 20 illustrates a webpage 1700 as viewed by a non-authorized player (i.e., a contributing member of a syndicate without permissions to manage the syndicate). As illustrated, the player may be able to view details of the cash out offer 1711 within the third panel 1707, however the player may not be able to interact with the cash out offer.

Figure 21:
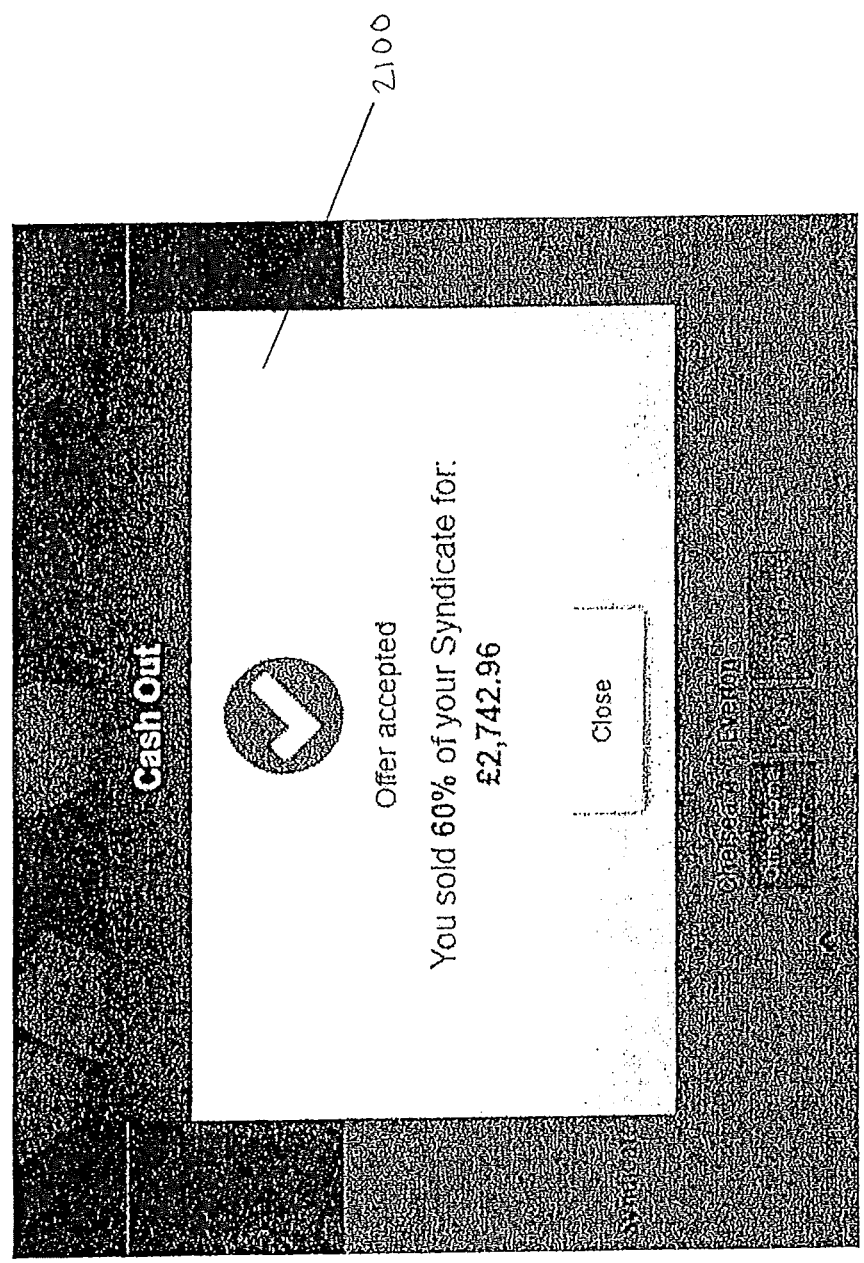
FIG. 21 is an illustration of a webpage representative of an exemplary embodiment of the wagering system.

FIG. 21 illustrates a popup window 2100 that is displayed when an authorized player accepts a cash-out offer. As depicted, the window 2100 may display notification that the cash-out is accepted, as well as the monetary value and ownership stake that was transacted.

Figure 22:
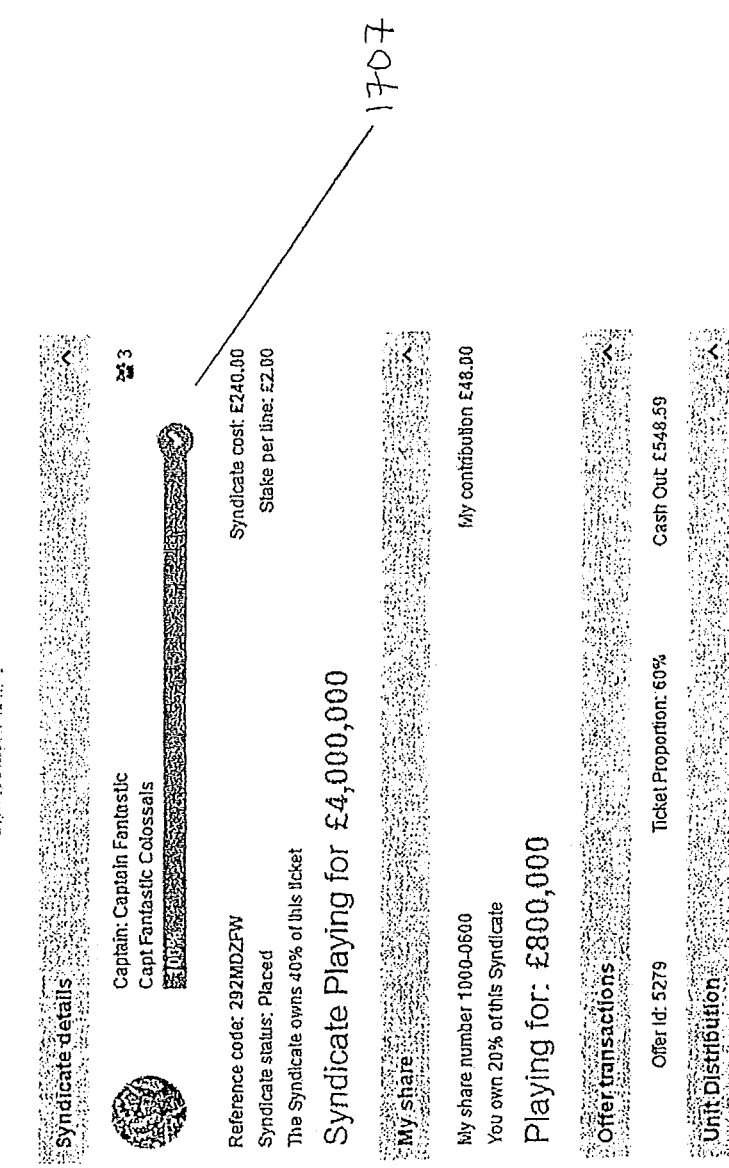
FIG. 22 is an illustration of a webpage representative of an exemplary embodiment of the wagering system.

FIG. 22 illustrates a portion of the third panel 1707 that is updated after an authorized player accepts a cash-out offer for the ticket. The third panel 1707 may be updated to display the amount that is credited to the player's account. The third panel 1707 displayed in FIG. 22 may be shown to an authorized player.

FIG. 23 illustrates a portion of the third panel 1707 that is updated after an authorized player accepts a cash-out offer for the ticket. The third panel 1707 may be updated to display the amount that is credited to the player's account. The third panel 1707 displayed in FIG. 23 may be shown to a member of the syndicate who is not an authorized player and did not have authority over the acceptance or denial of a cash-out offer on behalf of the syndicate.

As should be understood, the term "syndicate" as used herein should be broadly construed. For example, in certain embodiments a syndicate may comprise a grouping of two or more players who may participate in a wagering event. In addition, one or more players may act as leader or captain to initiate, structure, propose, and/or purchase a crowdfunded wager, bet, and/or investment. Any number of players may contribute towards funding a portion of the proposed/purchased crowdfunded wager, bet, and/or investment. The participants in the syndicate potentially may know one another or not know one another prior to becoming involved in the syndicate. For example, a syndicate could be formed by a group of friends. Alternatively, a syndicate could be formed that is directed to persons that may not previously know one another, but are a part of the same interest group, or a member of the same organization, etc. Alternatively, a syndicate could be made of persons that have no previous knowledge of one another and are merely people desiring to participate in a wagering event. Alternatively, any combination of the foregoing may also be present.

In certain embodiments, the leader that initiates the crowdfunded wager may be either required to contribute to the crowdfunded wager, may be optional to contribute to the crowdfunded wager or may be restricted from contributing to the crowdfunded wager. In certain embodiments, there may be incentives provided directed to being a leader, for example and without limitation, by receiving an award as an incentive for acting as a leader or based on results of performance by the leader and/or the wagering event, such as if there is full funding of the crowdfunded wager. A leader may be any person interested in initiating a crowdfunded wager or persons capable of being a leader may be limited to certain targeted audiences, such as a celebrity, a journalist, preapproved persons or any other desired parties.

In certain embodiments, in connection with any of a buy-out offer, a partial buy-out offer, a cash out option or any other offer or presentation that is made in connection with a crowdfunded wager, acceptance of such may be accomplished in a variety of ways. For example and without limitation, acceptance may be made by one or more of the leader, by any desired number of or all of the parties that have contributed to crowdfunding the proposed wager, by a vote or poll from among the leader and/or any desired number of or all of the parties that have contributed to crowdfunding the proposed wager, a delegation to a particular player or players, by a rotation from among the leader and/or a particular player or players, by a previously determined third party or category of persons, by a designee, randomly, by an algorithm or other computer system.

Figure 24:
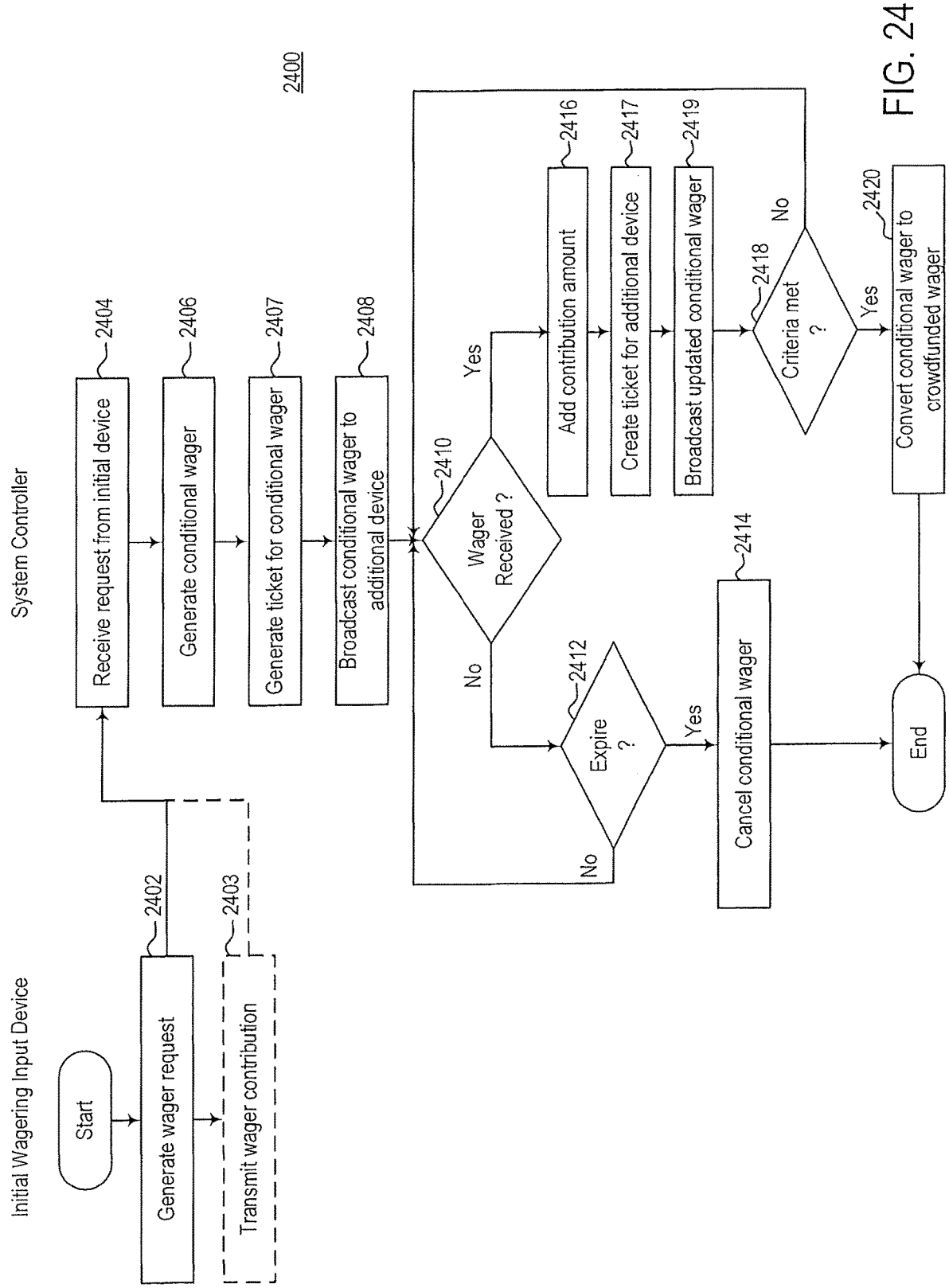
FIG. 24 is a flow diagram of a method of conducting a wagering event, according to one embodiment.

FIG. 24 is a flow diagram illustrating a method 2400 of conducting a wagering event, according to one embodiment. The method 2400 begins at step 2402. At step 2402, an initial wagering input device generates a wager request for a wagering event, which is transmitted to system controller. The initial wagering input device corresponds to a user initiating the wager request. One of skill in the art could readily understand that initial wagering input device may take the form of multiple electronic devices, as long as they are operated by the initiating user. In the embodiment discussed in conjunction with FIG. 24, the wager request generated by the wagering input device is a wager request which requires the funding by two or more parties. In other words, the wager request generated by the wagering input device is a wager request that will be crowdfunded by two or more players (i.e., a crowdfunded wager).

The crowdfunded wager request transmitted to the system controller includes information relating to the wager request. For, example, the crowdfunded wager request may include information such as an amount of money to be wagered and rules relating to participation in the proposed crowdfunded wager (e.g., whether crowdfunding is public or private, a minimum number of participants, a maximum number of participants, duration on the open offer, etc.).

In some embodiments, at option step 2403, initial wagering input device transmits a wager for participation in the wagering event. In this embodiment, the wager transmitted by initial wagering input device is a part of the proposed crowdfunded wager. In other embodiments, initial wagering input device does not partake in the proposed crowdfunded wager. In these embodiments, incentives may be offered to initial wagering input device. For example, if the proposed crowdfunded wager ends up winning in the wagering event, the initial wagering input device may receive an award or prize.

In some embodiments, prior to generating a wager request for a wagering event, the initial wagering input device performs a crowdfunded event, in which a notional amount of the wager is crowdfunded. In one embodiment, the crowdfunded event is performed off-line. In another embodiment, the initial wagering input device transmits the crowdfunded event request to the system controller for posting. The system controller would then receive the request to fund a crowdfunded wager. The system controller initiates the request to fund the crowdfunded wager to be placed on the wagering event. The system controller broadcasts the fund request to each of the one or more additional wagering input devices, to prompt the one or more players to contribute a notional amount to fund the conditional wager. The system controller may then receive a contribution amount from one or more of the one or more additional wagering input devices. The system controller may then add the contribution amount received from the one or more of the one or more additional wagering input devices to a total contribution amount of the conditional wager. The conditional wager is then converted to a crowdfunded wager, based on the total contribution amount of the conditional wager. The system controller places the crowdfunded wager on the wagering event.

At step 2404, the system controller receives the crowdfunded wager request for the wagering event from the initial wagering input device. At step 2406, the system controller generates a conditional wager for the proposed crowdfunded wager. For example, the conditional wager has all of the same characteristics as any wager that is posted. However, in the case of the proposed crowdfunded wager, the wager posted to the pool is in a conditional state (hence conditional wager). In other words, if the conditional wager is not fully funded (or at the very least funded to a threshold amount), the system controller closes or cancels the conditional wager. At step 2407, system controller generates a ticket corresponding to the proposed crowdfunded wager. The ticket may be transmitted to the initial wagering input device.

At step 2408, the system controller broadcasts the conditional wager to a plurality of wager input devices. For example, the system controller broadcasts the conditional wager in accordance with the received rules relating to the proposed crowdfunded wager. In some embodiments, the system controller may broadcast the conditional wager to a pre-selected subset of wagering input devices. In other embodiments, the system controller may broadcast the conditional wager to all wagering devices.

At step 2410, system controller determines whether a wager was received for the conditional wager. For example, the system controller may determine whether any additional wagering input devices submit a wager in response to the broadcasted conditional wager.

If at step 2410, the system controller determines that an additional wager was not received, at step 2412, the system controller determines whether a pre-set duration for the conditional wager has expired. In one embodiment, the pre-set duration may be a pre-set duration set by the initial wagering input device. In another embodiment, the pre-set duration may be a duration set by the system controller. For example, the system controller may close the conditional wager several minutes prior to the beginning of the wagering event.

If at step 2412, the system controller determines that the pre-set duration for the conditional wager has not expired, then method 2400 reverts to step 2410, and the system controller continues to determine whether an additional wager has been received.

If, however, at step 2412, the system controller determines that the pre-set duration for the conditional wager has expired, then at step 2414, the system controller may cancel the conditional wager. Cancelling the conditional wager may include notifying all wagering input devices that have partially funded the conditional wager and reimbursing the wagering input devices with the appropriate funds.

Referring back to step 2410, if the system controller determines that an additional wager was received, then at step 2416, the system controller adds the wager to the conditional wager. For example, the system controller adds the amount of the received wager to the overall amount existing in the conditional wager. When the system controller receives the additional wager, the system controller may create a ticket for the additional wagering input device that transmitted the wager (step 2417). For example, the system controller generates a regular ticket into the pool, and maintains the ticket in a pending state until the conditional wager is fully funded.

Still further, in some embodiments, when the system controller receives the additional wager from the additional wagering input device, the additional wager may be of a different currency than previous wagers. For example, the conditional wager may include a first wager of a first currency (e.g., US dollars) and a second wager of a second currency (e.g., Euro). In this embodiment, both the broadcasted wager and the received wager are in a currency pre-set by the user. For example, a first user that selects the first currency as the default currency will transmit wagers in the first currency responsive to seeing the wagering event in the first currency, while a second user that selects the second currency as the default currency will transmit wagers in the second currency responsive to seeing the same wagering event in the second currency.

In some embodiments, method 2400 may include step 2417. At step 2417, the system controller may create a ticket for the additional wagering input device, and link the wager received from the additional wagering input device to the ticket of the initial wagering input device. In this manner, the initial wagering input device receives details of each participant in the conditional wager.

At step 2419, the system controller updates the broadcast of the conditional wager based on the received additional wager. For example, if the conditional wager was set at $100, the initial broadcast of the conditional wager would be $100. When an additional wager is received, for example, in the amount of $15, the system controller adds the additional wager to the wagering event, and updates the broadcast to show that the conditional wager has been funded $15. In some embodiments, the system controller may broadcast the updated conditional wager as $85 (i.e., $100-$15). In other embodiments, the system controller may broadcast the updated conditional wager as 15% invested, 85% remaining.

At step 2420 system controller converts the conditional wager to a crowdfunded wager. In some embodiments, system controller may notify all participants in the crowdfunded wager that the crowdfunded wager is sufficiently funded.

In some embodiments, method 2400 may include step 2418 as a triggering step prior to step 2420. For example, at step 2418, the system controller determines whether one or more pre-established criteria are met. Recall, at step when the wagering request is received, an initial wagering input device may transmit one or more rules for the wagering request. In some embodiments, the one or more rules may include one or more metrics that trigger the conversion of the conditional wager into a crowdfunded wager. The one or more pre-established criteria may include a total contribution meeting or exceeding a pre-established criteria, wherein the pre-established criteria may comprise, as an example and without limitation, at least one of a monetary value, a minimum number of individuals contributing towards the conditional wager, a minimum percentage of individual contribution met, an elapsed time, wherein the elapsed time is a time prior to the wagering event ending.

In some embodiments, the total amount of contribution to be funded may be pre-set by the initial wagering device. In other embodiments, the total amount of contribution to be funded may be open. In other words, the total amount of contribution may be a minimum amount of contribution that can be exceeded if there is enough interest.

Figure 25:
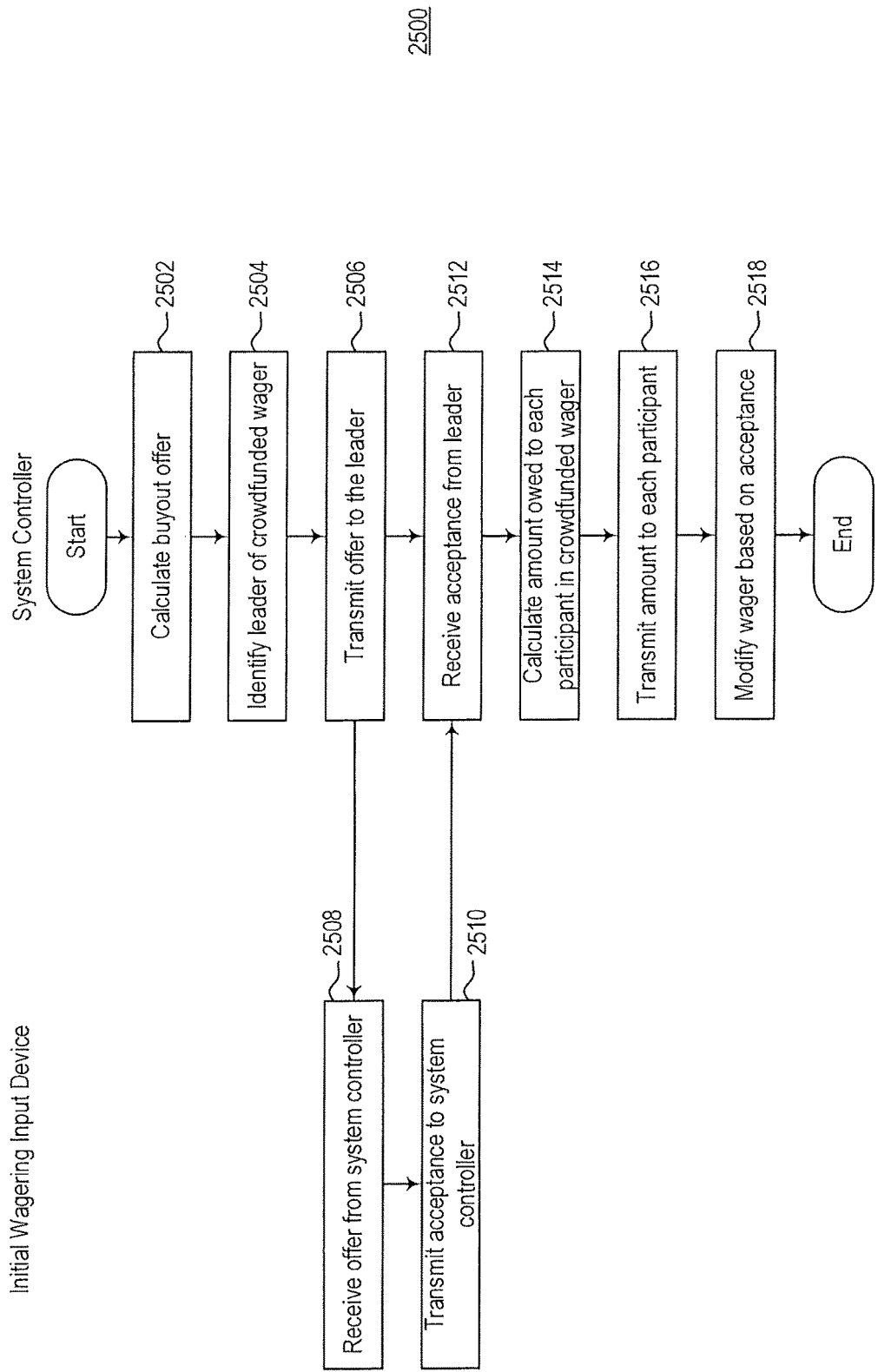
FIG. 25 is a flow diagram of a method of conducting a wagering event, according to one embodiment.

FIG. 25 is a flow diagram illustrating a method 2500 of conducting a wagering event, according to one embodiment. The wagering event conducted in method 2500 may include, for example, the crowdfunded wager that was generated in method 2400.

Method 2500 begins at step 2502. At step 2502, system controller may calculate a buyout offer for the crowdfunded wager. In one embodiment, the system controller calculates a total buyout offer for the crowdfunded wager. Continuing with the above example, if the crowdfunded wager of $100 was in response to 20/1 odds, the participants to the crowdfunded wager have the opportunity to win $2000. In this example, system controller may calculate a total buyout offer of $1500. In another embodiment, the system controller may calculate a partial buyout offer for the crowdfunded wager. Continuing with the above example, the participants may agree to sell a percentage of the conditional wager while retaining a partial interest in the wagering event. For example, the participants may sell 50% of the ticket and retain the chance of winning 50% of the $2000.

At step 2504, system controller identifies a leader of the crowdfunded wager. In some embodiments, the default leader of the crowdfunded wager is the initial wagering input device. In another embodiment, the default leader of the crowdfunded wager is chosen by the participants to the crowdfunded wager. In yet another embodiment, the default leader of the crowdfunded wager is chosen by the system controller.

At step 2506, system controller transmits the buyout offer to the identified leader of the crowdfunded wager. For purposes of FIG. 25, the identified leader of the crowdfunded wager is the initial wagering input device. As will be understood by those in the art in view of the above, the identified leader may be any participant to the crowdfunded wager.

At step 2508, initial wagering input device receives the buyout offer from system controller. At step 2510, initial wagering input device transmits acceptance of the buyout offer to the system controller.

At step 2512, system controller receives the acceptance of the buyout offer from the initial wagering device. At step 2514, system controller calculates an amount of money owed to each participant in the crowdfunded wager, based on the accepted buyout offer. For example, system controller may calculate the amount of money owed to each participant of the crowdfunded wager based off of the wager placed by participant. For example, assuming the crowdfunded wager is funded by two participants evenly, and the buyout offer was for $1500, the system controller would calculate the amount owed to each participant as $750.

At step 2516, system controller transmits a fractional amount of the buyout offer to each respective participant. In some embodiments, system controller converts the fractional amount of the buyout offer owed to each respective participant into a currency specific to the participant. For example, if a first participant wagered in dollars, system controller would transmit the fractional amount of the buyout offer in dollars. In another example, if a second participant wagered in Japanese Yen, system controller would transmit the fractional amount of the buyout offer in Japanese Yen.

In some embodiments, method 2500 further includes step 2518. Step 2518 is initiated when system controller transmits a partial buyout offer and initial wagering input device accepts the partial buyout offer. At step 2518, system controller modifies the crowdfunded wager based on the accepted partial buyout offer. For example, assuming system controller transmits a partial buyout offer of 50% of the crowdfunded wager and the initial wagering input device accepts the partial buyout offer, system controller may modify the crowdfunded wager appropriately.

In some embodiments, step 2518 may precede step 2516. In other embodiments, even those in which step 2518 is not present, system controller may choose not to transmit a fractional amount of the buyout offer to each participant; rather, system controller may choose to debit an account of each participant, and transmit any money owed to the participant when requested by the participant.

Figure 26:
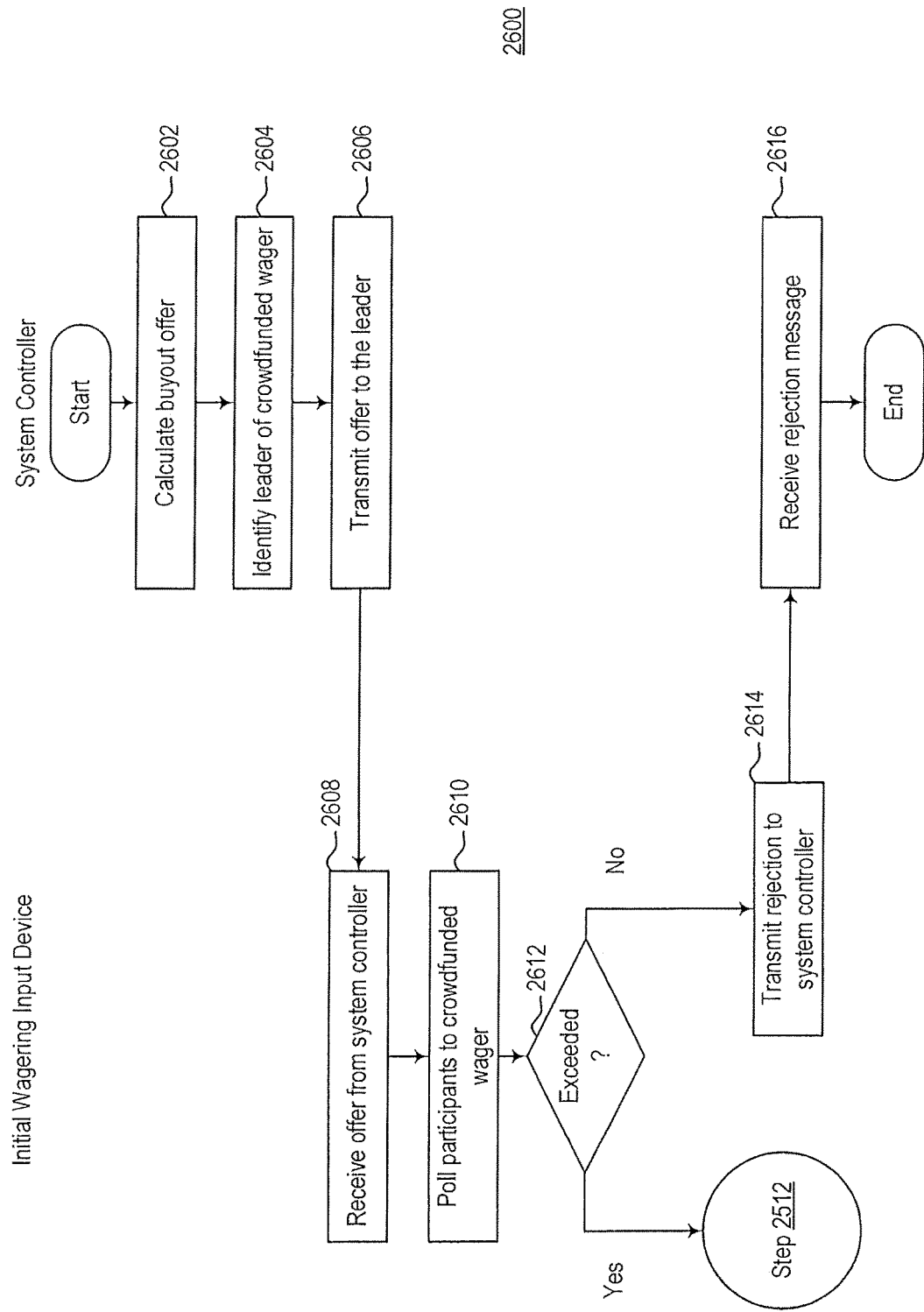
FIG. 26 is a flow diagram of a method of conducting a wagering event, according to one embodiment.

FIG. 26 is a flow diagram illustrating a method 2600 of conducting a wagering event, according to one embodiment. The wagering event conducted in method 2500 may be, for example, the wagering event that was initiated in method 2400.

Method 2600 is substantially similar to method 2500. Those steps in 2600 that are similar to those in method 2500 are numbered similarly. Method 2600 begins at step 2602. At step 2602, system controller calculates a buyout offer for the crowdfunded wager. At step 2604, system controller identifies a leader of the crowdfunded wager. At step 2606, system controller transmits the buyout offer to the identified leader of the crowdfunded wager.

At step 2608, the wagering input device of the identified leader receives the buyout offer from system controller. At step 2610, wagering input device of the identified leader generates and transmits a message to each participant wagering input device notifying each participant wagering device of the buyout offer. The message transmitted to each participant wagering input device acts as a polling mechanism to determine whether to accept or reject the buyout offer. For example, a rule set by initial wagering input device may be that any buyout offer may only be accepted if a majority (or pre-set percentage) of participants agree to accept the buyout offer.

At step 2610, wagering input device of the identified leader receives polling results from each of the participants to the crowdfunded wager. In some embodiments, a failure to respond to the message results in an agreement to accept the buyout offer. In some embodiments, a failure to respond to the message results in a refusal to accept the buyout offer. In other embodiments, a failure to responds to the message results in abstention, in which case the decision to accept/reject the buyout offer is made among those participants that responded.

At step 2612, wagering input device of the leader determines whether to accept or reject the buyout offer based on the responses from the participants. For example, as discussed above, wagering input device determines whether a threshold number of participants agree to accept the offer. If at step 2612 wagering input device of the leader determines that the threshold number of participants agree to accept the offer, then method 2600 proceeds to step 2512 of method 2500.

If, however, at step 2612 wagering input device of the leader determines that the threshold number of participants have not agreed to accept the offer, then at step 2614, wagering input device of the leader transmits a rejection message to system controller. At step 2616, system controller receives the rejection message.

Figure 27:
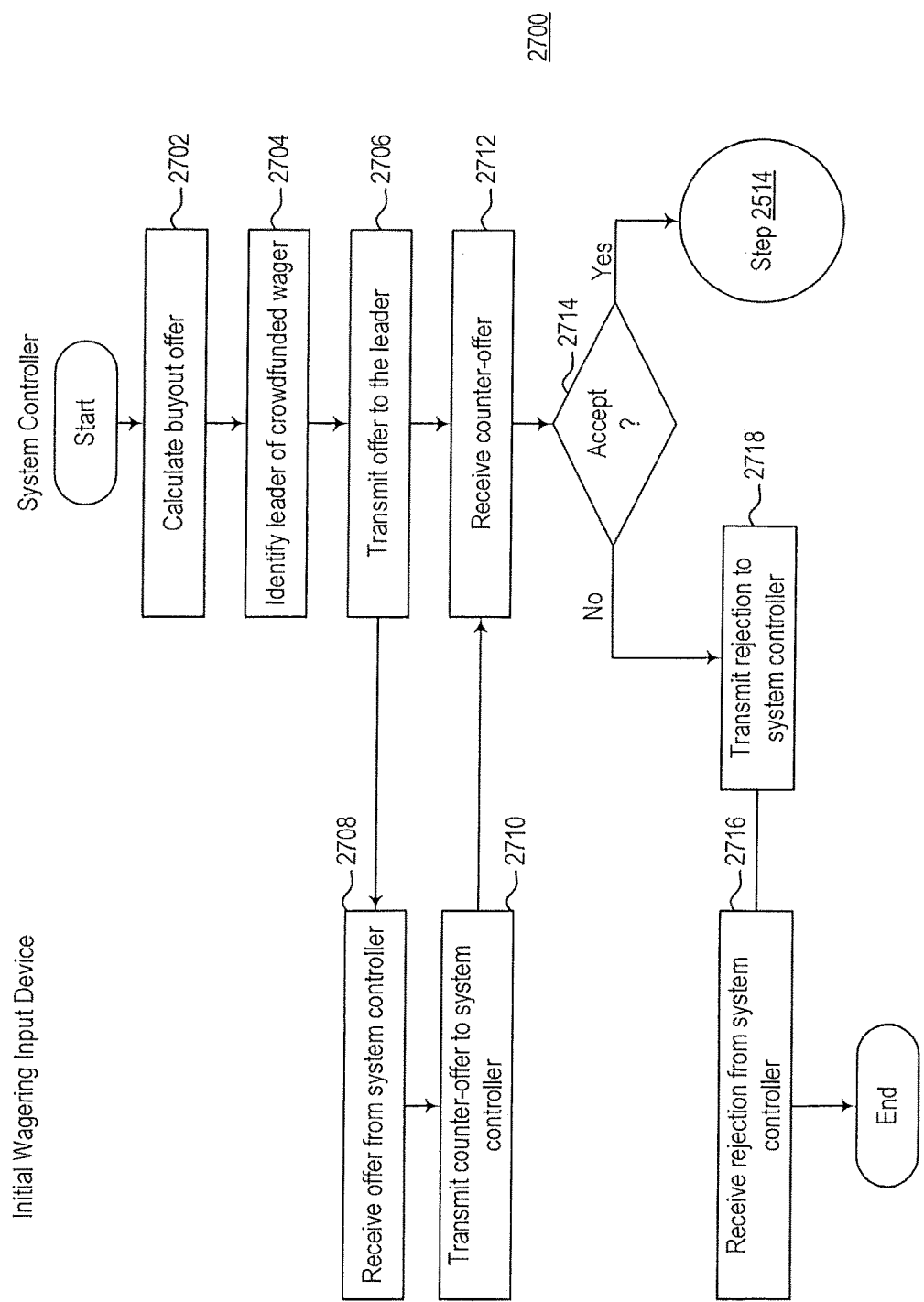
FIG. 27 is a flow diagram of a method of conducting a wagering event, according to one embodiment.

FIG. 27 is a flow diagram illustrating a method 2700 of conducting a wagering event, according to one embodiment. The wagering event conducted in method 2700 may be, for example, the wagering event that was initiated in method 2400.

Method 2700 is substantially similar to method 2500 and method 2600. Those steps in method 2700 that are similar to those in methods 2500 and 2600 are numbered similarly. Method 2700 begins at step 2702. At step 2702, system controller calculates a buyout offer for the crowdfunded wager. At step 2704, system controller identifies a leader of the crowdfunded wager. At step 2706, system controller transmits the buyout offer to the identified leader of the crowdfunded wager.

At step 2708, wagering input device of the leader receives the buyout offer from system controller. At step 2710, wagering input device generates a counter-offer and transmits the counter-offer to system controller. In some embodiments, wagering input device polls participants to the crowdfunded wager to determine whether to accept the buyout offer or counter-offer. Such process has been discussed above in reference to FIG. 27.

At step 2712, system controller receives counter-offer from wagering input device of the leader. At step 2714, system controller determines whether to accept or reject the counter-offer. If at step 2714 system controller does not accept the counter-offer, then at step 2718, system controller transmits a message to wagering input device of the leader that system controller indicating rejection of the offer. At step 2716, wagering input device of the leader receives the rejection of the counter-offer.

If, however, at step 2714, system controller accepts the counter-offer, then method 2700 proceeds to step 2514 of method 2500.

Figure 28:
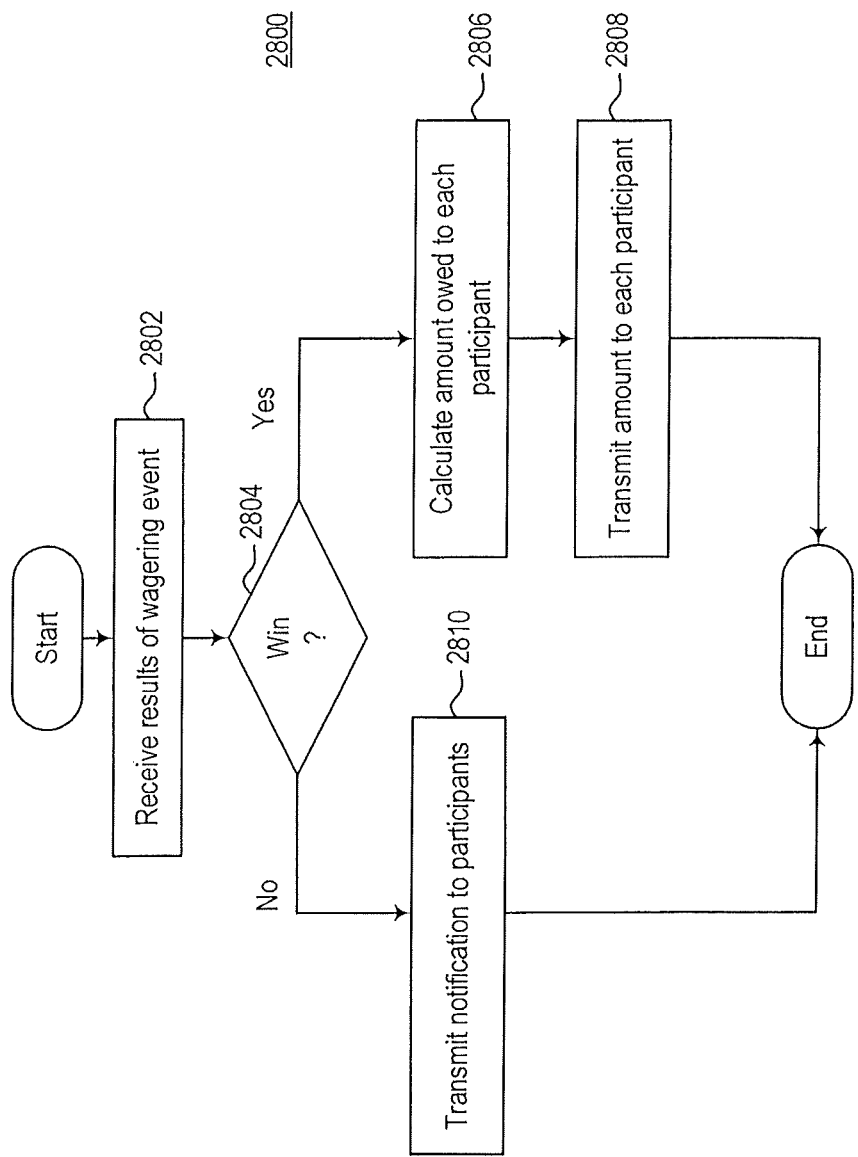
FIG. 28 is a flow diagram of a method of conducting a wagering event, according to one embodiment.

FIG. 28 is a flow diagram illustrating a method 2800 of conducting a wagering event, according to one embodiment. The wagering event conducted in method 2800 may be, for example, the wagering event that was initiated in method 2400.

Method 2800 begins at step 2802. At step 2802, system controller receives results of the wagering event in which the crowdfunded wager was placed. At step 2804, system controller determines whether the crowdfunded wager won the wagering event. If, at step 2804, system controller determines that the crowdfunded wager won the wagering event, then at step 2806, system controller calculates what is owed to each participant in the crowdfunded wager, such as a specified amount of money or other award. For example, system controller may calculate the amount of money owed to each participant of the crowdfunded wager based off of the wager placed by participant.

At step 2808, system controller transmits a fractional amount of the buyout offer to each respective participant. In some embodiments, system controller converts the fractional amount of the buyout offer owed to each respective participant into a currency specific to the participant. In one embodiment, rather than transmit the fractional amount of the buyout offer to each respective participant, system controller may debit the account of each participant.

If, however at step 2804 system controller determines that the crowdfunded wager lost the wagering event, then at step 2810, system controller transmits a message to each participant that the crowdfunded wager lost the wagering event.

Changes and modifications can be made without departing from the spirit and scope of the present disclosure and without diminishing its intended advantages. For example, any of the concepts and features described in connection with any example, embodiment or variation herein may also apply and be utilized in connection with any other example, embodiment or variation described herein alone or in combination. In addition, any of the concepts and features disclosed herein may be provided by appropriate hardware, software and/or combination of both hardware and software where desired and deemed appropriate. It is therefore intended that such changes and modifications be covered by the appended claims.

The invention claimed is:

1. A method of conducting a wagering event for one or more players, comprising:
  causing a central server system to initiate a wagering event for one or more players, wherein the wagering event corresponds to a sporting event;
  causing a wager corresponding to a player of the one or more players that is received by a wagering input device for the sporting event to be transmitted to the central server system;
  causing the central server system to generate a cash out offer for the player based on the wager and progress of the sporting event, by:
    monitoring progress of the sporting event, wherein the progress of the sporting event may comprise at least a current status;

identifying that the player's wager is active; and
determining an amount of the cash out offer; and
causing the central server system to transmit the cash out offer to the wagering input device, prompting the player to accept or reject the cash out offer.

2. The method of claim 1, further comprising:
causing the central server system to identify that the cash out offer was accepted; and
causing the central server system to issue an electronic ticket corresponding to the cash out offer.

3. The method of claim 1, wherein the cash out offer is a partial cash out offer.

4. The method of claim 3, further comprising:
causing the central server system to identify that the partial cash out offer was accepted;
causing the central server system to issue an electronic ticket corresponding to the partial cash out offer;
causing the central server system to modify the player's wager based on the accepted partial cash out offer; and
causing the central server system to determine, at an end of the sporting event, whether the player's modified wager is a winning wager.

5. The method of claim 1, further comprising:
causing the central server system to identify that the cash out offer was accepted; and
causing the central server system to generate a new cash out offer based on an updated progress of the sporting event.

6. The method of claim 1, further comprising:
causing the central server system to receive a second wager from a second player.

7. The method of claim 6, wherein determining an amount of the cash out offer comprises:
determining odds of winning with respect to the wager from the first player and the second wager from the second player.

8. A system for conducting a wagering event for one or more players, comprising;
a processor; and
a memory having programming instructions stored thereon, which, when executed by the processor, performs one or more operations, comprising:
initiating a wagering event for one or more players, wherein the wagering event corresponds to a sporting event;
receiving, from a wagering input device, a wager corresponding to a player of the one or more players;
generating a cash out offer for the player based on the wager and progress of the sporting event, by:
monitoring progress of the sporting event, wherein the progress of the sporting event may comprise at least a current status;
identifying that the player's wager is active; and
determining an amount of the cash out offer; and
transmitting the cash out offer to the wagering input device, prompting the player to accept or reject the cash out offer.

9. The system of claim 8, wherein the one or more operations further comprise:
identifying that the cash out offer was accepted; and
issuing an electronic ticket corresponding to the cash out offer.

10. The system of claim 8, wherein the cash out offer is a partial cash out offer.

11. The system of claim 10, wherein the one or more operations further comprise:
identifying that the partial cash out offer was accepted;
issuing an electronic ticket corresponding to the partial cash out offer;
modifying by the central server system, the player's wager based on the accepted partial cash out offer; and
determining, at an end of the sporting event, whether the player's modified wager is a winning wager.

12. The system of claim 8, further comprising:
identifying that the cash out offer was accepted; and
generating a new cash out offer based on an updated progress of the sporting event.

13. The system of claim 8, further comprising:
receiving a second wager from a second player.

14. The system of claim 8, wherein determining an amount of the cash out offer comprises: determining odds of winning with respect to the wager from the first player and the second wager from the second player.

15. A non-transitory computer readable medium having instructions stored thereon, which, when executed by a processor, performs one or more operations, comprising:
causing a central server system to initiate a wagering event for one or more players, wherein the wagering event corresponds to a sporting event;
causing a wager corresponding to a player of the one or more players that is received by a wagering input device for the sporting event to be transmitted to the central server system;
causing the central server system to generate a cash out offer for the player based on the wager and progress of the sporting event, by:
monitoring progress of the sporting event, wherein the progress of the sporting event may comprise at least a current status;
identifying that the player's wager is active; and
determining an amount of the cash out offer; and
causing the central server system to transmit the cash out offer to the wagering input device, prompting the player to accept or reject the cash out offer.

16. The non-transitory computer readable medium of claim 15, further comprising:
causing the central server system to identify that the cash out offer was accepted; and
causing the central server system to issue an electronic ticket corresponding to the cash out offer.

17. The non-transitory computer readable medium of claim 15, wherein the cash out offer is a partial cash out offer.

18. The non-transitory computer readable medium of claim 17, further comprising:
causing the central server system to identify that the partial cash out offer was accepted;
causing the central server system to issue an electronic ticket corresponding to the partial cash out offer;
causing the central server system to modify the player's wager based on the accepted partial cash out offer; and
causing the central server system to determine, at an end of the sporting event, whether the player's modified wager is a winning wager.

19. The non-transitory computer readable medium of claim 15, further comprising:
causing the central server system to identify that the cash out offer was accepted; and
causing the central server system to generate a new cash out offer based on an updated progress of the sporting event.

20. The non-transitory computer readable medium of claim 15, further comprising:
  causing the central server system to receive a second wager from a second player.

21. A non-transitory computer readable medium having stored thereon a computer program adapted for use with at least one wagering input device and at least one central server system for conducting a wagering event, the computer program comprising a routine of set instructions, which performs one or more operations, comprising:
  causing the at least one central server system to initiate the wagering event for one or more players, wherein the wagering event corresponds to a sporting event;
  causing the at least one wagering input device to accept a wager corresponding to a player of the one or more players that desires to participate in the wagering event;
  causing the wager that has been accepted by the at least one wagering input device to be communicated to the at least one central server system;
  causing the at least one central server system to generate a cash out offer for the player by:
    evaluating a status of the sporting event;
    determining if the player is eligible to receive the cash out offer; and
    determining an amount of the cash out offer;
  causing the at least one central server system to communicate the cash out offer to the at least one wagering input device,
  causing the at least one wagering input device to display the cash out offer;
  causing the at least one wagering input device to identify if the cash out offer has been accepted or rejected by the player; and
  causing the at least one wagering input device to communicate the acceptance of the cash out offer to the at least one central server system.

22. The non-transitory computer readable medium of claim 21, further comprising:
  causing the at least one wagering input device to issue a credit, tokens, coupon, voucher, award or funding of an account of the player based on the amount of the accepted cash out offer.

23. The non-transitory computer readable medium of claim 21, wherein the at least one wagering input device comprises a wagering terminal, a hand held device, a mobile device, a wireless device, a computer, a smart phone, a telephone, a tablet computer, a PDA or an interactive television.

24. The non-transitory computer readable medium of claim 21, wherein the at least one central server system is one or more of remote from the at least one wagering input device, proximate to the at least one wagering input device or a portion of the at least one wagering input device.

25. The non-transitory computer readable medium of claim 21, wherein the amount of the cash out offer is variable and based on at least one of a calculated probability, an originator of the cash out offer, a negotiation, the one or more players or a third party.

26. The non-transitory computer readable medium of claim 21, wherein the cash out offer comprises at least one of or both of a full cash out offer or a partial cash out offer.

27. The non-transitory computer readable medium of claim 26, further comprising:
  wherein a player accepting the full cash out offer is no longer eligible to win the wagering event; and
  wherein a player accepting the partial cash out offer remains eligible to win the wagering event.

28. The non-transitory computer readable medium of claim 21, further comprising:
  causing the at least one central server system to identify where the player has won the wagering event;
  causing the at least one wagering input device to notify the player that they have won the wagering event;
  causing the at least one wagering input device to notify the player that they have won at least one jackpot or a portion thereof;
  causing at least one of the at least one central service system or the at least one wagering input device to issue a credit, tokens, coupon, voucher, award or fund an account of the player that has won the wagering event corresponding to an amount of the at least one jackpot or the portion thereof, wherein the award comprises one or more selected from the group consisting of monetary awards, nonmonetary awards, a prize, a payment, a designated currency, virtual currency, tokens, credits, coupons, services, personal property, real property, virtual property, assets, investments, negotiable instruments, commodities, food, lodging, entertainment, alleviation of obligations, gaming opportunities and wager enhancement.

29. The non-transitory computer readable medium of claim 21, wherein the at least one wagering input device comprises a user interface through which the player may input the wager in order to participate in the wagering event and accept or reject the cash out offer.

30. The non-transitory computer readable medium of claim 21, wherein the sporting event comprises at least one of an entire sporting event, a partial sporting event, a divisible component of a sporting event, multiple independent sporting events occurring sequentially or concurrently, and a compilation of related sporting events, wherein the one or more sporting events comprises one or more selected from the group consisting of eSports, e-sports, competitive gaming, electronic sports, fantasy events, real games, virtual games, fantasy games, video games, football ("soccer"), American football, Australian rules football, baseball, cricket, basketball, golf, hockey, auto racing, legends, rugby, wrestling, surfing, mixed martial arts, racing, lotteries, live events, pre-recorded events, online events, broadcast events, card games, slot machines, keno, poker, politics, sales, stocks, celebrity gossip, movies, and reality TV.

* * * * *

UNITED STATES PATENT AND TRADEMARK OFFICE
CERTIFICATE OF CORRECTION

PATENT NO. : 10,970,969 B2  
APPLICATION NO. : 16/515916  
DATED : April 6, 2021  
INVENTOR(S) : Bernard J. Marantelli Page 1 of 1

It is certified that error appears in the above-identified patent and that said Letters Patent is hereby corrected as shown below:

In the Claims

Column 50, Line 67, Claim 1 after "status" delete ";" and insert therefor --,--.
Column 51, Line 1, Claim 1 after "active" delete ";" and insert therefor --,--.
Column 51, Line 38, Claim 8 after "comprising" delete ";" and insert therefor --:--.
Column 51, Lines 42-43, Claim 8 after "processor," delete "performs" and insert therefore --cause the processor to perform--.
Column 51, Line 53, Claim 8 after "status" delete ";" and insert therefor --,--.
Column 51, Line 54, Claim 8 after "active" delete ";" and insert therefor --,--.
Column 52, Line 21, Claim 15 after "processor," delete "performs" and insert therefore --cause the processor to perform--.
Column 52, Line 35, Claim 15 after "status" delete ";" and insert therefor --,--.
Column 52, Line 36, Claim 15 after "active" delete ";" and insert therefor --,--.
Column 53, Line 10, Claim 21 after "which" delete "performs" and insert therefore --when executed by a processor cause the processor to perform--.
Column 53, Line 22, Claim 21 after "event" delete ";" and insert therefor --,--.
Column 53, Line 24, Claim 21 after "offer" delete ";" and insert therefor --,--.
Column 53, Line 28, Claim 21 after "device" delete "," and insert therefor --;--.

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*